(12) United States Patent
Koga et al.

(10) Patent No.: US 8,344,575 B2
(45) Date of Patent: Jan. 1, 2013

(54) STATOR AND MANUFACTURING METHOD THEREOF

(75) Inventors: Kiyotaka Koga, Nishio (JP); Masaki Saito, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 162 days.

(21) Appl. No.: 12/812,701

(22) PCT Filed: Jul. 10, 2009

(86) PCT No.: PCT/JP2009/062615
§ 371 (c)(1),
(2), (4) Date: Jul. 13, 2010

(87) PCT Pub. No.: WO2010/007950

PCT Pub. Date: Jan. 21, 2010

(65) Prior Publication Data
US 2010/0289374 A1    Nov. 18, 2010

(30) Foreign Application Priority Data

Jul. 14, 2008  (JP) .................................. 2008-183255
Oct. 7, 2008   (JP) .................................. 2008-260752

(51) Int. Cl.
*H02K 3/28* (2006.01)
(52) U.S. Cl. ........................................ 310/195; 310/198
(58) Field of Classification Search .................. 310/179, 310/180, 184, 195
See application file for complete search history.

(56) References Cited

U.S. PATENT DOCUMENTS

| 5,113,573 | A | 5/1992 | Taji et al. | |
| 6,373,164 | B1 | 4/2002 | Nishimura | |
| 6,727,625 | B2* | 4/2004 | Ooiwa | 310/184 |
| 6,841,913 | B2* | 1/2005 | Gorohata et al. | 310/180 |
| 7,122,936 | B2* | 10/2006 | Takizawa et al. | 310/260 |
| 2005/0194857 | A1 | 9/2005 | Mori et al. | |

(Continued)

FOREIGN PATENT DOCUMENTS

CN     1649238 A     8/2005

(Continued)

OTHER PUBLICATIONS

International Search Report issued in International Patent Application No. PCT/JP2009/062615 mailed on Oct. 13, 2009 (with English translation).

(Continued)

*Primary Examiner* — Burton Mullins
(74) *Attorney, Agent, or Firm* — Oliff & Berridge, PLC

(57) ABSTRACT

The disclosed embodiments relate to a stator and manufacturing method of the stator in which the coil conducts of the stator have three phases (a U phase, V phase, and W phase), which are arranged in a distributed winding form in a plurality of slots of a stator core. The coil conductors of the three phases each include a slot conductor portion that is disposed in the slot, and a pair of coil end conductor portions disposed on both axial sides of the stator core to connect the slot conductor portions disposed in the different slots. The stator also includes a first side transition wire portion in each phase that is disposed further toward a radial inner side than an inner peripheral end surface of a tooth provided on each circumferential side of the slot so as to overlap another first side transition wire portions in the axial direction.

11 Claims, 44 Drawing Sheets

U.S. PATENT DOCUMENTS

2007/0278889 A1* 12/2007 Sasaki et al. .................. 310/184
2010/0253161 A1* 10/2010 Kuroyanagi .................... 310/44

FOREIGN PATENT DOCUMENTS

| | | |
|---|---|---|
| JP | B2-2523933 | 8/1996 |
| JP | A-2000-278903 | 10/2000 |
| JP | A-2001-320845 | 11/2001 |
| JP | A-2005-20942 | 1/2005 |
| JP | A-2005-253145 | 9/2005 |
| JP | A-2005-304108 | 10/2005 |
| JP | B2-3928297 | 6/2007 |
| JP | A-2007-325472 | 12/2007 |
| JP | A-2008-43149 | 2/2008 |
| WO | WO 92/01327 A1 | 1/1992 |

OTHER PUBLICATIONS

Partial Translation of Aug. 29, 2012 Office Action issued in Chinese Patent Application No. 200980102284.2.

* cited by examiner

STATOR AND MANUFACTURING METHOD THEREOF

TECHNICAL FIELD

The present invention relates to a stator and a manufacturing method of the stator in which coil conductors of three phases, namely a U phase, a V phase, and a W phase, are disposed in a distributed winding form in a plurality of slots of a stator core.

BACKGROUND ART

For example, when coil conductors of three phases, namely a U phase, a V phase, and a W phase, are disposed in a stator core of a stator used in a rotary electric machine, a jig is used to insert the coil conductors of the three phases into an inner peripheral side of the stator core while holding the coil conductors. Once the coil conductors have been disposed in a plurality of slots of the stator core, a coil end conductor portion projecting from an axial end surface of the stator core is deformed outwardly in a radial direction of the stator core.

In a stator manufacturing method described in Patent Document 1, before winding a coil around a stator core, the coil is molded to include a ridged front side coil end portion to be positioned on the inside of an inner diameter of the stator core, a slot coil portion to be disposed in a slot, and a ridged rear side coil end portion. Further, a relay coil portion bent in an inside direction is formed between the front side coil end portion and the slot coil portion. The coil is then inserted into the stator core from an end surface of the stator core, starting with the relay coil portion, and once the coil has been inserted into the stator core, the front side coil end portion is deformed to the outside of the inner diameter of the core.

Hence, the coil can be inserted into the stator core after being molded in advance into a post-core insertion shape, and therefore the coil does not deform when inserted into the stator core, thus preventing damage to an insulating film of the coil and the stator core.

[Related Art Documents]
[Patent Document]
[Patent Document 1] Japanese Patent Publication No. 2523933

DISCLOSURE OF THE INVENTION

Problem to be Solved by the Invention

However, in Patent Document 1, after the coil is inserted into the stator core, the front side coil end portion of the coil is deformed to the outside of the inner diameter of the coil. Therefore, although deformation does not occur in the coil when the coil is inserted into the stator core, the coil is deformed after being inserted into the stator core, and as a result, a conductor portion or an insulating film in the deformed part may deteriorate.

Furthermore, if the front side coil end portion is left on the inside of the inner diameter of the stator core without being deformed to the outside of the core inner diameter, the front side coil end portion needs be disposed distant from a rotor to prevent interference between the front side coil end portion and the rotor when the front side coil end portion is deformed due to vibration. As a result, the axial size of the stator increases.

The present invention has been designed in consideration of these conventional problems, and it is an object of the present invention to provide a stator and a manufacturing method of the stator in which coil conductors of three phases can be disposed in a stator core easily, and the size of the stator can be reduced while maintaining a high level of quality in the coil conductors of the three phases.

Means for Solving the Problem

According to a first aspect of the present invention, a stator in which coil conductors of three phases, namely a U phase, a V phase, and a W phase, are disposed in a distributed winding form in a plurality of slots extending in an axial direction of a stator core is characterized in that the coil conductors of the three phases each include a slot conductor portion disposed in the slot, and a pair of coil end conductor portions disposed on both axial sides of the stator core to connect the slot conductor portions disposed in the different slots to each other, and a first side transition wire portion of each of the phases, which extends in a circumferential direction in a first side coil end conductor portion serving as the coil end conductor portion positioned on an axial first side, is disposed further toward a radial inner side than an inner peripheral end surface of a tooth provided on each circumferential side of the slot so as to overlap another first side transition wire portion in the axial direction.

According to a second aspect of the present invention, a manufacturing method for a stator in which coil conductors of three phases, namely a U phase, a V phase, and a W phase, are disposed in a distributed winding form in a plurality of slots extending in an axial direction of a stator core, the coil conductors of the three phases each include a slot conductor portion disposed in the slot, and a pair of coil end conductor portions disposed on both axial sides of the stator core to connect the slot conductor portions disposed in the different slots to each other is characterized by including the steps of: molding the coil conductors of the three phases such that a first side transition wire portion of each of the phases, which extends in a circumferential direction in a first side coil end conductor portion serving as the coil end conductor portion positioned on an axial first side, is disposed further toward a radial inner side than an inner peripheral end surface of a tooth provided on each circumferential side of the slot, and molding the coil conductors of the three phases into different shapes such that the first side transition wire portion of each of the phases is disposed in a different position from the first side transition wire portions of the other phases; and inserting the molded coil conductors of the three phases into the slots along an axial direction from an axial first side end surface of the stator core, starting from the first side coil end conductor portion.

EFFECTS OF THE INVENTION

In the stator according to the present invention, by manipulating the shape of the coil end conductor portion, the coil conductors of the three phases are inserted into the stator core easily and the need for further molding of the coil conductors after insertion into the stator core is eliminated.

More specifically, in the stator according to the present invention, the first side coil end conductor portion is shaped such that the first side transition wire portion of each of phases, which extends in the circumferential direction, is disposed further toward the radial inner side than the inner peripheral end surface of the tooth, and all of the first side coil end conductor portions are positioned further toward the radial inner side than an outer peripheral end surface of the slot. Hence, when the coil conductors of the three phases are inserted into the stator core, the coil conductors of the three phases can be inserted into the stator core from the axial first side on which the first side coil end conductor portions are positioned. Thus, the coil conductors of the three phases can be disposed relative to the stator core easily.

Further, the stator according to the present invention can be manufactured without performing molding processing such as bending molding and compression molding on the first side coil end conductor portion after insertion into the stator core with substantially no further processing after insertion. As a result, an insulating film provided on the surface of the conductor portion constituting the coil conductor suffers substantially no breakage or deterioration. Therefore, the quality of the stator according to the present invention can be improved.

Furthermore, in the stator according to the present invention, the coil conductors of the three phases can be assembled in advance prior to insertion into the stator core such that all of the coil conductors of the three phases can be inserted into the stator core at once. As a result, the coil conductors of the three phases can be inserted into the stator core very easily. Note that the coil conductors may be inserted into the stator core in predetermined units (numbers) and then joined by welding or the like when disposed in the stator core.

Further, the first side transition wire portion of each of the phases is disposed to overlap another first side transition wire portion (of the same phase or another phase) in the axial direction. As a result, the first side coil end conductor portion can be prevented from projecting in an inner circumferential (inner radial) direction, thereby preventing deformation of the first side coil end conductor portion due to vibration. Therefore, when a rotor is incorporated into the manufactured stator, the distance between the first side coil end conductor portion and the rotor can be reduced, thereby making the first side coil end conductor portion compact.

Hence, with the stator according to the present invention, the coil conductors of the three phases can be disposed in the stator core easily, the quality of the coil conductors of the three phases can be maintained at a high level, and the size of the stator can be reduced.

Further, in the manufacturing method for a stator according to the present invention, the coil conductors of the three phases can be inserted into the stator core very easily. Moreover, the coil conductors of the three phases can be finished as a product with substantially no further processing after insertion in the stator core, and therefore a stator of superior quality can be manufactured.

Hence, with the manufacturing method for a stator according to the present invention, the coil conductors of the three phases can be disposed in the stator core easily, the quality of the coil conductors of the three phases can be maintained at a high level, and a stator having a reduced size can be manufactured easily.

BEST MODES FOR CARRYING OUT THE INVENTION

Figure 1:
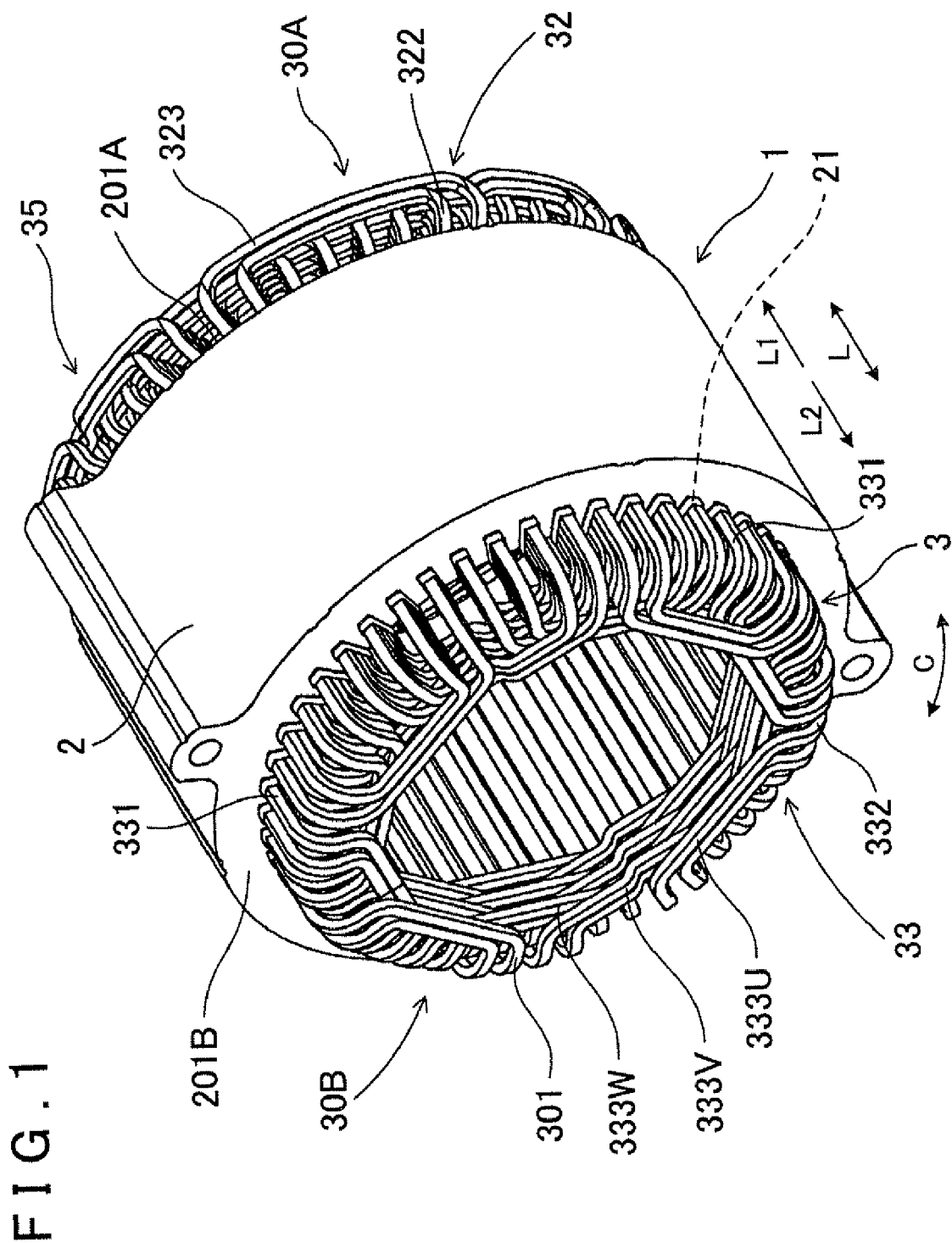
FIG. 1 is a perspective view showing a stator according to a first embodiment from a second side coil end portion.

Preferred embodiments of a stator and a manufacturing method thereof according to the present invention will now be described.

In the present invention, the stator may be used in a motor, a generator, or a motor/generator, which serve as a rotary electric machine.

Further, the coil conductors of the three phases may be formed using electric wires such as angular wires having a substantially square cross-section or flat wires having a flattened cross-section. The coil conductors may also be constituted by electric wires in which an insulating film made of an insulating resin or the like is formed around the entire circumference of a conductor portion made of copper or the like.

In the stator according to the present invention, a first side transition wire portion of each of the phases is preferably disposed to overlap the first side transition wire portion of another of the phases in an axial direction.

In this case, projection of the first side coil end conductor portion in the inner circumferential (inner radial) direction can be further reduced, making the first side coil end conductor portion further compact.

Further, the first side transition wire portions of the coil conductors of the two phases, from among the coil conductors of the three phases, are preferably disposed in offset positions from each other in the axial direction, and the first side transition wire portion of the coil conductor of the remaining phase is preferably bent in the axial direction between circumferential end portions of the coil conductors of the two phases so as to be disposed to overlap the first side transition wire portions of the coil conductors of the two phases in the axial direction.

In this case, the first side transition wire portions of the first side coil end conductor portions of the three phases can be disposed within a two-phase axial width range, enabling reduction in the axial length of the stator.

Further, the first side transition wire portion of each of the phases is preferably disposed to overlap another first side transition wire portion of the same phase in a radial direction further toward a radial inner side than the inner peripheral end surface of the tooth.

In this case, the axial length of the stator can be reduced further.

Furthermore, at least two slot conductor portions of each of the phases are preferably disposed in the slot of each of the phases in the stator core so as to overlap in the radial direction, and the first side coil end conductor portion that is connected to an outermost peripheral side slot conductor portion is farthest distant from an axial end surface of the stator core toward an axial outer side from an axial end surface of the stator core, the outermost peripheral side slot conductor portion being one of the slot conductor portions that is disposed on a radial outermost peripheral side among the slot conductor portions disposed to overlap in the radial direction. The first side coil end conductor portion that is connected to an inner peripheral side slot conductor portion, which is one of the slot conductor portion that overlaps an inner peripheral side of the outermost peripheral side slot conductor portion, is preferably disposed to overlap the first side coil end conductor portion connected to the outermost peripheral side slot conductor portion on an axial inner side.

In this case, in the stator formed by disposing the coil conductors of the three phases in the stator core, the first side coil end conductor portions of the three phases can be formed more compact.

Further, in the coil conductors of the three phases, a radius of curvature of a coil end connecting portion that connects the inner peripheral side slot conductor portion to the first side transition wire portion is preferably smaller than a radius of curvature of a coil end connecting portion that connects the outermost peripheral side slot conductor portion to the first side transition wire portion.

Likewise in this case, in the stator formed by disposing the coil conductors of the three phases in the stator core, the first side coil end conductor portions of the three phases can be formed more compact.

Further, a second side transition wire portion of each of the phases, which extends in a circumferential direction in a second side coil end conductor portion serving as the coil end conductor portion positioned on an axial second side, is preferably disposed further toward a radial outer side than the inner peripheral end surface of the tooth so as to overlap another second side transition wire portion of the same phase in the radial direction.

In this case, the second side coil end conductor portion is shaped such that the second side transition wire portion of each phase is disposed further toward the radial outer side than the inner peripheral end surface of the tooth. Thus, when a rotor is inserted into the stator formed by inserting the coil conductors of the three phases into the stator core, the rotor can be inserted from the axial second side of the stator core in which the second side coil end conductor portion is positioned. As a result, the rotor can be disposed in the stator easily.

Furthermore, in this case, the second side transition wire portion of each phase is disposed to overlap another second side transition wire portion of the same phase in the radial direction. As a result, the second side coil end conductor portions can be made compact.

Further, the second side transition wire portion of each of the phases is preferably disposed to overlap the second side transition wire portion of another of the phases in the radial direction.

In this case, the second side coil end conductor portions can be made even more compact.

Furthermore, in the stator core, two adjacent ones of the U phase slots, two adjacent ones of the V phase slots, and two adjacent ones of the W phase slots are preferably formed repeatedly in sequence, and the coil conductors of the three phases are preferably constituted such that the plurality of coil conductors of the same phase are respectively disposed in the adjacent slots of the same phase in series in the radial direction of the stator core, and further, in the first side coil end conductor portion, the plurality of coil conductors of the same phase disposed in a first slot of the adjacent slots of the same phase and the plurality of coil conductors of the same phase disposed in a second slot of the adjacent slots of the same phase are disposed in series in the axial direction of the stator core, and in the second side coil end conductor portion, the plurality of coil conductors of the same phase disposed in the first slot of the adjacent slots of the same phase and the plurality of coil conductors of the same phase disposed in the second slot of the adjacent slots of the same phase are disposed in series in the radial direction of the stator core.

In this case, the size of the first side coil end conductor portion in the axial direction of the stator core can be reduced particularly effectively when coil conductors of the same phase are disposed in the adjacent slots of the same phase.

Further, the coil conductors of the three phases are preferably constituted such that two coil conductors of the same phase are respectively disposed in the adjacent slots of the same phase in series in the radial direction of the stator core, and further, in the first side coil end conductor portion, the two coil conductors of the same phase disposed in a first slot of the adjacent slots of the same phase and the two coil conductors of the same phase disposed in a second slot of the adjacent slots of the same phase are disposed in four rows in the radial direction of the stator core, and in the second side coil end conductor portion, the two coil conductors of the same phase disposed in the first slot of the adjacent slots of the same phase and the two coil conductors of the same phase disposed in the second slot of the adjacent slots of the same phase are disposed in four rows in the axial direction of the stator core or in two rows in the axial direction and two rows in the radial direction.

In this case, the number of the coil conductors disposed in the slots of the same phase is appropriate, and therefore, a plurality of coil conductors can be arranged and disposed easily in the first side coil end conductor portion and the second side coil end conductor portion.

Further, in the first side coil end conductor portion, the two coil conductors of the same phase disposed in the slot of the same phase in series in the radial direction of the stator core are preferably constituted such that a first coil conductor of the two coil conductors is bent toward a radial inner peripheral side of the stator core in a perpendicular state relative to the axial direction of the stator core, while a second coil conductor of the two coil conductors is bent toward the radial inner peripheral side of the stator core and offset from the axial direction of the stator core so as to be disposed in series with the first coil conductor in the radial direction of the stator core.

In this case, two of the coil conductors constituting the coils of the respective phases form a set so as to be arranged in series in the radial direction of the stator core in the slot, and therefore the coil conductors can be arranged in series in the radial direction of the stator core likewise in the first side coil end conductor portion.

The coil conductor of each of the phases is preferably formed in a shape that travels around the stator core once or a plurality of times in the circumferential direction and disposed so as to overlap in a plurality of stages in the radial direction of the stator core, and conductor end portions of the coil conductors of the same phase are preferably joined in a state where the conductor end portions overlap in the radial direction in the second side transition wire portion of the second side coil end conductor portion.

In this case, by joining a plurality of coil conductors in the second side transition wire portion of the second side coil end conductor portion, a joint can be eliminated from the first side coil end conductor portion. As a result, an increase in the amount by which the first side coil end conductor portion projects in the inner circumferential (inner radial) direction can be prevented.

Further, the coil conductors of the three phases are preferably each constituted by an angular wire conductor, and formed in a wave-wound shape in which the angular wire is positioned alternately in an axial first side coil end conductor portion and an axial second side coil end conductor portion from an interior of the slot and travels around the stator core in the circumferential direction. In the axial first side coil end conductor portion, each of the coil conductors of a V phase coil is preferably offset in the axial direction of the stator core in a central part of the stator core in the circumferential direction so as to include an inside part positioned on a circumferential first side and the axial inner side of the stator core, and an outside part positioned on a circumferential second side and the axial outer side of the stator core. Each of the coil conductors of a U phase coil is preferably disposed to overlap the inside part of each of the coil conductors of the V phase coil on the axial outer side of the stator core, and each of the coil conductors of a W phase coil is preferably disposed to overlap the outside part of each of the coil conductors of the V phase coil on the axial inner side of the stator core.

In this case, the coil conductors of the three phases can be arranged and disposed more compact in the first side coil end conductor portion (the axial first side coil end conductor portion). As a result, the amount by which the first side coil end conductor portion projects from the axial end surface of the stator core can be reduced even further.

Furthermore, in the manufacturing method for a stator according to the present invention, after the molding step described above and before the insertion step described above, all of the coil conductors of the three phases are combined prior to insertion into the slots to form a coil conductor assembly, and in the insertion step, the coil conductor assembly is preferably inserted into the slots along the axial direction.

In this case, all of the coil conductors of the three phases can be inserted into the stator core at once as the coil conductor assembly, and therefore the stator can be assembled easily.

Further, in the molding step, the first side transition wire portions of the coil conductors of the two phases, from among the coil conductors of the three phases, are preferably molded so as to be offset from each other in the axial direction, and the first side transition wire portion of the coil conductor of the remaining phase is preferably bent in the axial direction between circumferential end portions of the first side transition wire portions of the coil conductors of the two phases so as to be disposed to overlap the first side transition wire portions of the coil conductors of the two phases in the axial direction.

In this case, the first side transition wire portions in the first side coil end conductor portions of the three phases can be disposed within a two-phase axial width range, and therefore the axial length of the stator can be reduced.

EMBODIMENTS

A first embodiment of a stator and a manufacturing method thereof according to the present invention will be described below with reference to FIGS. 1 to 15.

First Embodiment

As shown in FIG. 1, a stator 1 according to a first embodiment is formed by disposing coil conductors 3U, 3V, 3W of three phases, namely a U phase, a V phase, and a W phase, in a distributed winding faun in a plurality of slots 21 of a stator core 2.

Figure 2:
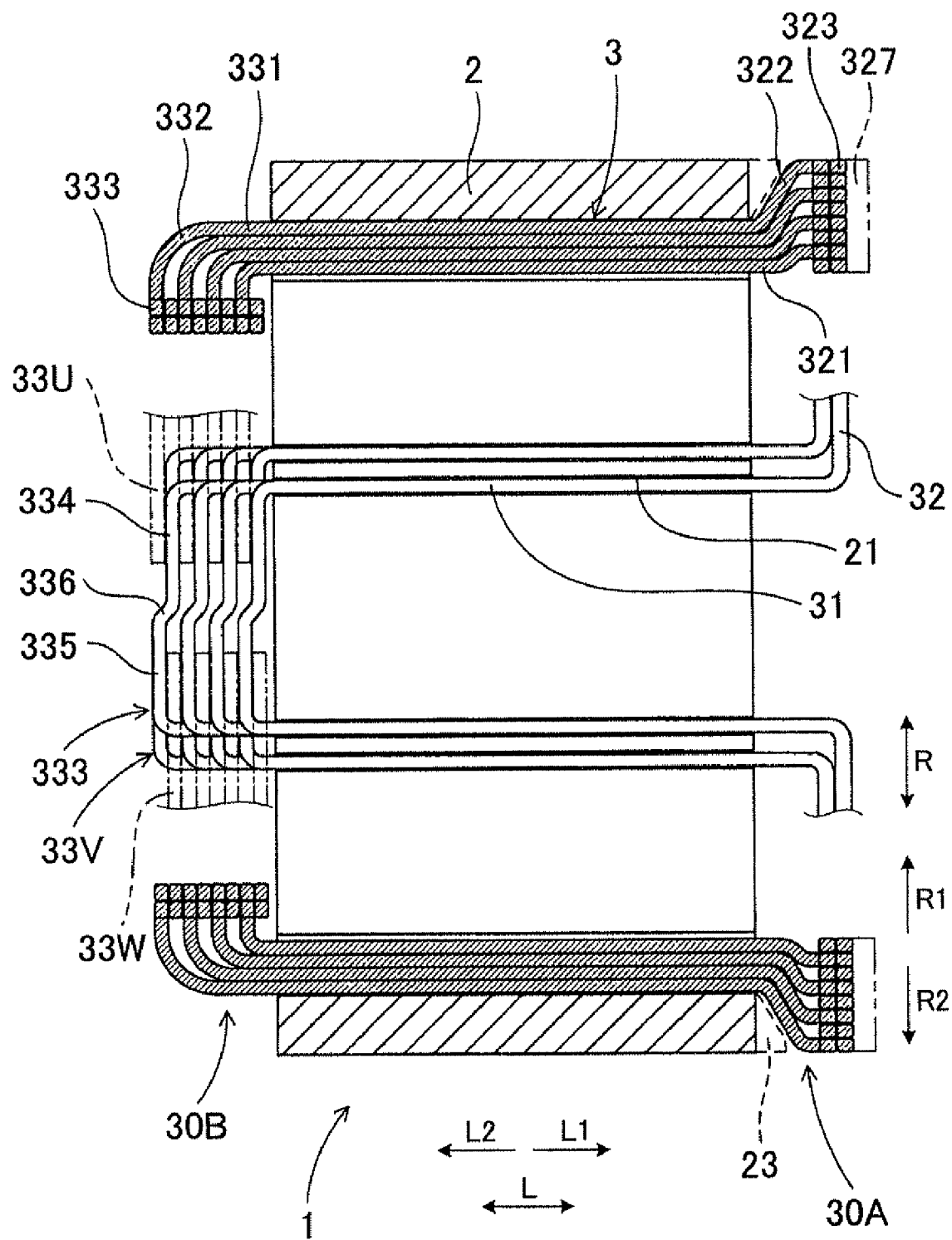
FIG. 2 is an illustrative sectional view showing the stator according to the first embodiment cut in an axial direction.
Figure 3:
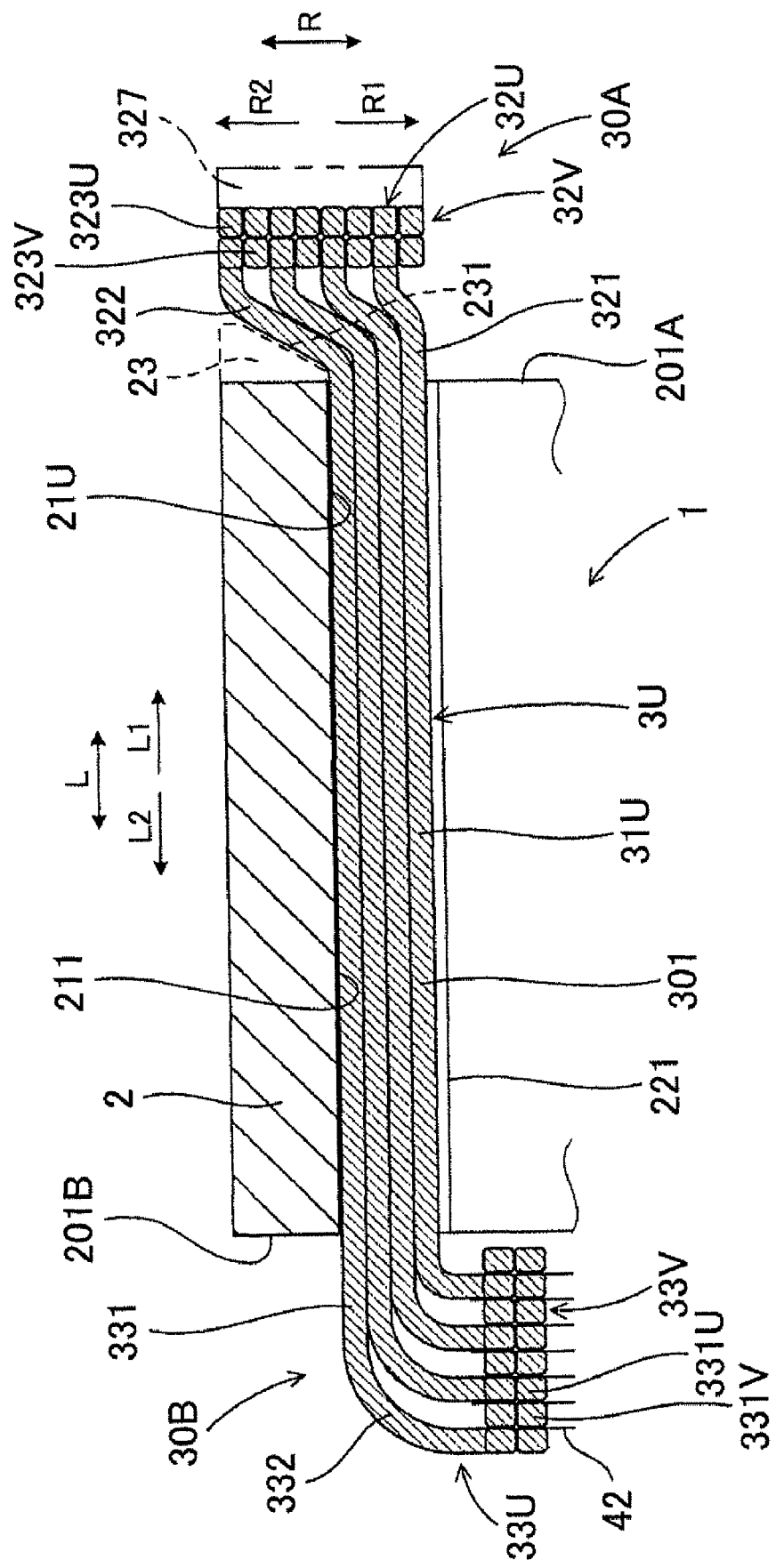
FIG. 3 is an illustrative enlarged sectional view showing the stator according to the first embodiment cut in the axial direction.
Figure 4:
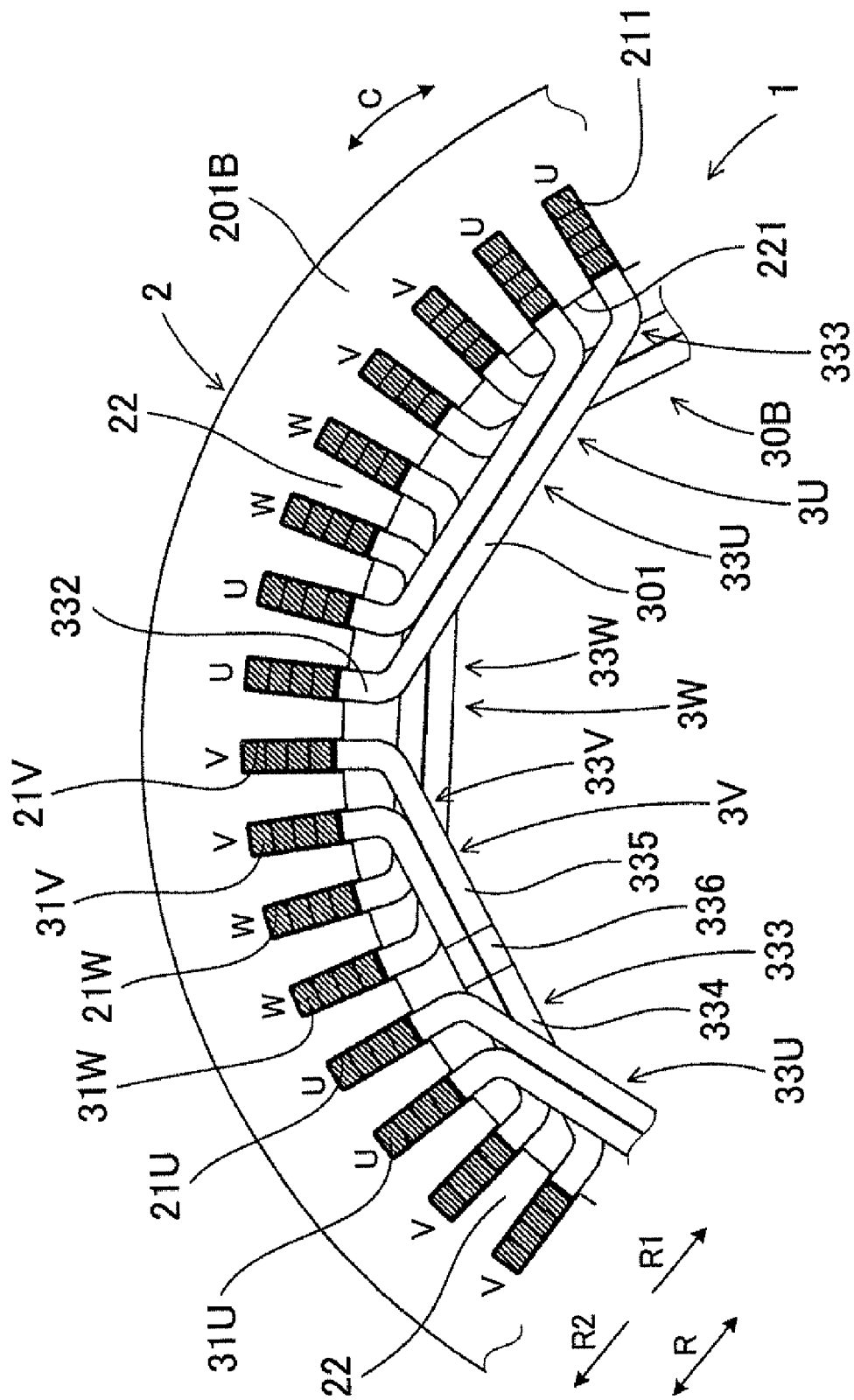
FIG. 4 is an illustrative pattern diagram showing a formation state of a second side coil end conductor portion according to the first embodiment.

As shown in FIGS. 2 to 4, the coil conductors 3U, 3V, 3W of the three phases are each constituted by an electric wire 301 in which an insulating film made of insulating resin or the like is formed around the entire circumference of a conductor portion (conductor base material) made of copper or the like, and the electric wire 301 is constituted by a flat wire having a substantially square cross-section. Further, the electric wire 301 is bent such that the coil conductors 3U, 3V, 3W of the three phases each include a slot conductor portion 31 that is disposed in the slot 21 parallel to an axial direction L of the stator core 2, and coil end conductor portions 32, 33 that connect the slot conductor portions 31 to each other on the outside of an axial end surface 201 of the stator core 2. Furthermore, the coil conductors 3U, 3V, 3W of the three phases are respectively formed in a wave-wound shape in which the coil end conductor portions 32, 33 are connected alternately to an axial second side L1 and an axial first side L2 of the slot conductor portion 31 a plurality of times so as to travel around the stator core 2 in a circumferential direction C.

As shown in FIG. 3, the second side coil end conductor portion 32 positioned on the axial second side L1 of the stator core 2 is constituted by a second side transition wire portion (second side coil end circumferential portion) 323 extending in the circumferential direction C of the stator core 2, and second side coil end connecting portions 321, 322 connecting the second side transition wire portion 323 to the slot conductor portion 31. Further, as shown in FIGS. 3 and 4, the first side coil end conductor portion 33 positioned on the axial first side L2 of the stator core 2 is constituted by a first side transition wire portion (first side coil end circumferential portion) 333 extending in the circumferential direction C of the stator core 2, and first side coil end connecting portions 331, 332 connecting the first side transition wire portion 333 to the slot conductor portion 31.

In the coil conductors 3U, 3V, 3W of the three phases, the second side coil end conductor portion 32 serving as the coil end conductor portion positioned on the axial second side L1 is bent toward an outer peripheral side (in an outer diameter direction) of the stator core 2 such that the entirety thereof is positioned further toward a radial outer side R2 than an inner peripheral end surface 221 of a tooth 22 positioned between the slots 21.

Further, in the coil conductors 3U, 3V, 3W of the three phases, the first side coil end connecting portion 332 of the first side coil end conductor portion 33 serving as the coil end conductor portion positioned on the axial first side L2 is bent toward an inner peripheral side of the stator core 2 such that the first side transition wire portion 333 is positioned further toward a radial inner side R1 than the inner peripheral end surface 221 of the tooth 22.

As shown in FIGS. 2 and 3, the second side transition wire portion 323 of the second side coil end conductor portion 32 in each of the coil conductors 3U, 3V, 3W of each of the three phases is disposed to overlap the second side transition wire portion 323 of the second side coil end conductor portion 32 in a coil conductor 3 of another phase in a radial direction R of the stator core 2.

Further, the first side transition wire portion 333 of the first side coil end conductor portion 33 in the coil conductors 3U, 3V, 3W of each of the three phases is disposed to overlap the first side transition wire portion 333 of the first side coil end conductor portion 33 in a coil conductor 3 of another phase in the axial direction L of the stator core 2.

The stator 1 and a manufacturing method thereof according to the first embodiment will now be described in detail with reference to FIGS. 1 to 15.

Figure 5:
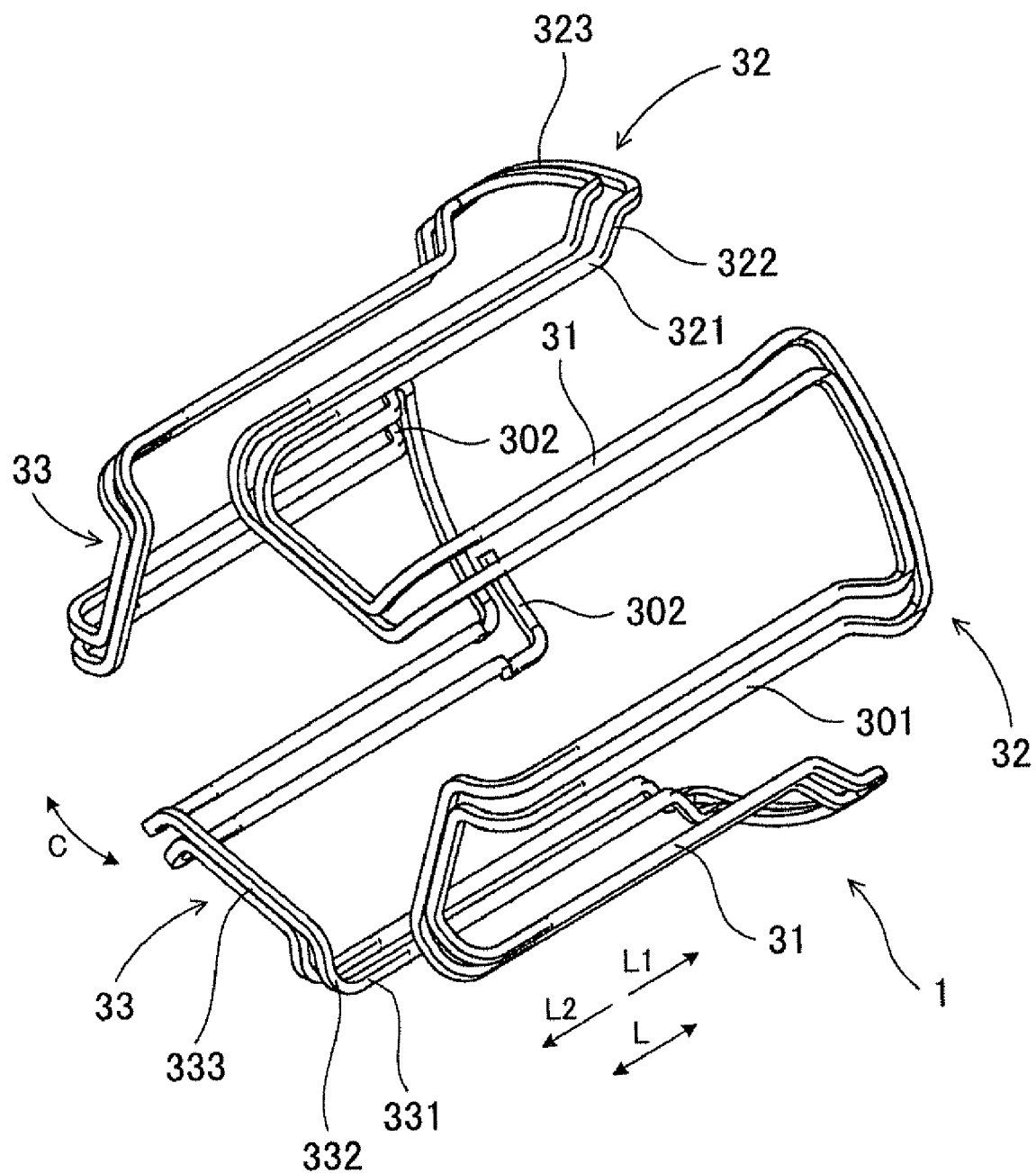
FIG. 5 is a perspective view showing coil conductors of each phase according to the first embodiment.

As shown in FIG. 1, the stator 1 according to the first embodiment is used in a three-phase alternating current motor for a hybrid car, an electric automobile, or the like, and is formed by incorporating the coil conductors 3U, 3V, 3W of the three phases, namely the U phase, the V phase, and the W phase, in the stator core 2. As shown in FIG. 5, the coil conductor 3 is bent into a wave-wound shape.

Figure 8:
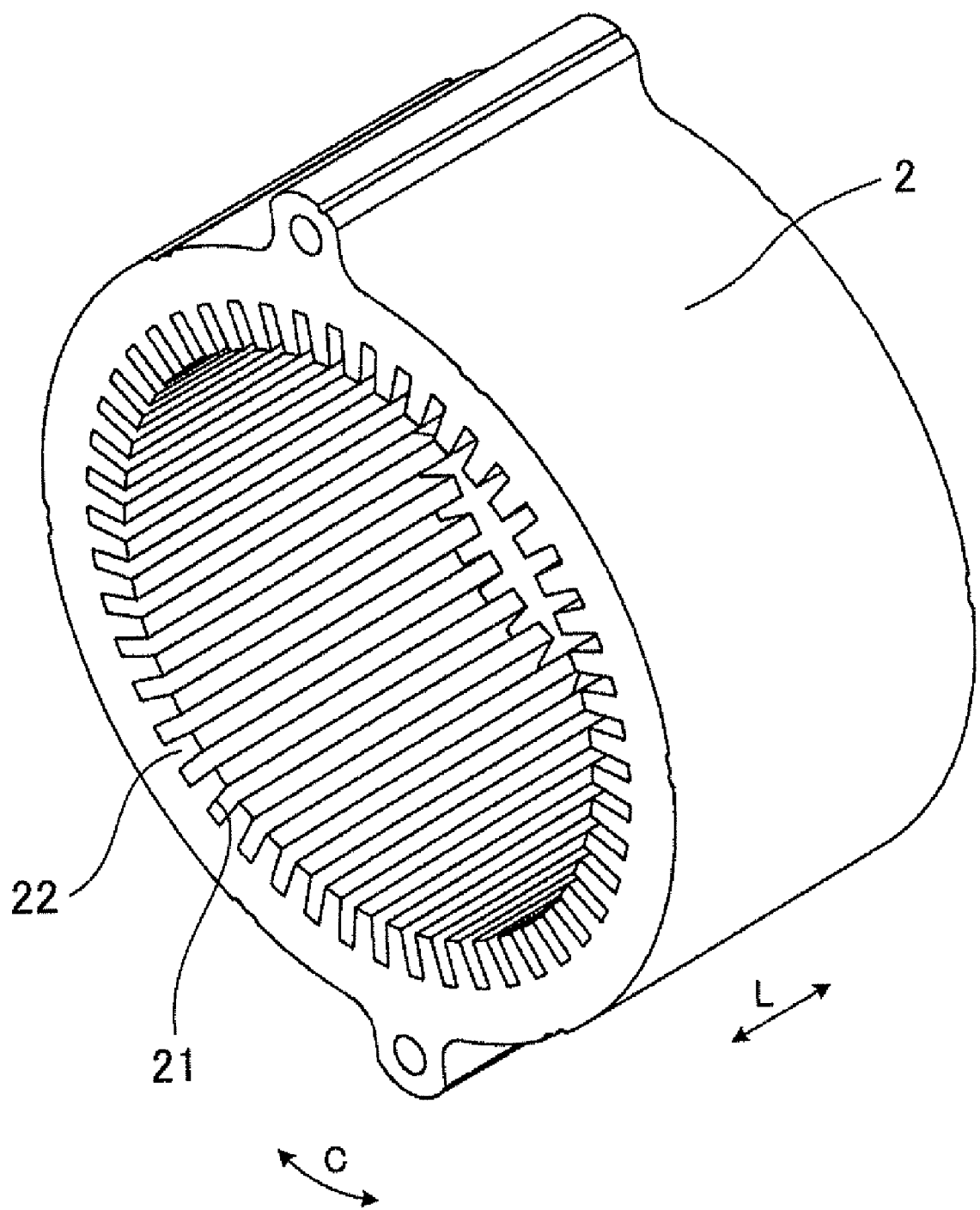
FIG. 8 is a perspective view showing a stator core according to the first embodiment.

As shown in FIGS. 4 and 8, the plurality of slots 21 of the stator core 2 are constituted such that a U phase slot 21U in which a slot conductor portion 31U of the U phase coil conductor 3U is disposed, a V phase slot 21V in which a slot conductor portion 31V of the V phase coil conductor 3V is disposed, and a W phase slot 21W in which a slot conductor portion 31W of the W phase coil conductor 3W is disposed are provided in twos adjacent to each other in the circumferential direction C of the stator core 2. Note that FIG. 4 is a pattern diagram showing the formation of the first side coil end conductor portion 33 on the outside of an end surface 201B of the stator 1 on the axial first side L2.

Figure 10:
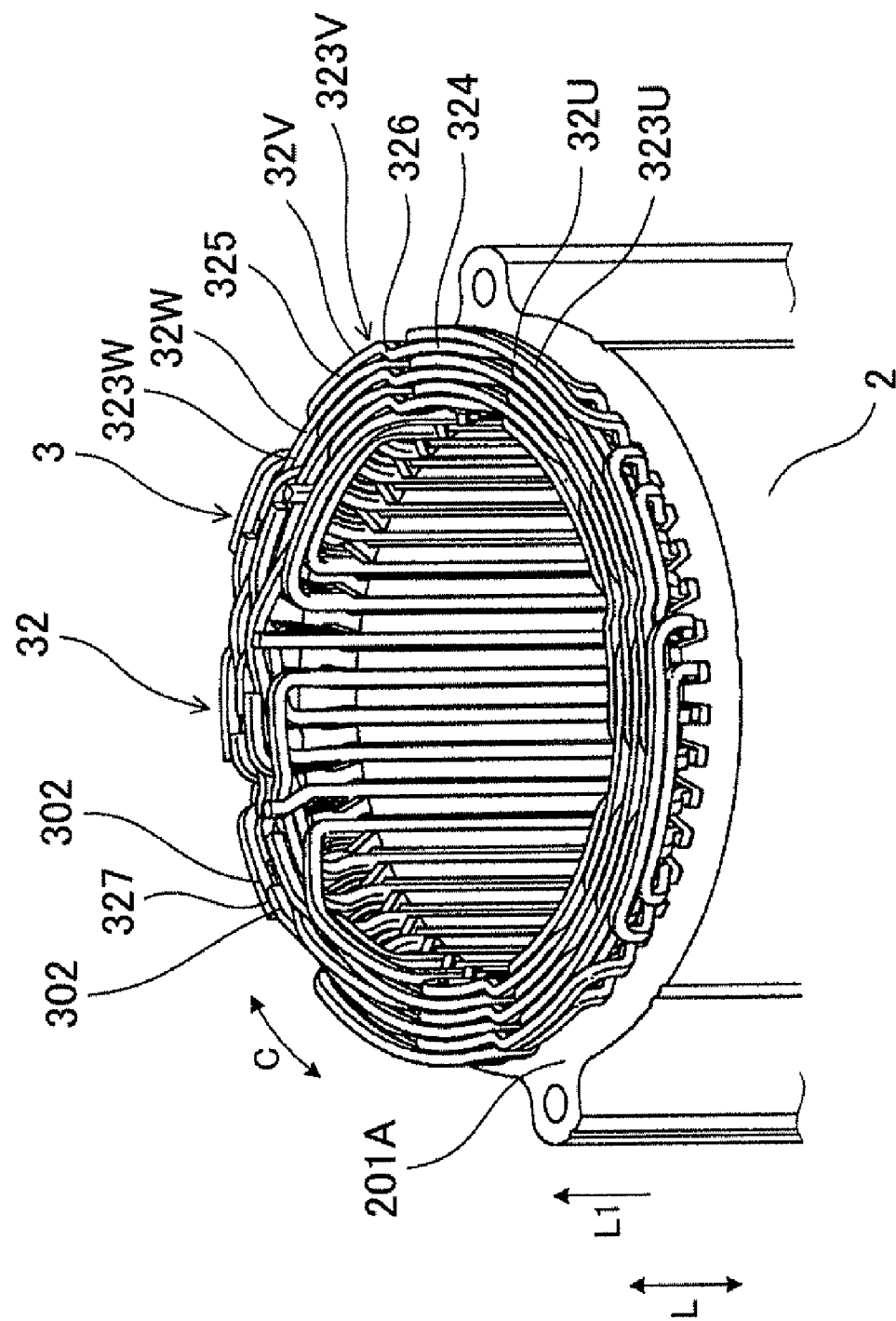
FIG. 10 is a perspective view showing a first side coil end portion of the stator according to the first embodiment.

As shown in FIGS. 2, 3 and 10, the coil end connecting portions 321, 322 of the second side coil end conductor portion 32 according to the first embodiment are formed from an axial rectilinear portion 321 formed parallel to the slot conductor portion 31 as a continuation of the slot conductor portion 31, and an outwardly bent portion 322 that is bent toward the radial outer side R2 relative to the axial rectilinear portion 321. Further, the second side transition wire portion 323 according to the first embodiment is formed from a coil end curved portion 323 that connects the outwardly bent portions 322 to each other in an arc shape extending in the circumferential direction C of the stator core 2.

The coil conductor 3 of each phase is formed by raising the two slot conductor portions 31 of the same phase disposed in adjacent slots 21 of the same phase from the second side coil end conductor portion 32 disposed on the outside of the end surface 201A of the axial second side L1 of the stator core 2 to form the axial rectilinear portion 321, then bending the slot conductor portions 31 toward the radial outer side R2 relative to the axial rectilinear portion 321 to form the outwardly bent portion 322, and then connecting the outwardly bent portions 322 to each other in an arc shape extending in the circumferential direction C of the stator core 2 to form the coil end curved portion 323. Further, the coil end curved portions 323 of the second side coil end conductor portions 32 of the same phase are disposed in the circumferential direction C in an overlapping state such that two coil end curved portions 323 are aligned in the axial direction L of the stator core 2.

As shown in FIGS. 2 to 4, the coil end connecting portions 331, 332 of the first side coil end conductor portion 33 according to the first embodiment are formed from an axial rectilinear portion 331 formed parallel to the slot conductor portion 31 as a continuation of the slot conductor portion 31, and an inwardly bent portion 332 that is bent toward the radial inner side R1 relative to the axial rectilinear portion 331. Further, the first side transition wire portion 333 according to the first embodiment is formed from a coil end rectilinear portion 333 that connects the inwardly bent portions 332 to each other in a rectilinear shape.

The coil conductor 3 of each phase is formed by raising the two slot conductor portions 31 of the same phase disposed in adjacent slots 21 of the same phase from the first side coil end conductor portion 33 disposed on the outside of the end surface 201B of the axial first side L2 of the stator core 2 to form the axial rectilinear portion 331, then bending the slot conductor portions 31 toward the radial inner side R1 relative to the axial rectilinear portion 331 to form the inwardly bent portion 332, and then connecting the inwardly bent portions 332 to each other in a rectilinear shape in a perpendicular direction to the axial direction L of the stator core 2 to form the coil end rectilinear portion 333. Further, the coil end rectilinear portions (first side transition wire portions) 333 of the first side coil end conductor portions 33 are disposed in a perpendicular direction to the axial direction L in an overlapping state such that two coil end rectilinear portions 333 are aligned in the radial direction R of the stator core 2.

Figure 11:
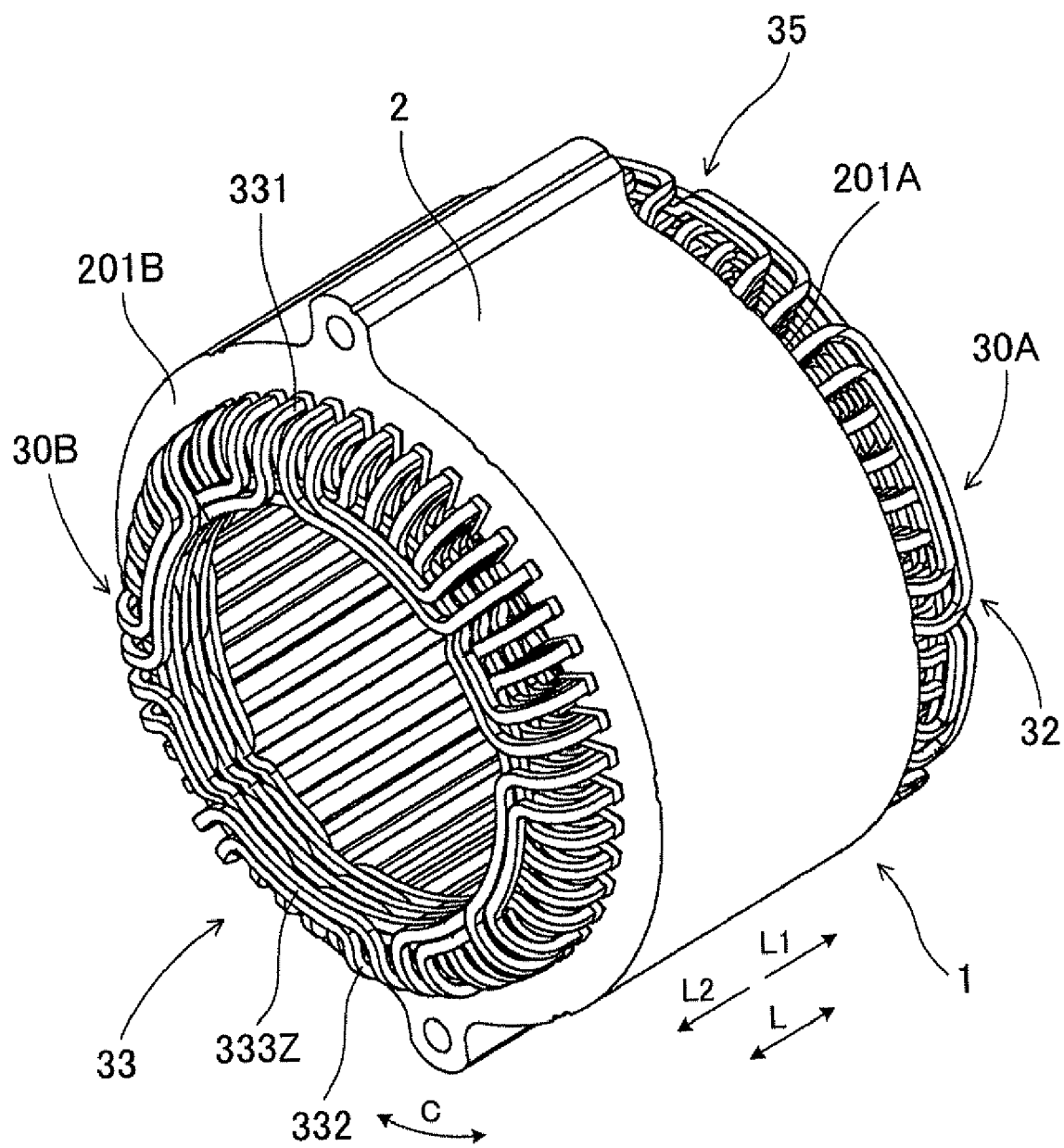
FIG. 11 is a perspective view showing another stator according to the first embodiment from the second side coil end portion.

As shown in FIG. 11, the first side coil end conductor portion 33 may be constituted using a curved (arc-shaped) coil end curved portion 333Z that extends in the circumferential direction C of the stator core 2 instead of the coil end rectilinear portion (transition wire portion) 333.

As shown in FIG. 10, a circular inner peripheral side end portion is formed by the coil end curved portions 323 of the three phases in the second side coil end conductor portions 32 of the coil conductors 3U, 3V, 3W of the three phases. As shown in FIGS. 1 and 4, a polygonal inner peripheral side end portion is formed by the coil end rectilinear portions (first side transition wire portions) 333 of the three phases in the first side coil end conductor portions 33 of the coil conductors 3U, 3V, 3W of the three phases. The coil conductors 3 of the respective phases have an identical sectional area in the slot conductor portion 31 and the coil end conductor portion 32.

As shown in FIGS. 3 and 4, four slot conductor portions 31 are disposed in series in the radial direction R within the slot 21 of each phase in the stator core 2. In the stator 1, the coil conductors 3U, 3V, 3W of the U phase, the V phase and the W phase are disposed in eight turns (eight times around the circumference) when the two adjacent slots 21 of each phase are combined.

Further, as shown in FIG. 3, a second side coil end portion 30A is formed on the outside of the end surface 201A of the axial second side L1 of the stator core 2 in the radial direction R of the stator core 2 by disposing two second side coil end conductor portions 32 of the same phase, which are aligned in the axial direction L of the stator core 2, between two second side coil end conductor portions 32 of the same phase aligned in the axial direction L of the stator core 2.

FIG. 3 shows a state in which two V phase second side coil end conductor portions 32V aligned in the axial direction L of the stator core 2 are disposed between two U phase second side coil end conductor portions 32U aligned in the axial direction L of the stator core 2 in the radial direction R of the stator core 2 within the second side coil end portion 30A.

Further, as shown in FIG. 3, a first side coil end portion 30B is formed on the outside of the end surface 201B of the axial first side L2 of the stator core 2 in the axial direction L of the stator core 2 by disposing two first side coil end conductor portions 33 of another phase, which are aligned in the radial direction R of the stator core 2, between two first side coil end conductor portions 33 of another phase aligned in the radial direction R of the stator core 2.

FIG. 3 shows a state in which two V phase first side coil end conductor portions 33V aligned in the radial direction R of the stator core 2 are disposed between two U phase first side coil end conductor portions 33U aligned in the radial direction R of the stator core 2 in the axial direction L of the stator core 2 within the first side coil end portion 30B.

Figure 6:
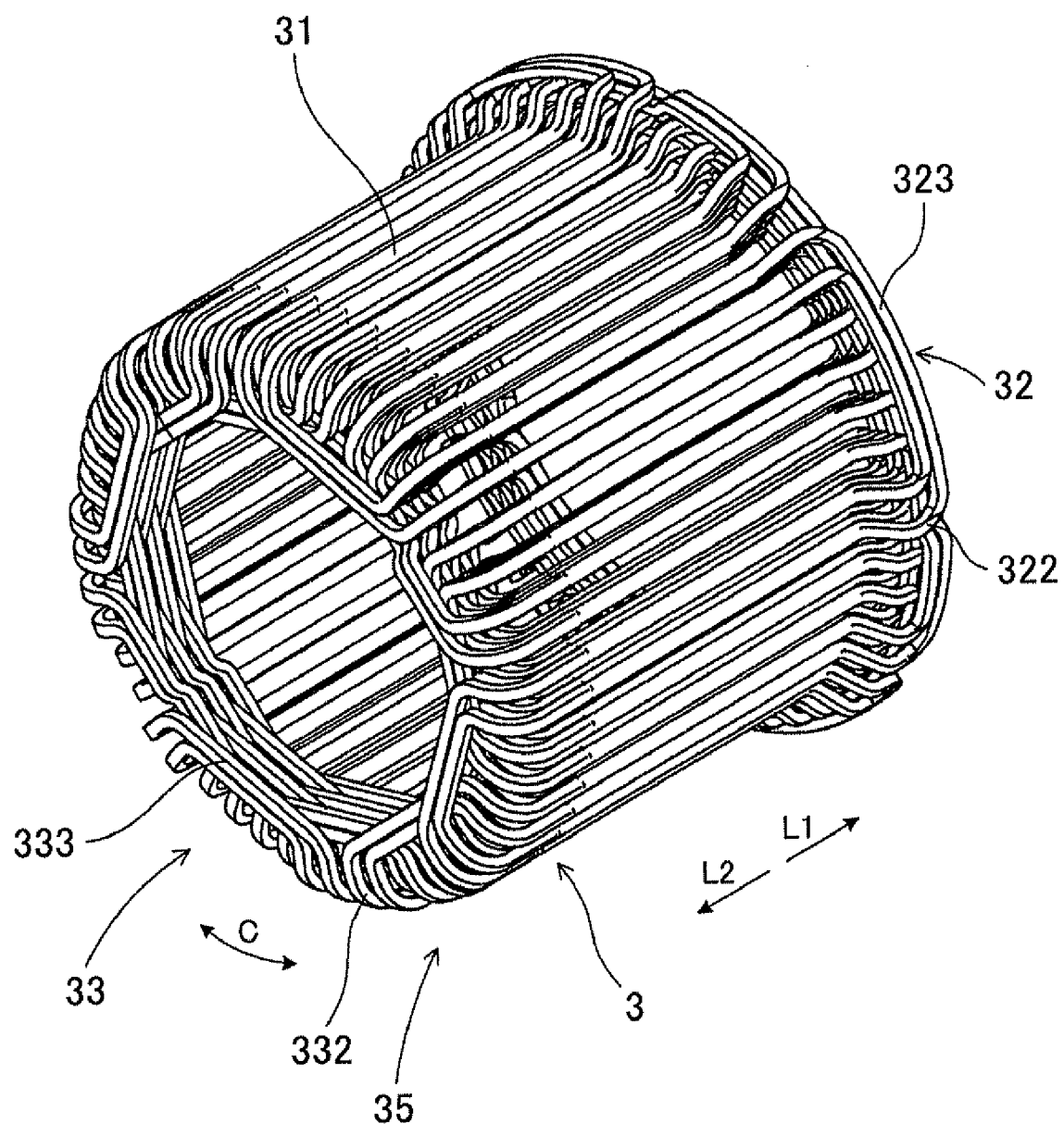
FIG. 6 is a perspective view showing a coil conductor assembly formed by combining coil conductors of three phases according to the first embodiment.

As shown in FIG. 5, the coil conductors 3 of the respective phases are formed to travel around the stator core 2 twice in the circumferential direction C, and as shown in FIGS. 2 and 6, the coil conductors 3 of the respective phases are disposed so as to overlap in a plurality of stages in the radial direction R of the stator core 2.

As shown in FIG. 10, conductor end portions 302 of the coil conductors 3 of the same phase are joined to each other in the second side transition wire portion 323 of the second side coil end conductor portion 32 to form joint parts 327 that overlap in the radial direction R.

As shown in FIG. 5, in the stator 1, the wave-wound coil conductors 3 of each phase that travel around the stator core 2 twice in the circumferential direction C are formed by disposing the slot conductor portions 31 in adjacent slots 21 of the same phase. More specifically, the coil conductors 3 of the same phase, in which the slot conductor portions 31 are disposed in adjacent slots 21 of the same phase, are constituted by a single continuous electric wire 301 that travels around the stator core 2 once. Further, the coil conductors 3U, 3V, 3W of the three phases are formed by joining the wave-wound coil conductors 3 that travel twice around the stator core 2 continuously in the circumferential direction C in the respective conductor end portions 302 so as to be disposed in the stator core 2 in a number of rounds that is an integral multiple of 2 (8 in this example). By using the wave-wound coil conductors 3 of the respective phases that travel around the stator core 2 twice, the number of joint locations on the coil conductors 3U, 3V, 3W of the three phases disposed in the stator core 2 can be approximately halved in comparison with a case in which wave-wound coil conductors that travel around a stator core once are joined by welding or the like. Note that in FIGS. 2 and 3, the joint parts 327 of the respective conductor end portions 302 of the coil conductors 3 are indicated by two-dot chain lines.

As shown in FIG. 10, in the circumferential direction C of the stator 1 on the outside of the end surface 201A of the axial second side L1 of the stator core 2, there formed are a portion in which the U phase second side coil end conductor portion 32U and the V phase second side coil end conductor portion 32V are aligned in the radial direction R, a portion in which the V phase second side coil end conductor portion 32V and the W phase second side coil end conductor portion 32W are aligned in the radial direction R, and a portion in which the U phase second side coil end conductor portion 32U and the W phase second side coil end conductor portion 32W are aligned in the radial direction R.

Further, as shown in FIGS. 1 and 4, in the circumferential direction C of the stator 1 on the outside of the end surface 201B of the axial first side L2 of the stator core 2, there formed are a portion in which the U phase first side coil end conductor portion 33U and the V phase first side coil end conductor portion 33V are aligned in the axial direction L, a portion in which the V phase first side coil end conductor portion 33V and the W phase first side coil end conductor portion 33W are aligned in the axial direction L, and a portion in which the U phase first side coil end conductor portion 33U and the W phase first side coil end conductor portion 33W are aligned in the axial direction L.

Further, as shown in FIG. 10, in the second side coil end conductor portions 32 of the three phases according to the first embodiment, the V phase coil end curved portion 323V is formed in a bent shape having an inside part 324 disposed perpendicular to the axial direction L of the stator core 2, an outside part 325 disposed perpendicular to the axial direction of the stator core 2 but farther toward the axial outer side than the inside part 324, and a connecting part 326 that connects the outside part 325 to the inside part 324. Further, the U phase coil end curved portion 323U is disposed to overlap the inside part 324 on the axial outer side, and the W phase coil end curved portion 323W is disposed to overlap the outside part 325 on the axial inner side. Further, the coil end curved portions 323 of the second side coil end conductor portions 32 of the three phases are disposed discretely at substantially equal intervals in the circumferential direction C within a two-phase radial width range.

Further, the second side coil end portion 30A is formed by repeating a condition in which the U phase coil end curved portion 323U and the W phase coil end curved portion 323W overlap the V phase coil end curved portion 323V on the radial outer side R2 and the radial inner side R1, respectively, a plurality of times (four times in the first embodiment).

As shown in FIGS. 1 and 4, in the first side coil end conductor portions 33 of the three phases according to the first embodiment, the first side transition wire portions (coil end rectilinear portions) 333U, 333W of the U phase and W phase coil conductors 3U, 3W from among the coil conductors 3 of the three phases are provided in offset positions from each other in the axial direction L. The first side transition wire portion 333V of the remaining V phase coil conductor 3V is bent in the axial direction L between the end portions in the circumferential direction C of the first side transition wire portions 333U, 333W of the U phase and W phase coil conductors 3U, 3W so as to overlap the first side transition wire portions 333U, 333W of the U phase and W phase coil conductors 3U, 3W in the axial direction L.

More specifically, as shown in FIGS. 1 and 4, in the first side coil end conductor portions 33 of the three phases according to the first embodiment, the V phase coil end rectilinear portion 333V is formed in a bent shape having an inside part 334 disposed perpendicular to the axial direction L of the stator core 2, an outside part 335 disposed perpendicular to the axial direction of the stator core 2 but further toward the axial outer side than the inside part 334, and a connecting part 336 that connects the outside part 335 to the inside part 334. Further, the U phase coil end rectilinear portion 333U is disposed to overlap the inside part 334 on the axial outer side, and the W phase coil end rectilinear portion 333W is disposed to overlap the outside part 335 on the axial inner side. Further, the coil end rectilinear portions 333 of the first side coil end conductor portions 33 of the three phases are disposed discretely at substantially equal intervals in the circumferential direction C within a two-phase axial width range.

Further, the first side coil end portion 30B is formed by repeating a condition in which the U phase coil end rectilinear portion 333U and the W phase coil end rectilinear portion 333W overlap the V phase coil end rectilinear portion 333V on the axial outer side and the axial inner side, respectively, a plurality of times (four times in the first embodiment).

Further, as shown in FIG. 3, the slot conductor portions 31 of each phase are disposed in the slots 21 of each phase so as to overlap in the radial direction R.

The first side transition wire portion 333, which is connected to an outermost peripheral side slot conductor portion 31 disposed on an outermost peripheral side in the radial direction R, from among the slot conductor portions 31 disposed in the slots 21 of each phase so as to overlap in the radial direction R of the stator core 2, is disposed farthest away from the stator core 2 in the axial direction L. Further, the first side transition wire portion 333 connected to the slot conductor portion 31 that overlaps an inner peripheral side of the outermost peripheral side slot conductor portion 31 is disposed on the stator core 2 side (the inner side of the axial direction L) so as to overlap the first side transition wire portion 333 connected to the outermost peripheral side slot conductor portion 31 in the axial direction L.

Further, in the coil conductors 3U, 3V, 3W of the three phases, a radius of curvature of the inwardly bent portion 332 of the first side coil end conductor portion 33 connected to the inner peripheral side slot conductor portion 31 disposed to overlap the inner peripheral side of the outermost peripheral side slot conductor portion 31 is smaller than a radius of curvature of the inwardly bent portion 332 of the first side coil end conductor portion 33 connected to the outermost peripheral side slot conductor portion 31 positioned on the outermost peripheral side of the slots 21 of each phase.

The coil end rectilinear portion 333 of the first side coil end conductor portion 33 connected to the inner peripheral side slot conductor portion 31 is disposed on the inside of the coil end rectilinear portion 333 of the first side coil end conductor portion 33 connected to the outermost peripheral side slot conductor portion 31 in the axial direction L of the stator core 2.

As shown in FIGS. 2 and 3, a core extension forming portion 23 for disposing the outwardly bent portion 322 of the second side coil end conductor portion 32 is formed as an extension of the end surface 201A of the axial second side L1 of the stator core 2. The core extension forming portion 23 may be constructed by forming an inclined surface 231 for disposing the outwardly bent portion 322 on the inner peripheral side.

By forming the core extension forming portion 23 as an extension in this manner, the length of the stator core 2 in the axial direction L can be increased. As a result, a magnetic path of a magnetic circuit formed by the stator 1 can be enlarged, thereby improving an output characteristic of a rotary electric machine constructed using the stator 1.

As shown in FIG. 3, an inter-phase insulating paper 42 may be disposed between the coil end rectilinear portions 333 of the first side coil end conductor portions 33 of the three phases. The inter-phase insulating paper 42 may be disposed between the coil end rectilinear portions 333 of different phases disposed in series in the axial direction L of the stator core 2 by disposing identically shaped papers (papers having a standardized shape) in series in the axial direction L.

Next, a method of manufacturing the above stator 1 will be described.

In the first embodiment, first, as shown in FIG. 5, three-dimensionally shaped coil conductors 3U, 3V, 3W of the three phases to be disposed in the stator core 2 are respectively molded in a molding step. At this time, the coil conductor 3 of each phase is formed in a wave-wound shape that travels around the stator core 2 in the circumferential direction C twice using the continuous single electric wire 301.

Further, in the molding step, the coil conductors 3U, 3V, 3W of the three phases are molded such that the first side transition wire portions 333 of the respective phases, which extend in the circumferential direction C in the first side coil end conductor portion 33, are disposed further toward the radial inner side R1 than the inner peripheral end surface 221 of the tooth 22, and the coil conductors 3U, 3V, 3W of the three phases are molded in different shapes such that the first side transition wire portion 333 of each phase is provided in a different position to the first side transition wire portions 333 of the other phases.

Further, the first side transition wire portions (coil end rectilinear portions) 333U, 333W of the U phase and W phase coil conductors 3U, 3W, from among the coil conductors 3U, 3V, 3W of the three phases, are molded so as to be offset from each other in the axial direction L, and the first side transition wire portion 333V of the remaining V phase coil conductor 3V is bent in the axial direction L between end portions in the circumferential direction C of the first side transition wire portions 333U, 333W of the U phase and W phase coil conductors 3U, 3W so as to overlap the first side transition wire portions 333U, 333W of the U phase and W phase coil conductors 3U, 3W in the axial direction L.

Next, as shown in FIG. 6, as a combining step, the coil conductors 3U, 3V, 3W of the three phases, respectively formed in a wave-wound shape that travels around the stator core 2 twice in the circumferential direction C, are combined to form a coil conductor assembly 35. At this time, a jig or the like may be used to ensure that the three-dimensional shape of the coil conductor assembly 35 does not collapse. In the first embodiment, the coil conductor assembly 35 is formed by combining all of the coil conductors 3U, 3V, 3W of the three phases to be disposed in the stator core 2.

Figure 7:
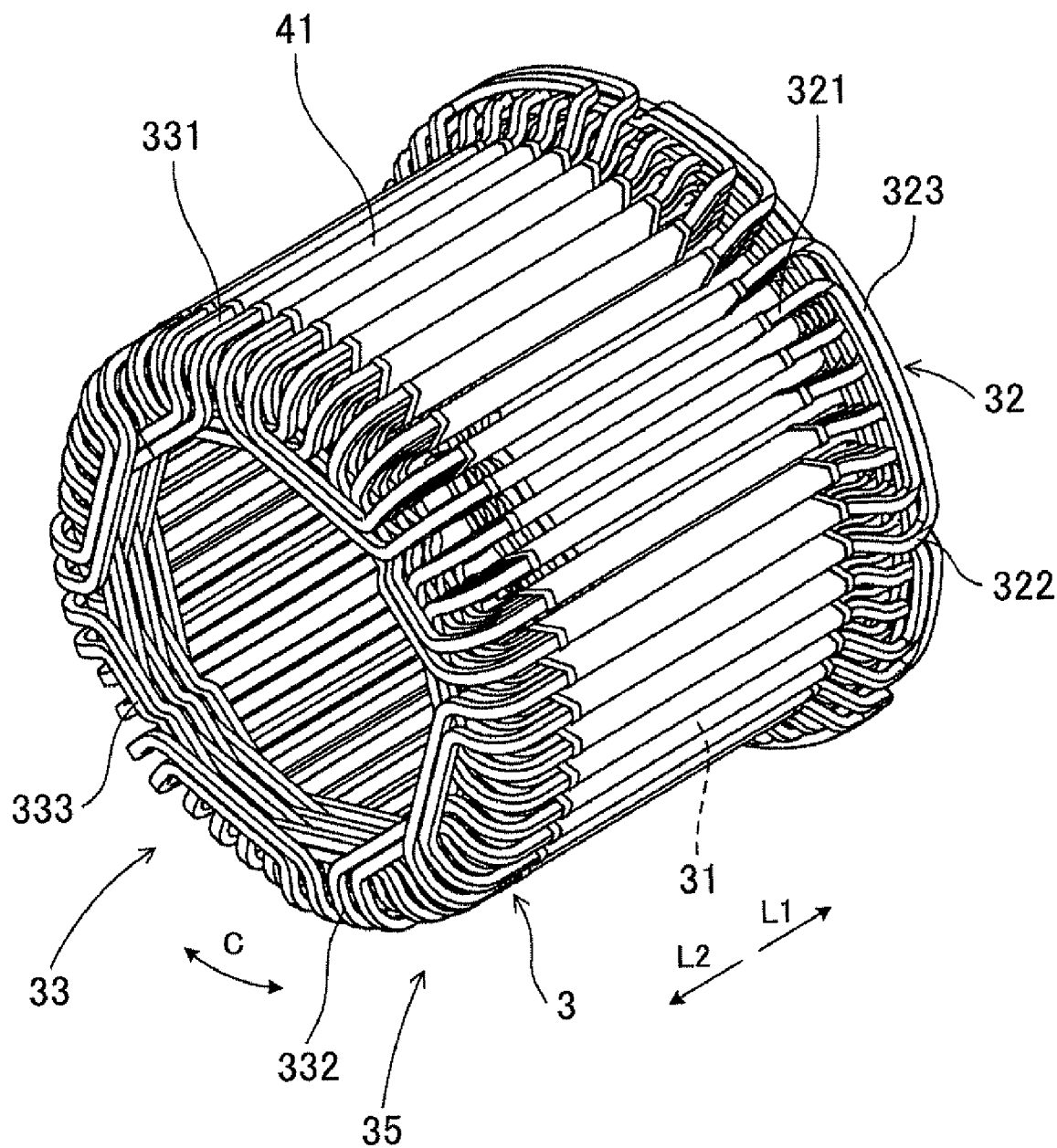
FIG. 7 is a perspective view showing the coil conductor assembly according to the first embodiment in a state where a slot insulating paper is wound around each slot conductor portion.

As shown in FIG. 7, a slot insulating paper 41 may be disposed in the respective slot conductor portions 31 of the coil conductor assembly 35 fowled by combining the coil conductors 3U, 3V, 3W of the three phases.

Figure 12:
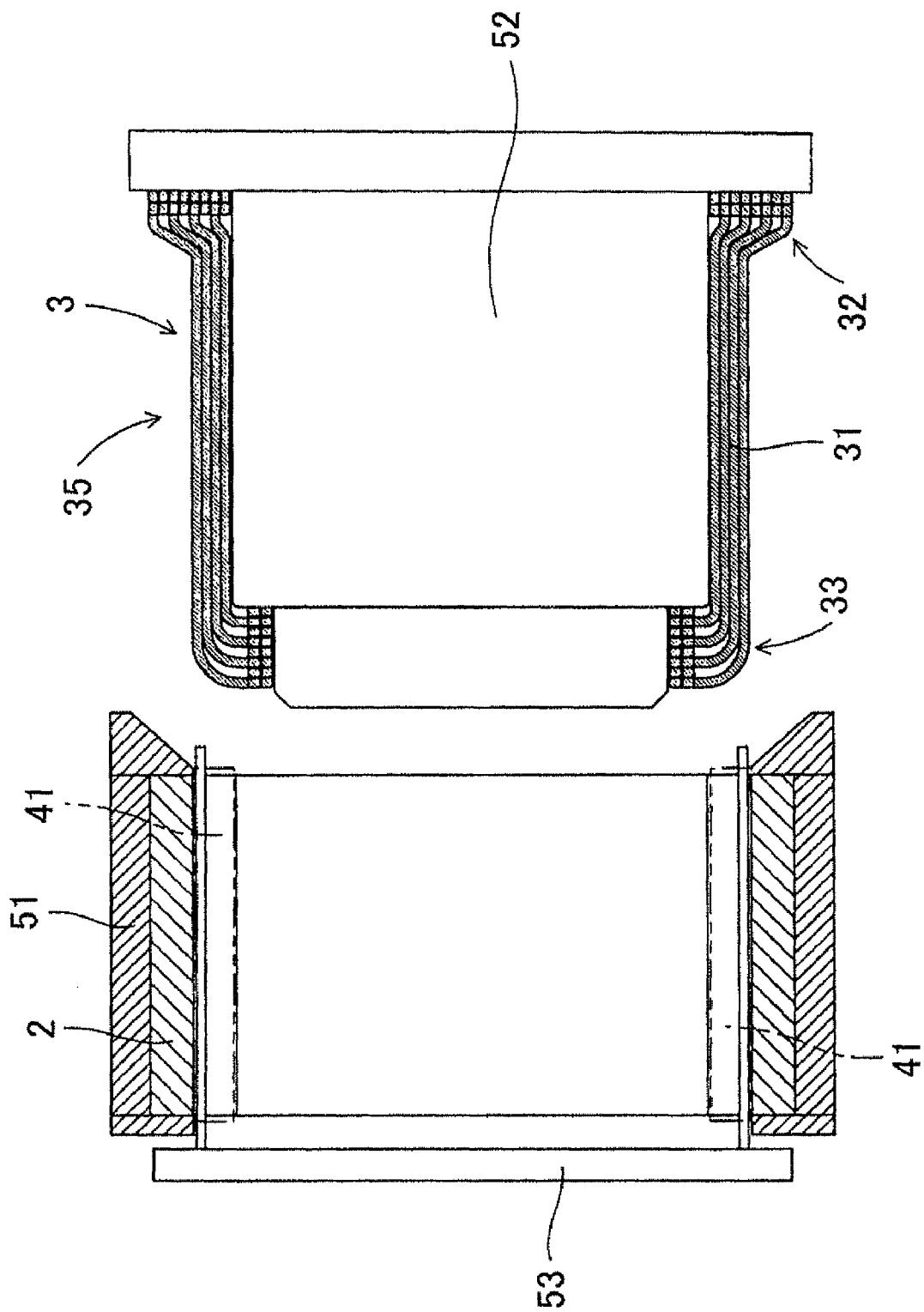
FIG. 12 is an illustrative sectional view showing the coil conductor assembly according to the first embodiment inserted into the stator core.
Figure 13:
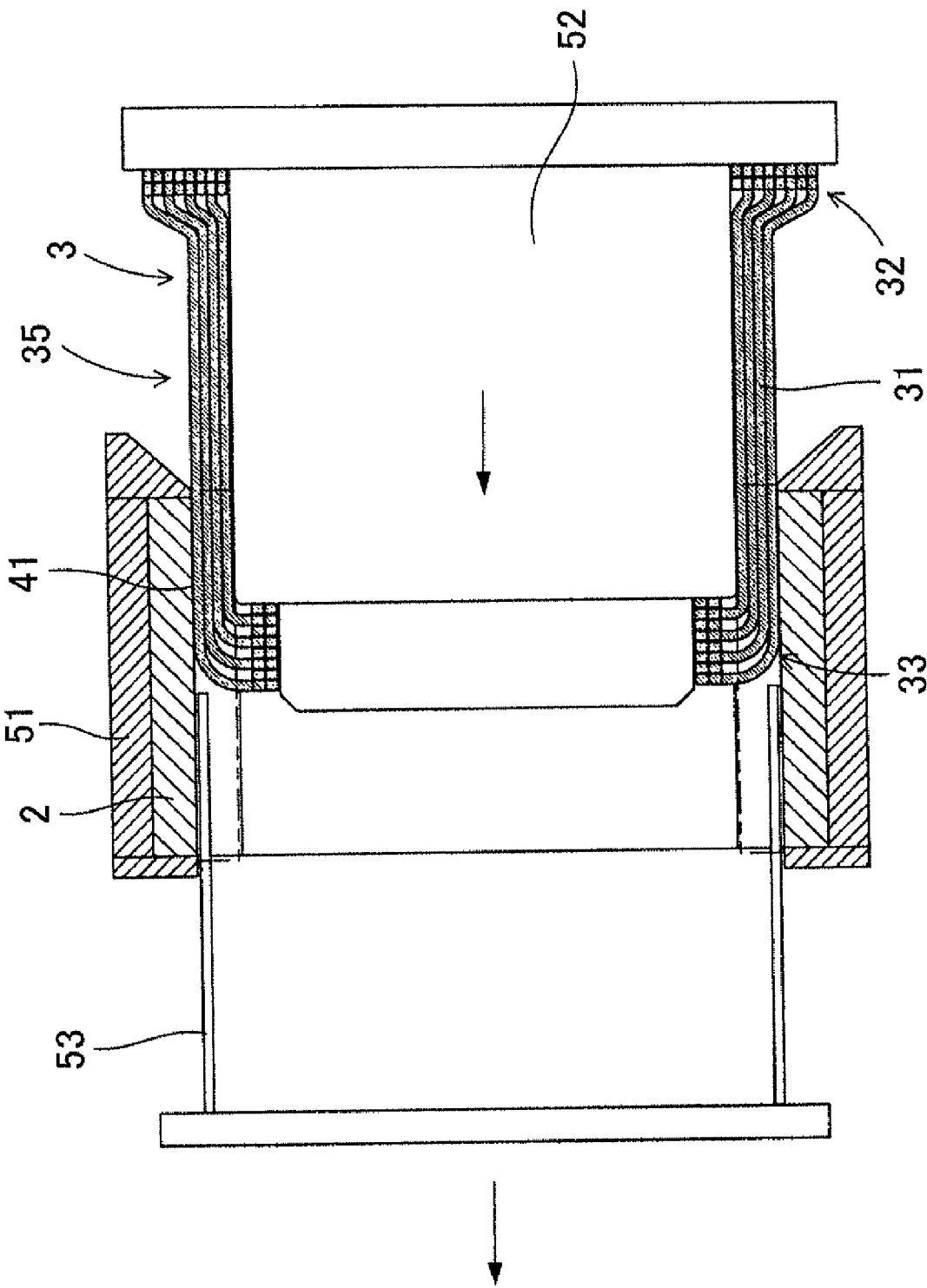
FIG. 13 is an illustrative sectional view showing the coil conductor assembly according to the first embodiment inserted into the stator core.
Figure 14:
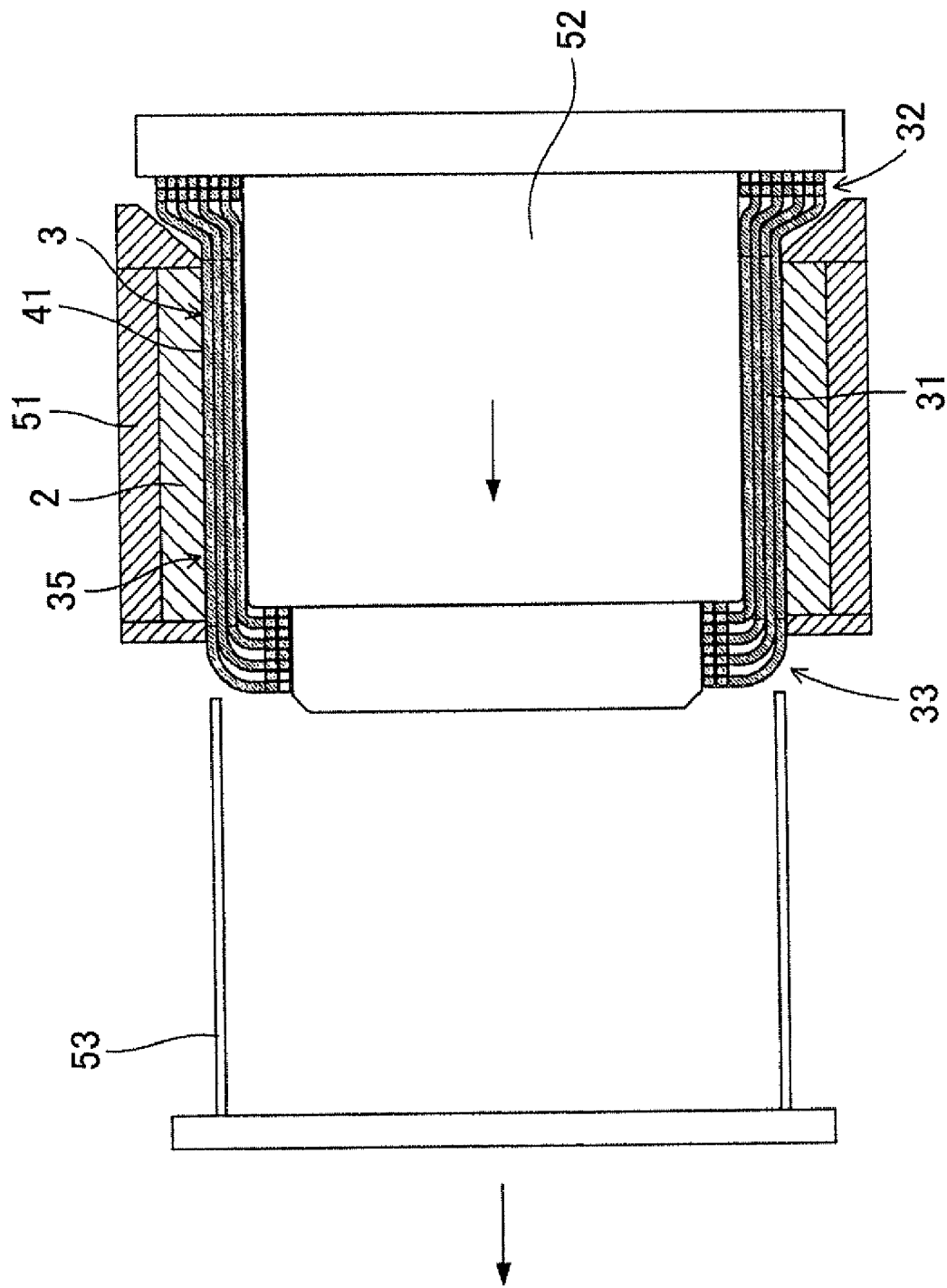
FIG. 14 is an illustrative sectional view showing the coil conductor assembly according to the first embodiment inserted into the stator core.

Next, as shown in FIGS. 12 to 14, as an insertion step, the coil conductor assembly 35 is inserted into the stator core 2 from the first side coil end conductor portion 33 side. At this time, the entire first side coil end conductor portion 33 is positioned further toward the radial inner side R1 than the outer peripheral end surfaces 211 of all of the slots 21, and therefore the coil conductor assembly 35 can be inserted in the stator core 2 from the first side coil end conductor portion 33 side easily. Thus, the coil conductor assembly 35 can be inserted into the plurality of slots 21 in the stator core 2 simultaneously from the axial end surface of the stator core 2 in the axial direction L of the stator core 2.

Thus, the stator 1 can be manufactured by inserting the coil conductor assembly 35 described above into the plurality of slots 21 in the stator core 2 simultaneously (at once), starting with the first side coil end conductor portion 33 side, along the axial direction L of the stator core 2 from the end surface 201B on the axial first side L2 of the stator core 2.

Further, as shown in FIGS. 12 to 14, in the insertion step, the stator core 2 is held by a holding jig 51 and the coil conductor assembly 35 is held by an insertion jig 52 such that, by inserting the insertion jig 52 into the holding jig 51, the coil conductor assembly 35 can be inserted into the stator core 2.

Figure 9:
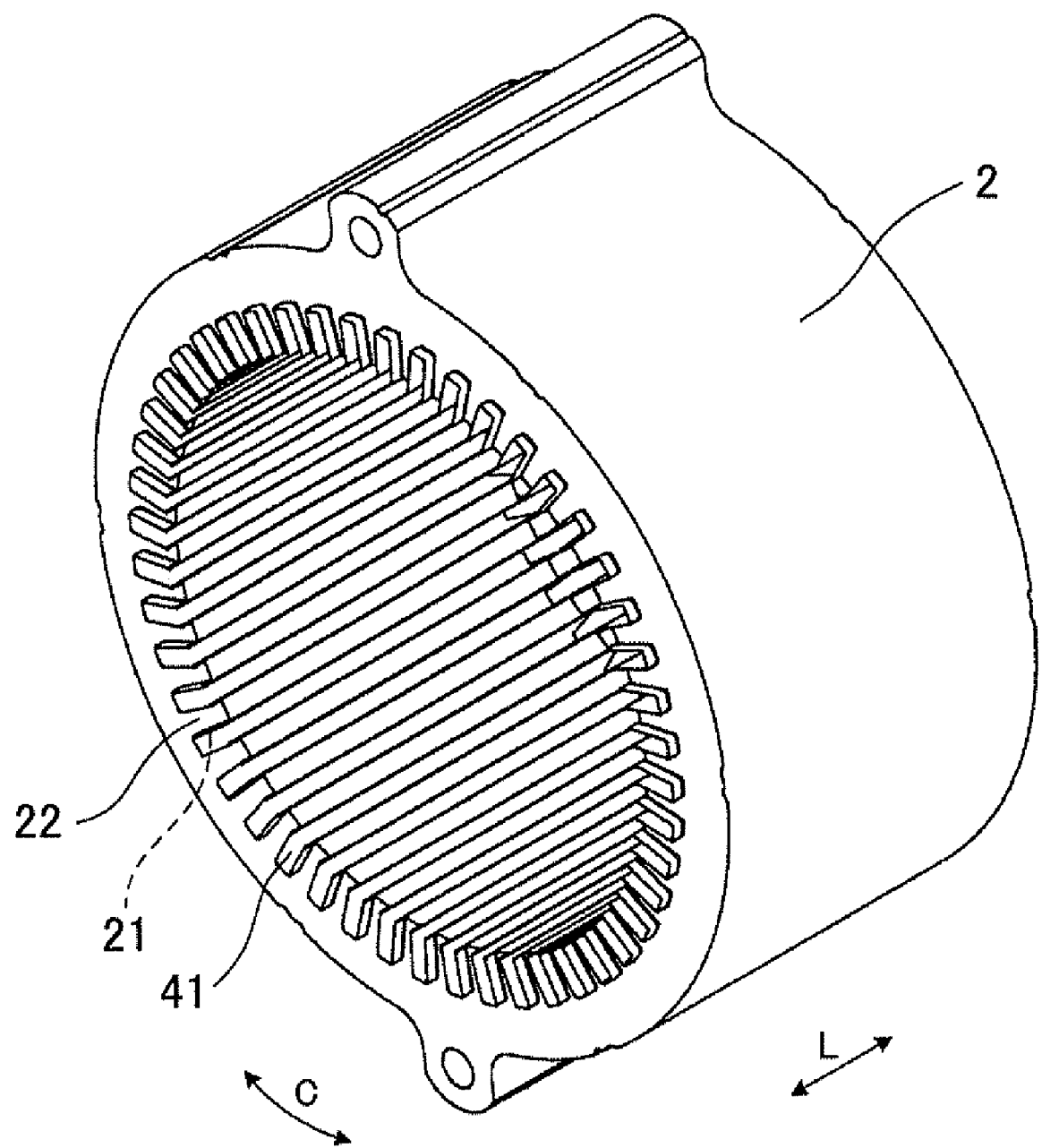
FIG. 9 is a perspective view showing the stator core according to the first embodiment in a state where the slot insulating paper is disposed in each slot.

Further, as shown in FIG. 9, the slot insulating paper 41 may be disposed in each slot 21 of the stator core 2. In this case, as shown in FIG. 12, an insulating paper holding jig 53 for ensuring that the slot insulating paper 41 does not fall out of the stator core 2 may be used on the inner peripheral side of the stator core 2 held by the holding jig 51. As shown in FIGS. 13 and 14, the insulating paper holding jig 53 can be removed gradually from the part of the stator core 2 held by the holding jig 51 into which the insertion jig 52 holding the coil conductor assembly 35 is inserted. Hence, when the coil conductor assembly 35 is inserted into the stator core 2, the slot insulating paper 41 can be prevented from falling out.

In the stator 1 according to the first embodiment, by manipulating the shape of the first side coil end conductor portion 33, the coil conductors 3U, 3V, 3W of the three phases can be inserted easily into the stator core 2 and the need for further molding of the coil conductors after insertion into the stator core 2 can be eliminated.

More specifically, as shown in FIGS. 2 and 3, in the stator 1 according to the first embodiment, the second side coil end conductor portion 32 is shaped, similarly to that of the related art, to be bent toward the outer peripheral side of the stator core 2, whereby the entire second side coil end conductor portion 32 is positioned further toward the radial outer side R2 than the inner peripheral end surface 221 of the tooth 22. Hence, when a rotor is inserted into the stator 1 formed by inserting the coil conductors 3U, 3V, 3W of the three phases into the stator core 2, the rotor can be inserted from the axial second side L1 of the stator core 2 on which the second side coil end conductor portion 32 is positioned. As a result, the rotor can be disposed relative to the stator 1 easily.

Further, as shown in FIGS. 2 and 3, the first side coil end conductor portion 33 is shaped to be bent toward the inner peripheral side of the stator core 2 such that the entire first side coil end conductor portion 33 is positioned further toward the radial inner side R1 than the outer peripheral end surface 211 of the slot 21. Hence, when the coil conductors 3U, 3V, 3W of the three phases are inserted into the stator core 2, the coil conductors 3U, 3V, 3W of the three phases can be inserted into the stator core 2 from the axial first side L2 on which the first side coil end conductor portion 33 is positioned. As a result, the coil conductors 3U, 3V, 3W of the three phases can be disposed relative to the stator core 2 easily.

Furthermore, the stator 1 according to the first embodiment can be manufactured without performing molding processing such as bending molding and compression molding on the first side coil end portion 30B after insertion into the stator core 2, with substantially no further processing after insertion. As a result, an insulating film provided on the surface of the conductor portion constituting the coil conductor 3 suffers substantially no breakage or deterioration. Therefore, the quality of the stator 1 according to the first embodiment can be improved.

Furthermore, in the stator 1 according to the first embodiment, the coil conductors 3U, 3V, 3W of the three phases can be assembled in advance prior to insertion into the stator core 2 such that all of the coil conductors 3U, 3V, 3W of the three phases can be inserted into the stator core 2 simultaneously. As a result, the coil conductors 3U, 3V, 3W of the three phases can be inserted into the stator core 2 very easily. Note that the coil conductors 3 may be inserted into the stator core 2 in predetermined units (numbers) and then joined by welding or the like in a state where the coil conductors 3 are disposed in the stator core 2.

Further, the coil end rectilinear portion 333 in the first side coil end conductor portion 33 of the coil conductors 3U, 3V, 3W of the three phases is disposed to overlap the coil end rectilinear portion 333 of the first side coil end conductor portion 33 in a coil conductor 3 of another phase in the axial direction L of the stator core 2. As a result, the first side coil end conductor portion 33 can be prevented from projecting toward the radial inner side R1, thereby preventing deformation of the first side coil end conductor portion 33 due to vibration. Hence, when a rotor is incorporated into the manufactured stator 1, the distance between the first side coil end conductor portion 33 and the rotor can be reduced, thereby making the first side coil end conductor portion 33 compact.

Figure 15:
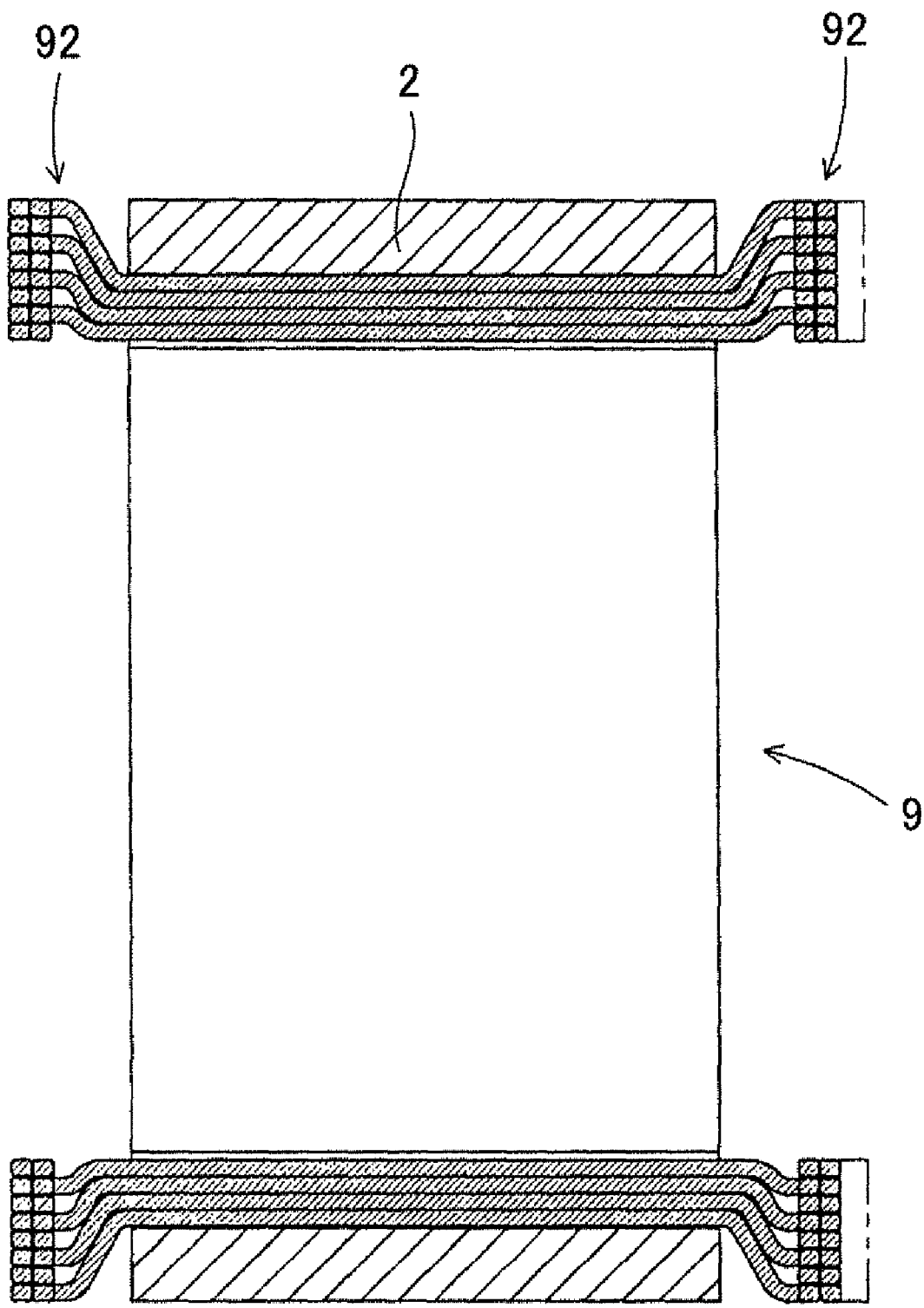
FIG. 15 is an illustrative sectional view showing a conventional stator cut in an axial direction as a reference to the first embodiment.

Note that for reference, FIG. 15 shows a conventional stator 9 formed by bending coil end conductor portions 92 on both sides toward the outer peripheral side of the stator core 2.

Hence, with the stator 1 and the manufacturing method thereof according to the first embodiment, the coil conductors 3U, 3V, 3W of the three phases can be disposed in the stator core 2 easily, the quality of the coil conductors 3U, 3V, 3W of the three phases can be maintained at a high level, and the size of the stator 1 can be reduced.

A second embodiment relating to another stator according to the present invention will now be described with reference to FIGS. 16 to 34.

The reference numerals of the respective terms (constitutional components) in FIGS. 16 to 34 of the second embodiment are applied separately to those in FIGS. 1 to 15 of the first embodiment. Hence, some of the reference numerals may be the same as those used in the first embodiment but indicate different terms (constitutional components). This applies likewise to a third embodiment to be described below.

Second Embodiment

Figure 16:
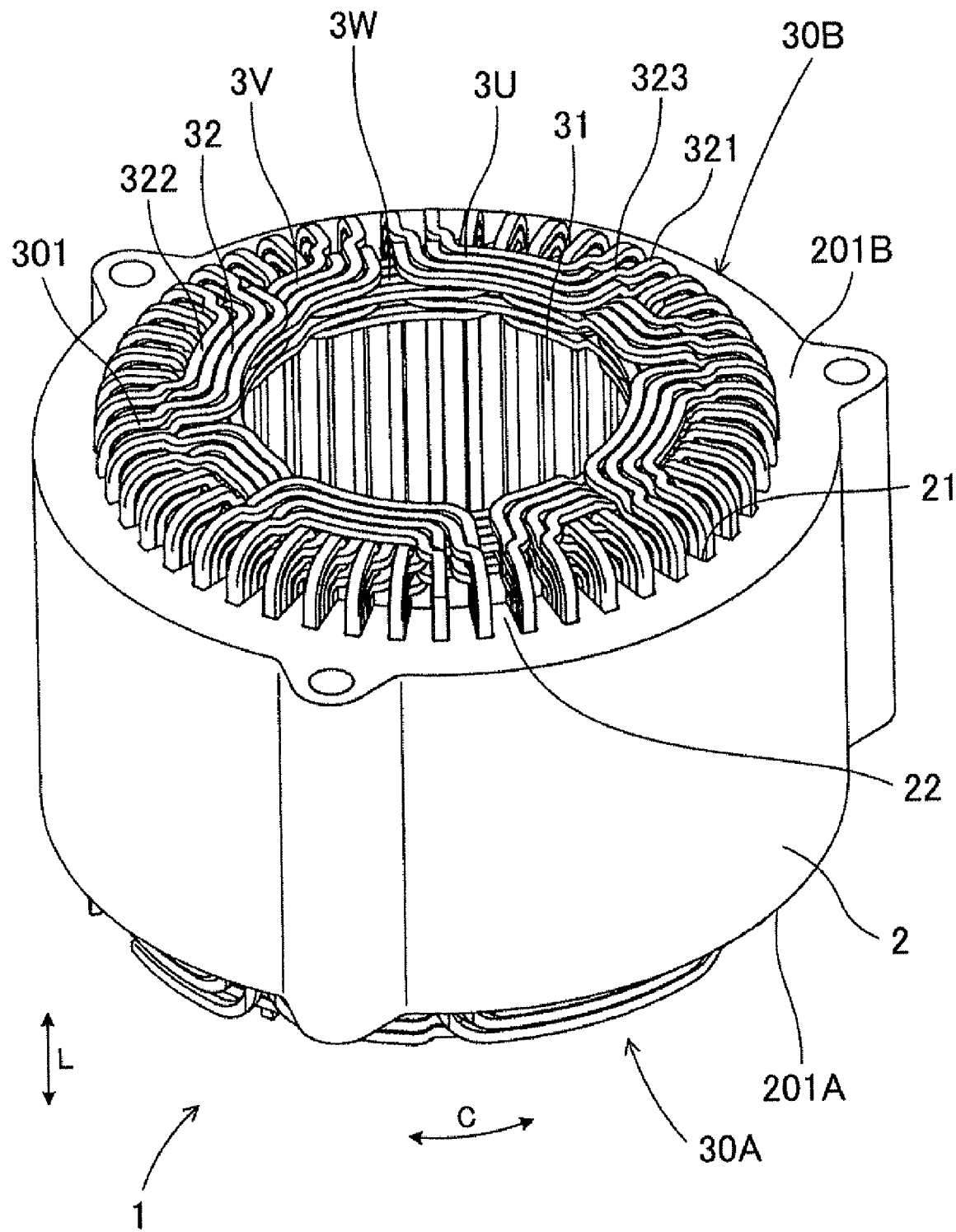
FIG. 16 is a perspective view showing a stator according to a second embodiment.

As shown in FIG. 16, a stator 1 according to a second embodiment is formed by disposing coils 3U, 3V, 3W of three phases, namely a U phase, a V phase, and a W phase, in a distributed winding form in a plurality of slots 21 formed along an axial direction L of a stator core 2.

Figure 17:
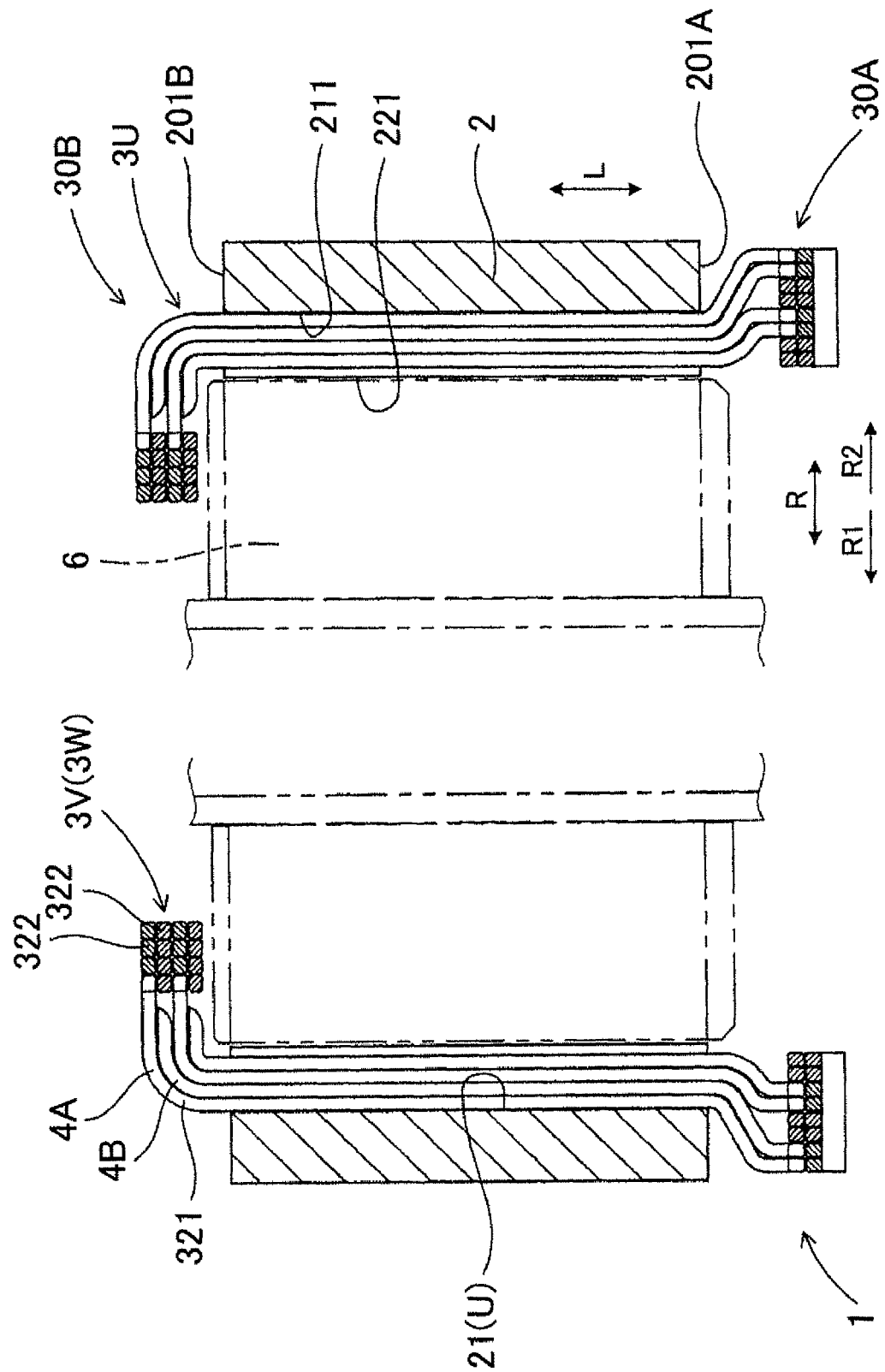
FIG. 17 is an illustrative sectional view showing the stator according to the second embodiment.

As shown in FIGS. 16 and 17, in the coils 3U, 3V, 3W of the three phases, a plurality of coil conductors 4 of the same phase are disposed in series in a radial direction R of the stator core 2 in slots 21 of the same phase. Further, the coils 3U, 3V, 3W of the three phases are formed such that in a second side coil end portion 30A projecting from an axial first end surface 201A of the stator core 2, the plurality of coil conductors 4 of the same phase are disposed in series in the radial direction R or the axial direction L of the stator core 2, and in a first side coil end portion 30B projecting from an axial second end surface 201B of the stator core 2, the plurality of coil conductors 4 of the same phase are bent toward a radial inner peripheral side R1 of the stator core 2 and disposed in series in the radial direction R of the stator core 2.

The stator 1 according to the second embodiment will be described in detail below with reference to FIGS. 16 to 34.

As shown in FIG. 16, the stator 1 according to the second embodiment is used in a three-phase alternating current motor for a hybrid car, an electric automobile, or the like, and is formed by incorporating the coils 3U, 3V, 3W of the three phases, namely the U phase, the V phase, and the W phase, in the stator core 2.

Further, the coils 3U, 3V, 3W of the three phases are each constituted by an angular wire conductor 301 in which an insulating film made of insulating resin or the like is formed around the entire circumference of a conductor portion (conductor base material) made of copper or the like, and the angular wire conductor 301 has a substantially square cross-section.

Figure 20:
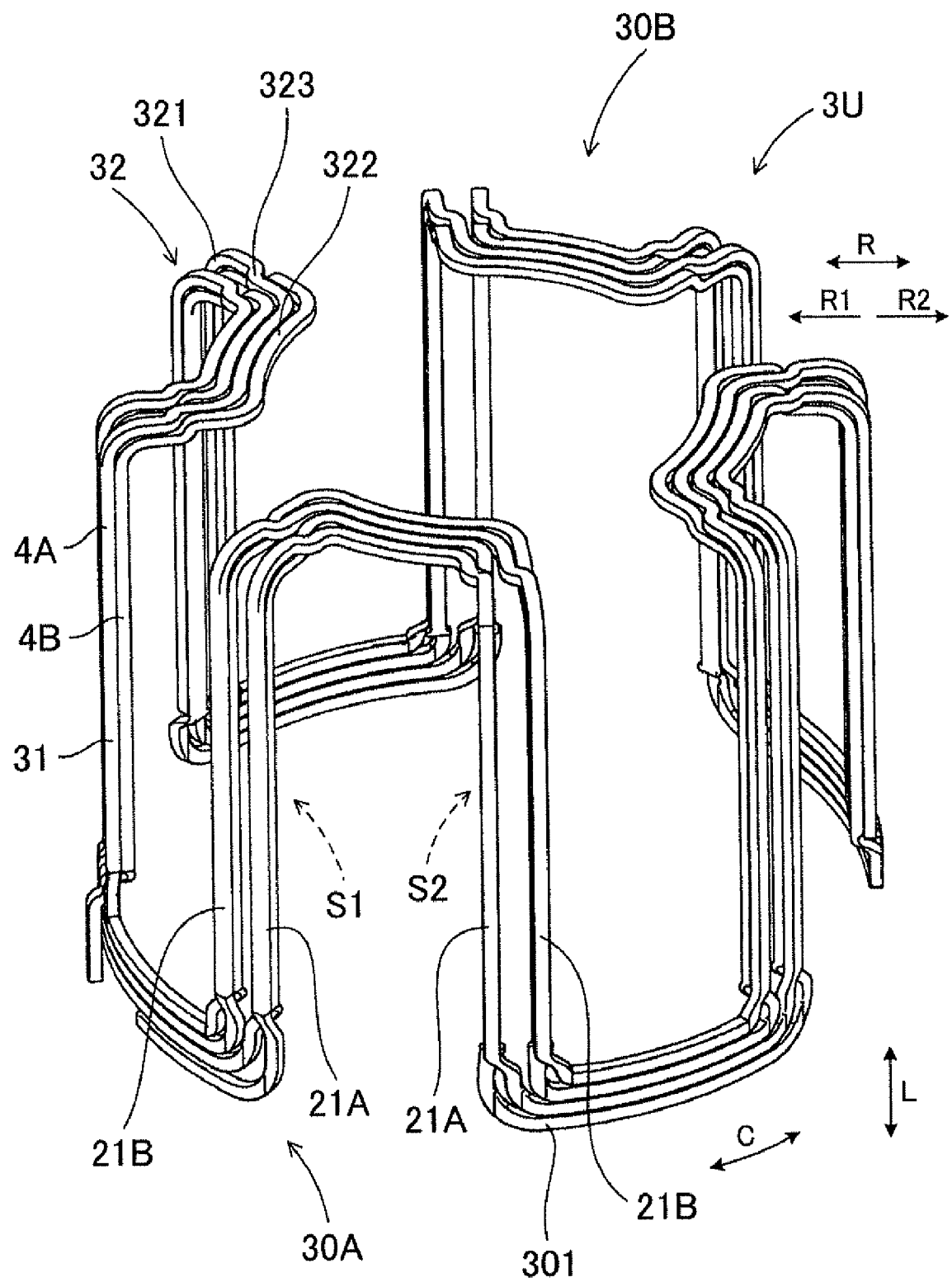
FIG. 20 is a perspective view showing a U phase coil according to the second embodiment.
Figure 24:
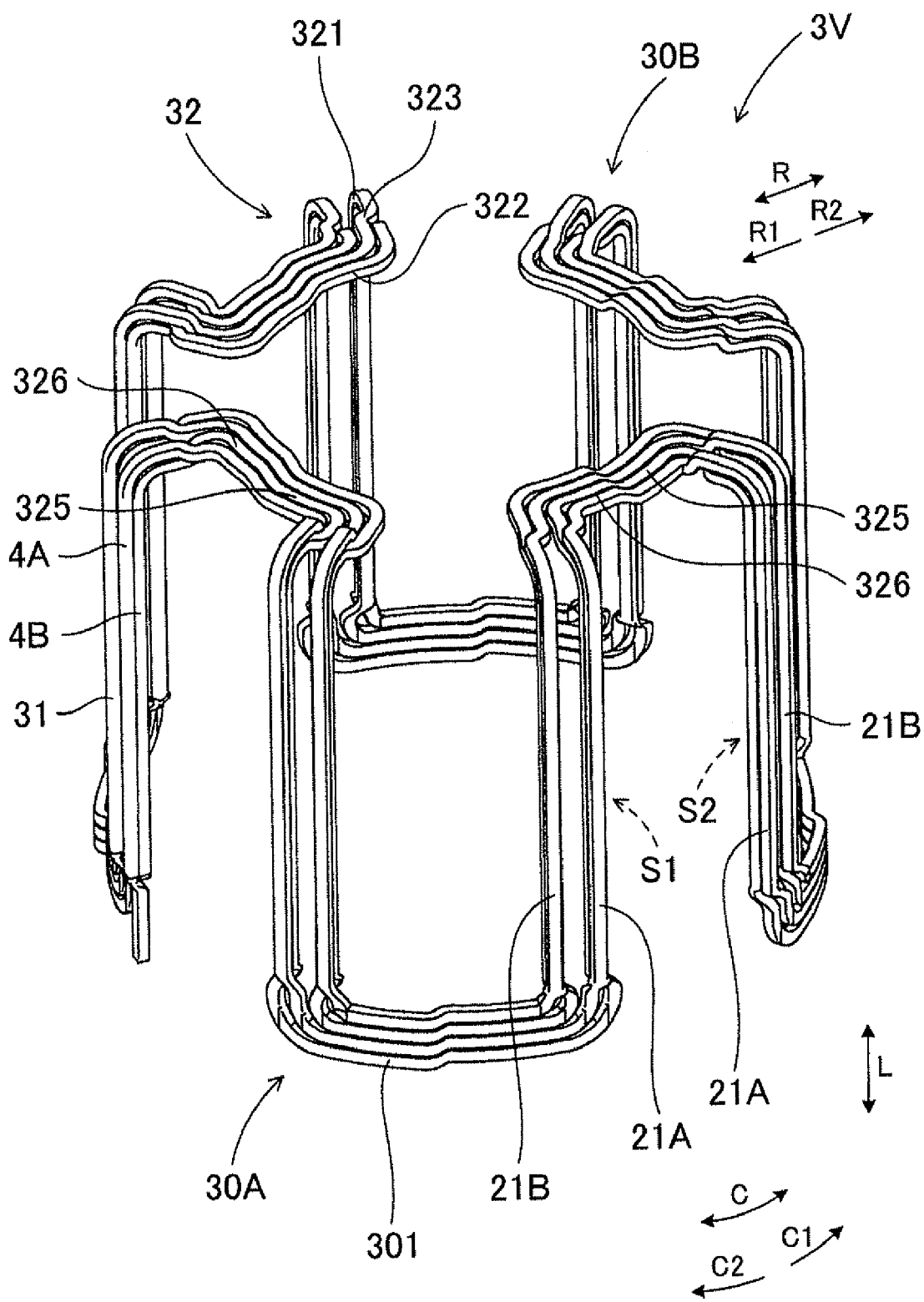
FIG. 24 is a perspective view showing a V phase coil according to the second embodiment.
Figure 28:
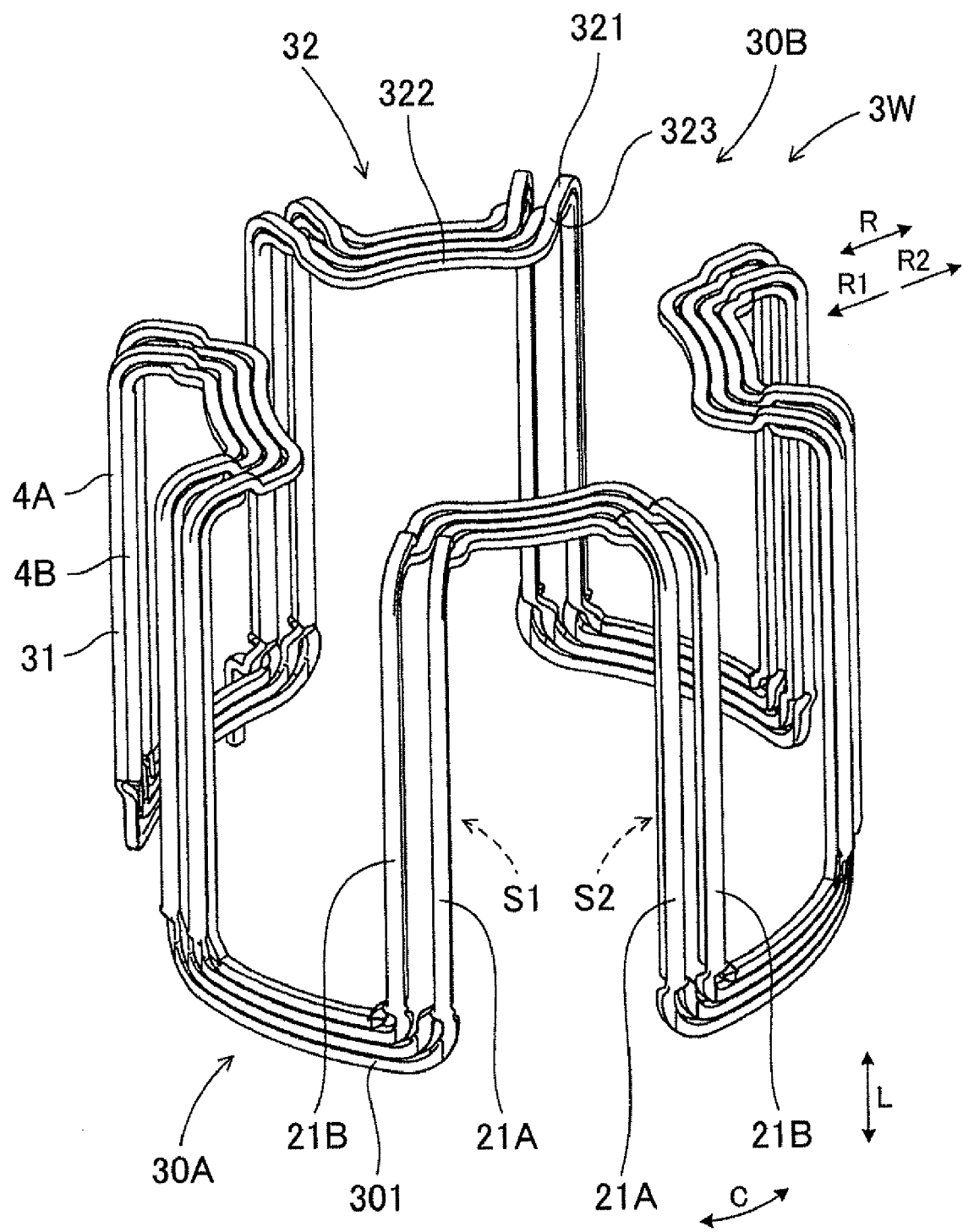
FIG. 28 is a perspective view showing a W phase coil according to the second embodiment.

As shown in FIGS. 20, 24 and 28, the coils 3U, 3V, 3W of the three phases according to the second embodiment are formed in a wave-wound shape in which the coils 3U, 3V, 3W of the three phases are positioned alternately in a second side coil end portion 30A and a first side coil end portion 30B from the slot 21 and travel around the stator core 2 in a circumferential direction C. Further, the coils 3U, 3V, 3W of the three phases according to the second embodiment are formed in a wave-wound shape using two of the coil conductors 4 disposed in the same slot 21 as a set. Furthermore, the two coil conductors 4 are molded by causing a single continuous angular wire conductor 301 to travel around the stator core 2 twice in the circumferential direction C.

Figure 21:
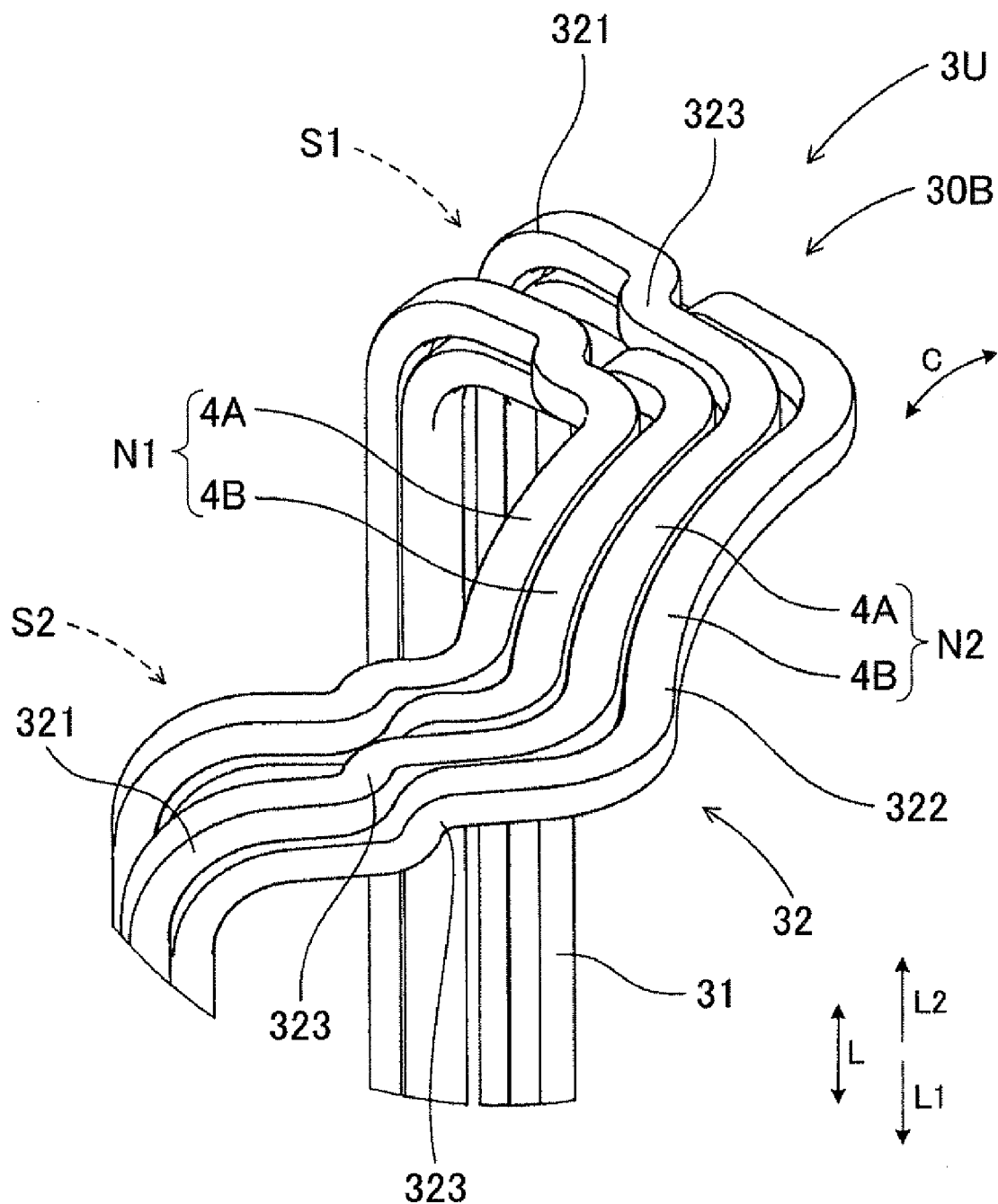
FIG. 21 is a perspective view showing a part of the second end side coil end portion of the U phase coil according to the second embodiment.
Figure 25:
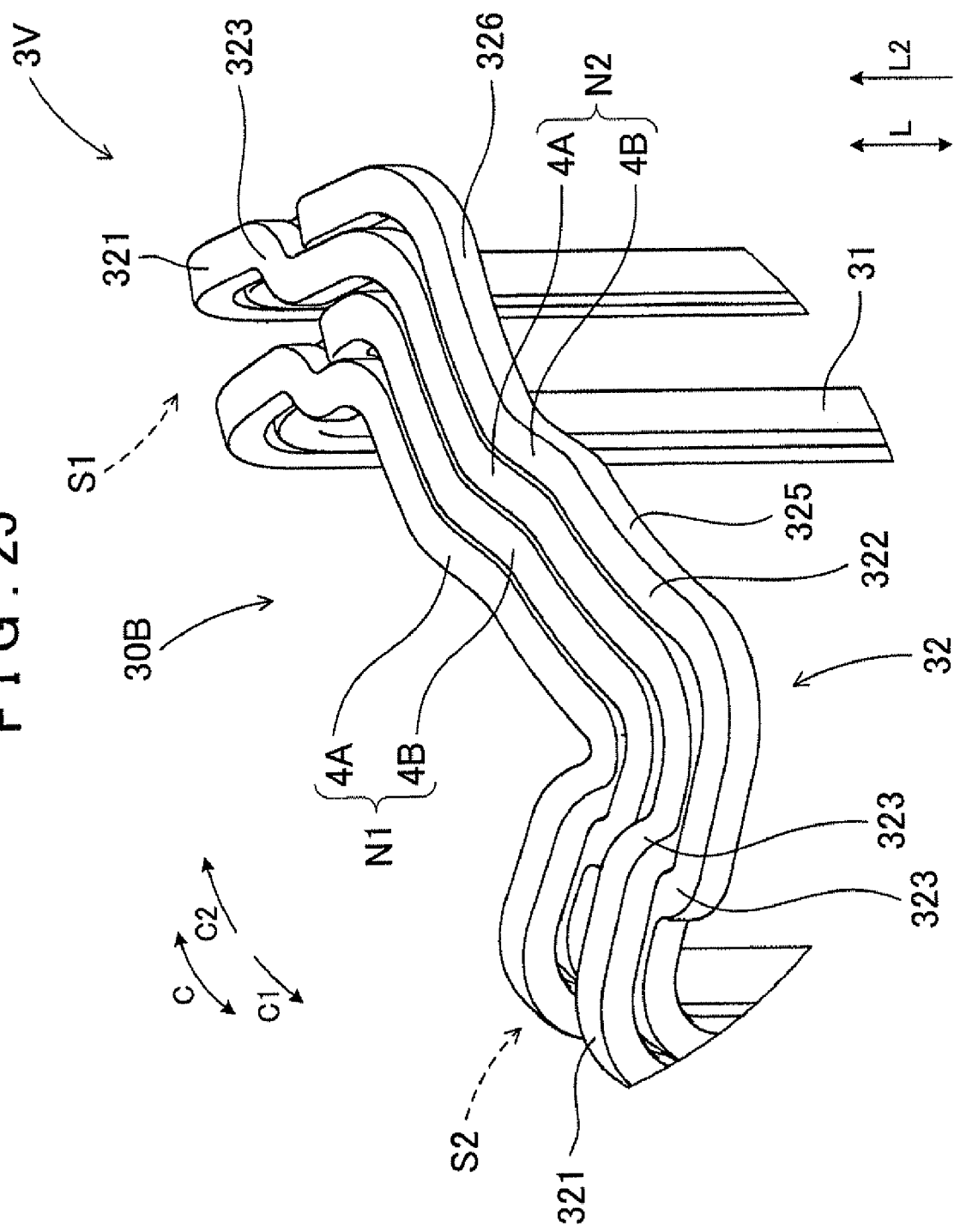
FIG. 25 is a perspective view showing a part of the second end side coil end portion of the V phase coil according to the second embodiment.
Figure 29:
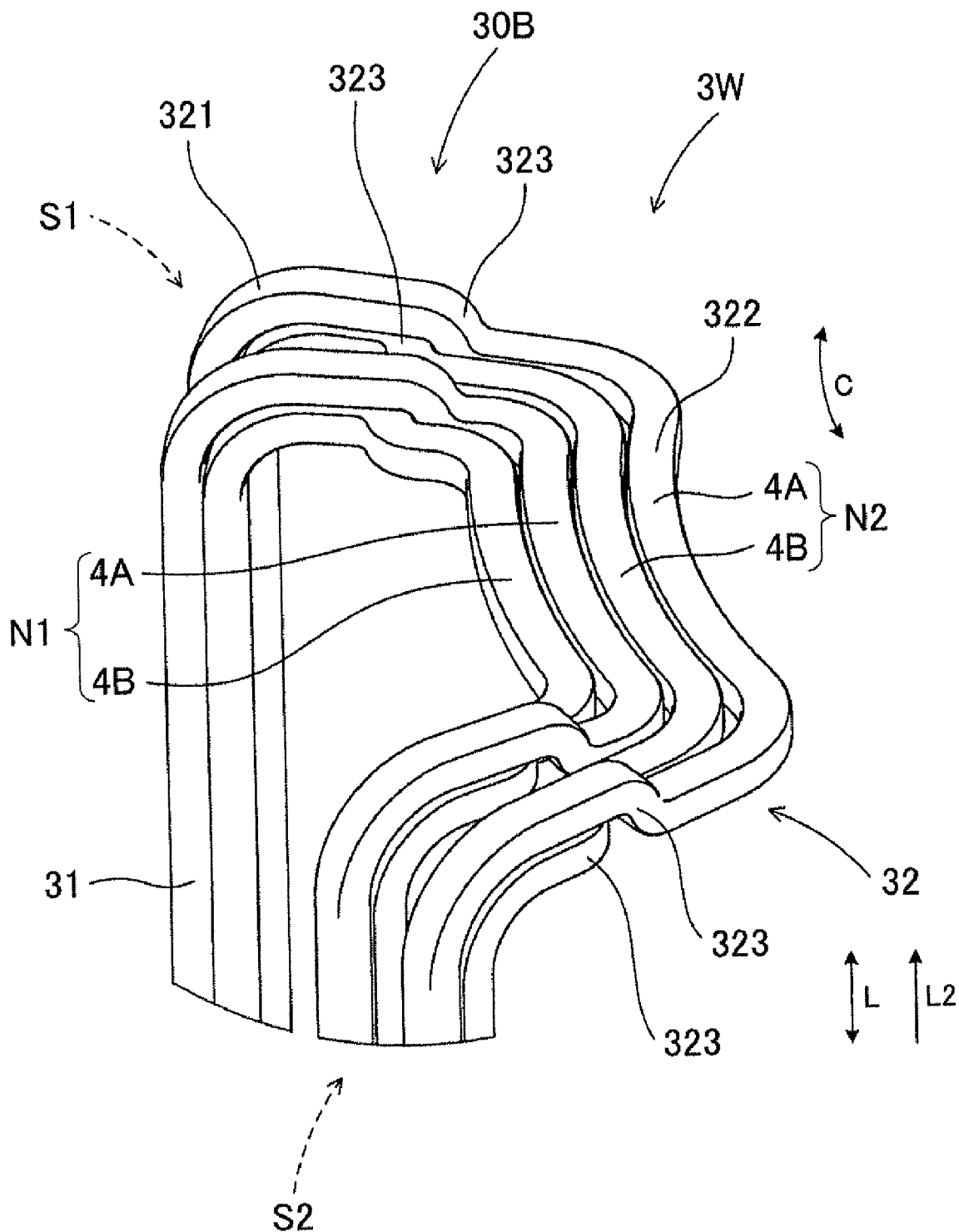
FIG. 29 is a perspective view showing a part of the second end side coil end portion of the W phase coil according to the second embodiment.

As shown in FIGS. 21, 25 and 29, the coils 3U, 3V, 3W of the three phases are constituted by a slot conductor portion 31 disposed in the slot 21, and a coil end conductor portion 32 that projects from the axial end surface 201 of the stator core 2 (i.e. that is disposed on the outside of the slot 21). The coil end conductor portion 32 positioned in the second side coil end portion 30A is constituted by a bent angular conductor portion 321 that is connected to the slot conductor portion 31 and bent in the circumferential direction C so as to stand upright from the axial first end surface 201A of the stator core 2, and a circumferential conductor portion (transition wire portion) 322 that connects the bent angular conductor portions 321 connected to respective slot conductor portions 31 to each other and is disposed in the circumferential direction C of the stator core 2. The coil end conductor portion 32 positioned in the first side coil end portion 30B is constituted by a bent angular conductor portion 321 that is connected to the slot conductor portion 31 and bent toward the radial inner peripheral side R1 so as to stand upright from the axial second end surface 201B of the stator core 2, and a circumferential conductor portion (transition wire portion) 322 that connects the bent angular conductor portions 321 connected to respective slot conductor portions 31 to each other and is disposed in the circumferential direction C of the stator core 2.

The circumferential conductor portion 322 is molded into an arc shape extending in the circumferential direction C of the stator core 2 in the second side coil end portion 30A and first side coil end portion 30B. The circumferential conductor portion 322 may also be molded into a rectilinear shape in the first side coil end portion 30B.

Figure 18:
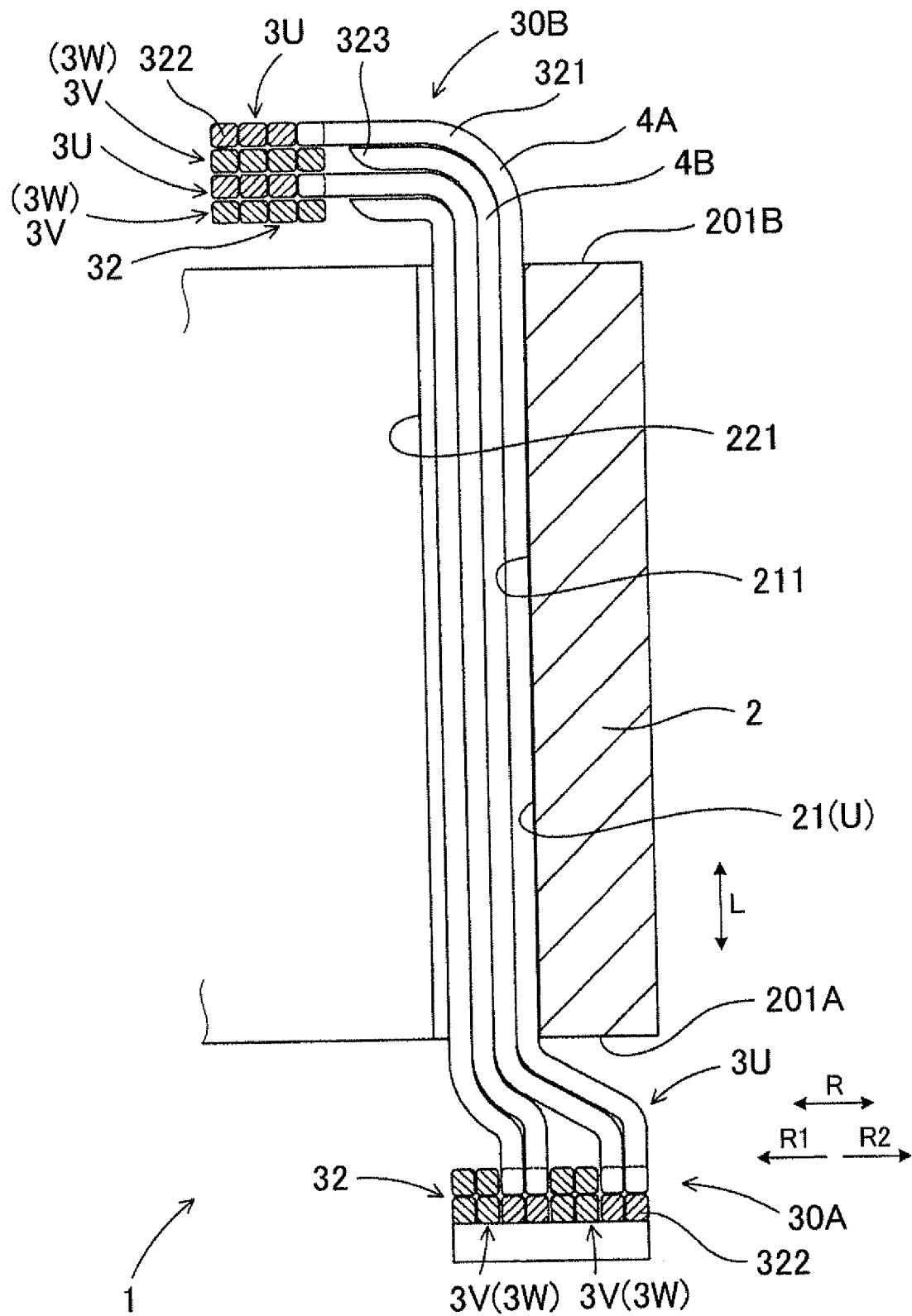
FIG. 18 is an illustrative sectional view showing the stator according to the second embodiment.

As shown in FIG. 18, in the second side coil end portion 30A, the circumferential conductor portion 322 of each phase is formed with a portion in which the U phase circumferential conductor portion 322 and the V phase circumferential conductor portion 322 are disposed to overlap in the radial direction R of the stator core 2, a portion in which the U phase circumferential conductor portion 322 and the W phase circumferential conductor portion 322 are disposed to overlap in the radial direction R of the stator core 2, and a portion in which the V phase circumferential conductor portion 322 and the W phase circumferential conductor portion 322 are disposed to overlap in the radial direction R of the stator core 2.

Figure 19:
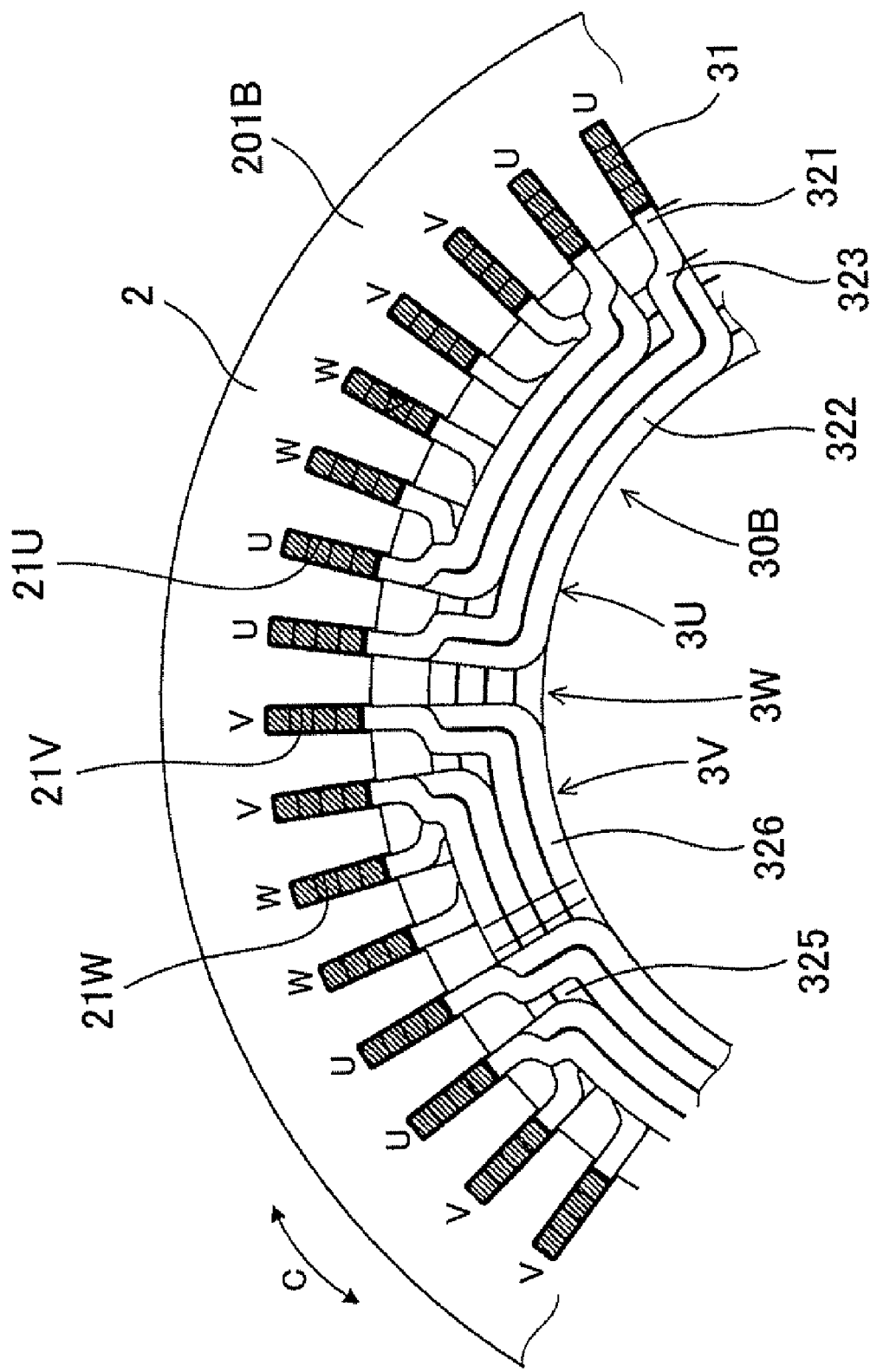
FIG. 19 is an illustrative sectional view showing a second end side coil end portion of the stator according to the second embodiment from an axial second end side.

As shown in FIG. 19, two adjacent U phase slots 21U, two adjacent V phase slots 21V, and two adjacent W phase slots 21W are formed repeatedly in that order in the stator core 2. In the stator core 2 according to the second embodiment, the two adjacent slots 21 of the same phase are formed in eight locations in the circumferential direction C of the stator core 2. Further, sixteen slots 21 of each phase are formed, giving a total of 48 slots 21 of the three phases.

The coils 3U, 3V, 3W of the three phases according to the second embodiment use pairs of coil conductors 4 disposed within the same slot 21 in series in the radial direction R, and two pairs of coil conductors 4 are disposed in the same slot 21 of the stator core 2 in series in the radial direction R. Hence, four coil conductors 4 of the same phase are disposed in each slot 21 in series in the radial direction R. Further, four coil conductors 4 are disposed similarly in adjacent slots 21 of the same phase in series in the radial direction R.

As shown in FIG. 18, the pairs of coil conductors 4 positioned on the inner side of the axial direction L of the stator core 2 in the second side coil end portion 30A are positioned on the radial inner peripheral side R1 of the stator core 2 in the first side coil end portion 30B. On the other hand, the pairs of coil conductors 4 positioned on the outer side of the axial direction L of the stator core 2 in the second side coil end portion 30A are positioned on the radial outer peripheral side R2 of the stator core 2 in the first side coil end portion 30B.

The coils 3U, 3V, 3W of the three phases are formed by disposing pairs of coil conductors 4 of the same phase in adjacent slots 21 of the same phase in series in the radial direction R of the stator core 2. Further, in adjacent slots 21 of the same phase, pairs of coil conductors 4 of a different phase are disposed in series on the radial inner peripheral side R1 of the pairs of coil conductors 4 of the same phase.

Further, in the second side coil end portion 30A, the coils 3U, 3V, 3W of the three phases are formed by disposing pairs of coil conductors 4 of the same phase disposed in a slot 21 of the same phase in series in the axial direction L of the stator core 2. Further, the pairs of coil conductors 4 of the same phase disposed in adjacent slots 21 of the same phase are disposed in four rows in the axial direction L of the stator core 2.

Note that the pairs of coil conductors 4 of the same phase disposed in adjacent slots 21 of the same phase may be formed by molding a single continuous angular wire conductor 301 integrally so as to travel around the stator core 2 four times in the circumferential direction C.

As shown in FIG. 19, in the first side coil end portion 30B, the coils 3U, 3V, 3W of the three phases are formed by disposing two coil conductors 4 of the same phase disposed in one of two adjacent slots 21 of the same phase and two coil conductors 4 of the same phase disposed in the other slot 21 of the two adjacent slots 21 of the same phase in four rows in the radial direction R of the stator core 2.

As shown in FIG. 18, in the first side coil end portion 30B, the two coil conductors 4 of the same phase disposed in series in the slot 21 of the same phase in the radial direction R of the stator core 2 are formed by bending a first coil conductor 4A toward the radial inner peripheral side R1 of the stator core 2 in a perpendicular state relative to the axial direction L of the stator core 2 and bending a second coil conductor 4B toward the radial inner peripheral side R1 of the stator core 2 so as to be offset from the axial direction L of the stator core 2 and disposed in series with the first coil conductor 4A in the radial direction R of the stator core 2.

As shown in FIGS. 21, 25 and 29, in a radial conductor portion 323 provided between the bent angular conductor portion 321 and the circumferential conductor portion 322, the coil conductors 4 are changed from the condition in which the coil conductors 4 are arranged in twos in the axial direction L of the stator core 2 in the bent angular conductor portion 321 to the condition in which the coil conductors 4 are arranged in twos in the radial direction R.

The coil conductors 4 constituting the coils 3U, 3V, 3W of the three phases are disposed to extend from two adjacent slots 21 of the same phase (a first slot conductor group S1 to be described below) to two slots 21 of the same phase (a second slot conductor group S2 to be described below) adjacent to the two slots 21 of the same phase in the circumferential direction.

As shown in FIG. 24, in the first side coil end portion 30B, the coil conductors 4 of the V phase coil 3V are offset in the axial direction L of the stator core 2 in a central part of the stator core 2 in the circumferential direction C so as to include an inside part 325 positioned on a circumferential first side C1 of the stator core 2 and an axial direction inner side L1, and an outside part 326 positioned on a circumferential second side C2 of the stator core 2 and an axial outer side L2. Further, the coil conductors 4 of the U phase coil 3U are disposed to overlap the inside part 325 of the coil conductors 4 of the V phase coil 3V on the axial outer side L2 of the stator core 2. The coil conductors 4 of the W phase coil 3W are disposed to overlap the outside part 326 of the coil conductors 4 of the V phase coil 3V on the axial inner side L1 of the stator core 2.

As shown in FIG. 16, in the first side coil end portion 30B, the pairs of coil conductors 4 of the coils 3U, 3V, 3W of each phase disposed in the slots 21 of each phase on the outside of the radial direction R (outside slots 21B) are disposed discretely at substantially equal intervals in the circumferential direction C within a two-phase axial width range. Further, in the first side coil end portion 30B, the pairs of coil conductors 4 of the coils 3U, 3V, 3W of each phase disposed in the slots 21 of each phase on the inside of the radial direction R (inside slots 21A) are disposed discretely at substantially equal intervals in the circumferential direction C within a two-phase axial width range so as to overlap the pairs of coil conductors 4 disposed on the outside of the radial direction R on the axial inner side L1.

In the first side coil end portion 30B, similarly to the second side coil end portion 30A, the coils 3U, 3V, 3W of the three phases according to the second embodiment may be formed parallel to the axial direction L and molded into a wave-wound shape that travels around the circumferential direction C, whereupon the first side coil end portion 30B is bent toward the inner peripheral side of the circumferential direction C.

Further, conductor end portions of the two coil conductors 4 of the same phase are joined at a coil end conductor portion 32 positioned in the second side coil end portion 30A while overlapping in the radial direction R (not shown).

It is assumed in the following description that when the first side coil end portion 30B of the second embodiment is seen from one end side of the axial direction L of the stator core 2, any two adjacent slots 21 of the same phase constitute a first slot group S1, and two adjacent slots 21 of the same phase disposed adjacent to the two slots 21 of the same phase constituting the first slot group S1 on one side in the circumferential direction C constitute a second slot group S2. It is also assumed that within a range in which the first slot group S1 and second slot group S2 are provided in series in the circumferential direction C, the slot 21 positioned on the inner side in the circumferential direction C constitutes an inside slot 21A and the slot 21 positioned on the outer side in the circumferential direction C constitutes an outside slot 21B.

Next, the manner in which the coils 3U, 3V, 3W of the three phases are formed will be described.

FIGS. 20 to 23 show the manner in which the U phase coil 3U is formed.

Figure 22:
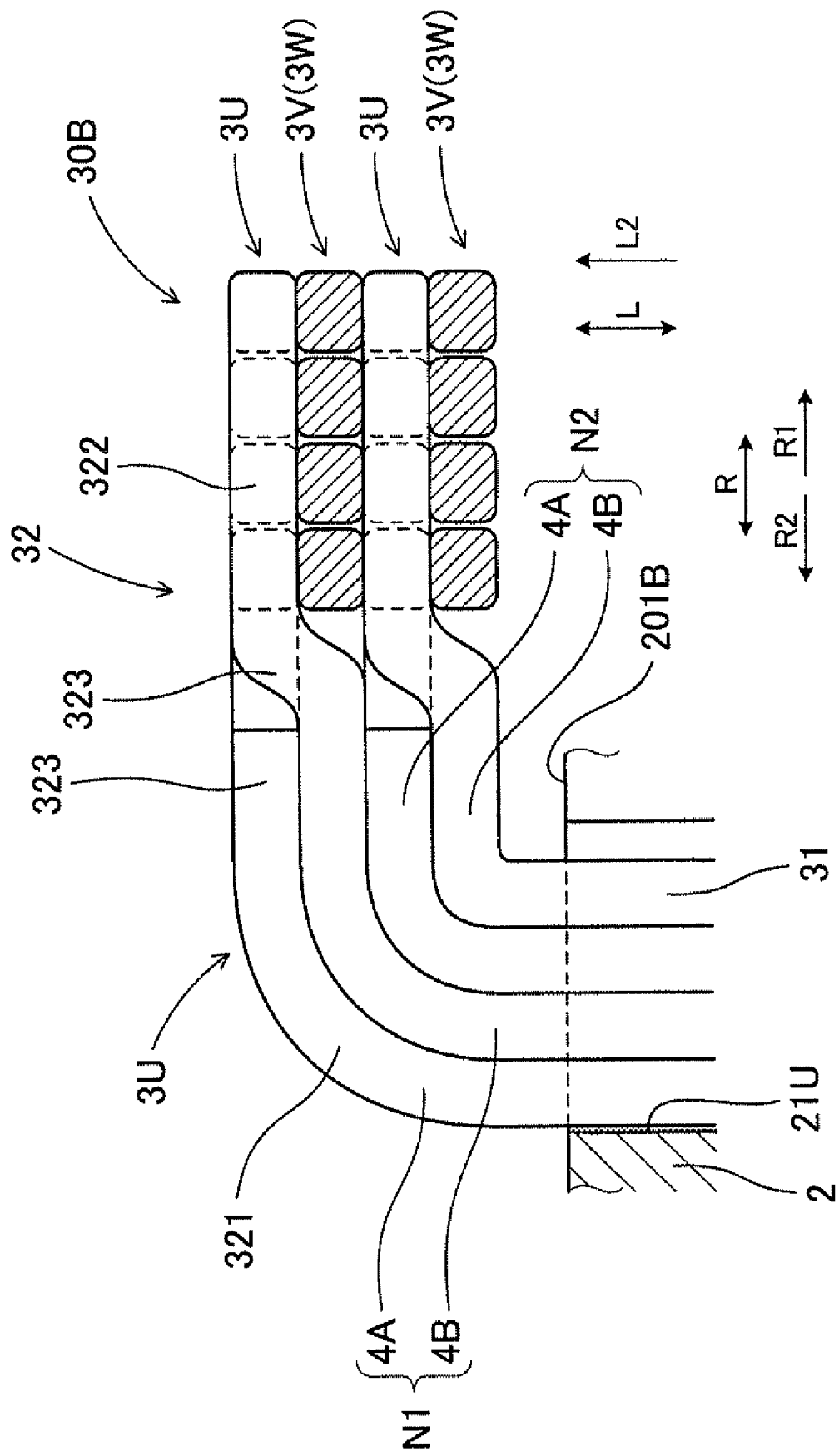
FIG. 22 is an illustrative sectional view showing the second end side coil end portion of a U phase coil disposed in an outside slot according to the second embodiment.

As shown in FIGS. 21 and 22, a first pair of U phase coil conductors 4 (N1) disposed in the inside slot 21A of the first slot group S1 and the inside slot 21A of the second slot group S2 are provided in the slot 21 in series in the radial direction R such that the first coil conductor 4A positioned on the radial outer peripheral side R2 of the slot 21 is also positioned on the radial outer peripheral side R2 in the first side coil end portion 30B, while the second coil conductor 4B positioned on the radial inner peripheral side R1 of the slot 21 is positioned on the radial inner peripheral side R1 of the first coil conductor 4A in the first side coil end portion 30B.

Further, a second pair of U phase coil conductors 4 (N2) disposed in the outside slot 21B of the first slot group S1 and the outside slot 21B of the second slot group 82 are provided in the slot 21 in series in the radial direction R such that the first coil conductor 4A positioned on the radial outer peripheral side R2 of the slot 21 is also positioned on the radial outer peripheral side R2 in the first side coil end portion 30B, while the second coil conductor 4B positioned on the radial inner peripheral side R1 of the slot 21 is positioned on the radial inner peripheral side R1 of the first coil conductor 4A in the first side coil end portion 30B. Further, in the first side coil end portion 30B, the second pair of U phase coil conductors 4 (N2) is disposed in series on the radial inner peripheral side R1 of the first pair of U phase coil conductors 4 (N1).

Figure 23:
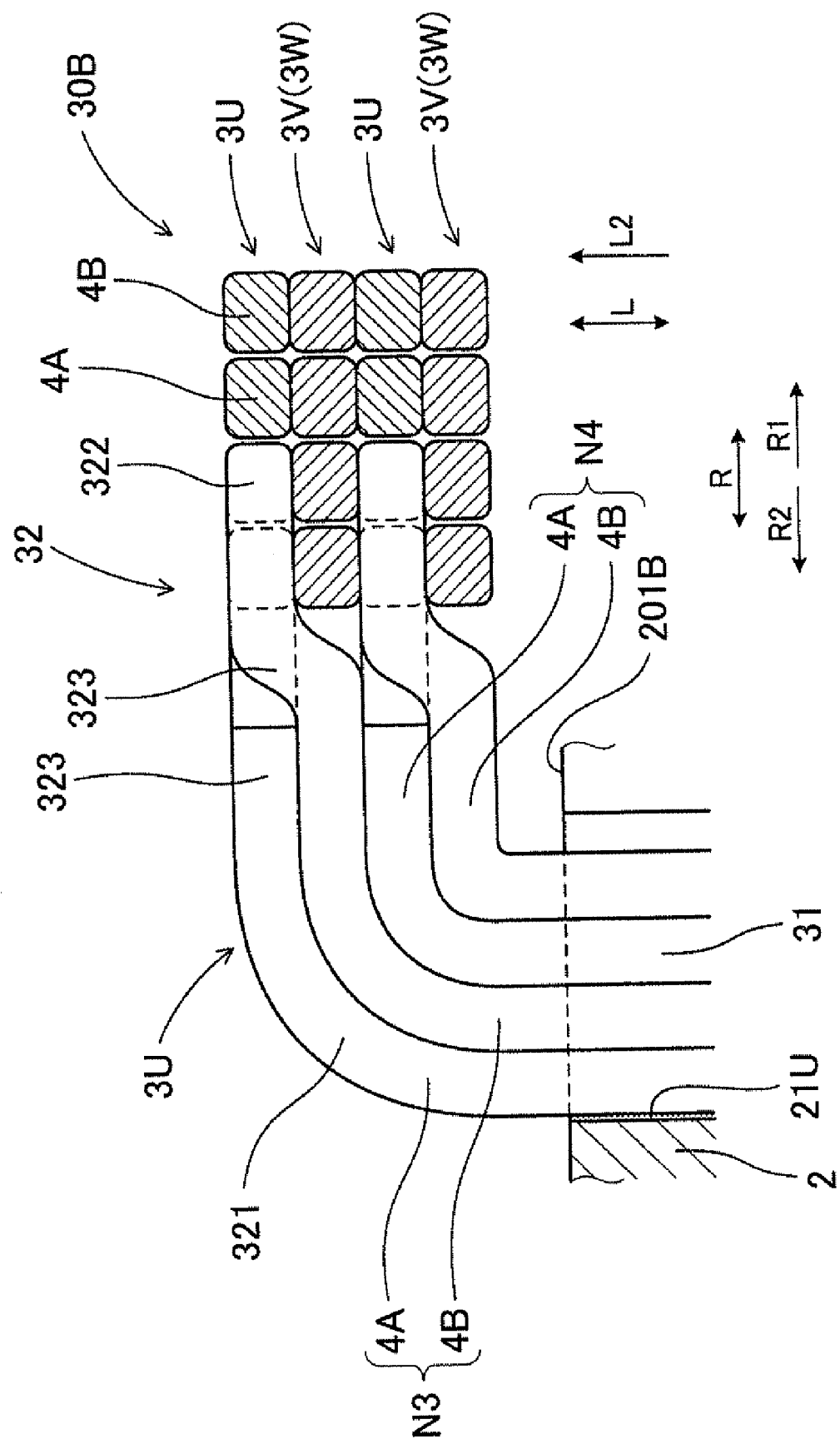
FIG. 23 is an illustrative sectional view showing the second end side coil end portion of a U phase coil disposed in an inside slot according to the second embodiment.

Further, as shown in FIG. 23, a third pair of U phase coil conductors 4 (N3) disposed in the inside slot 21A of the first slot group S1 and the inside slot 21A of the second slot group S2 so as to overlap the first pair of U phase coil conductors 4 (N1) on the radial inner peripheral side R1 in the inside slot 21A are provided in the slot 21 in series in the radial direction R such that the first coil conductor 4A positioned on the radial outer peripheral side R2 of the slot 21 is also positioned on the radial outer peripheral side R2 in the first side coil end portion 30B, while the second coil conductor 4B positioned on the radial inner peripheral side R1 of the slot 21 is positioned on the radial inner peripheral side R1 of the first coil conductor 4A in the first side coil end portion 30B.

Further, a fourth pair of U phase coil conductors 4 (N4) disposed in the outside slot 218 of the first slot group S1 and the outside slot 21B of the second slot group S2 so as to overlap the second pair of U phase coil conductors 4 (N2) on the radial inner peripheral side R1 of the outside slot 21B are provided in the slot 21 in series in the radial direction R such that the first coil conductor 4A positioned on the radial outer peripheral side R2 of the slot 21 is also positioned on the radial outer peripheral side R2 in the first side coil end portion 30B, while the second coil conductor 4B positioned on the radial inner peripheral side R1 of the slot 21 is positioned on the radial inner peripheral side R1 of the first coil conductor 4A in the first side coil end portion 30B. Further, in the first side coil end portion 30B, the fourth pair of U phase coil conductors 4 (N4) is disposed in series on the radial inner peripheral side R1 of the third pair of U phase coil conductors 4 (N3).

Further, as shown in FIGS. 20 and 21, the first coil conductor 4A positioned on the radial outer peripheral side R2 of the U phase slot 21U in the first and second pairs of U phase coil conductors 4 (N1, N2) is offset to the inside in the circumferential direction C in the radial conductor portion 323 provided between the bent angular conductor portion 321 and the circumferential conductor portion 322, while the second coil conductor 4B positioned on the radial inner peripheral side R1 of the U phase slot 21U is offset to the outside in the axial direction L in the radial conductor portion 323 provided between the bent angular conductor portion 321 and the circumferential conductor portion 322. Thus, the respective circumferential conductor portions 322 are aligned in the radial direction R.

In the third and fourth pairs of U phase coil conductors 4 (N3, N4), similarly to the first and second pairs of U phase coil conductors 4 (N1, N2), the respective coil conductors 4 are offset such that the respective circumferential conductor portions 322 are aligned in the radial direction R.

FIGS. 24 to 27 show the manner in which the V phase coil 3V is formed.

Figure 26:
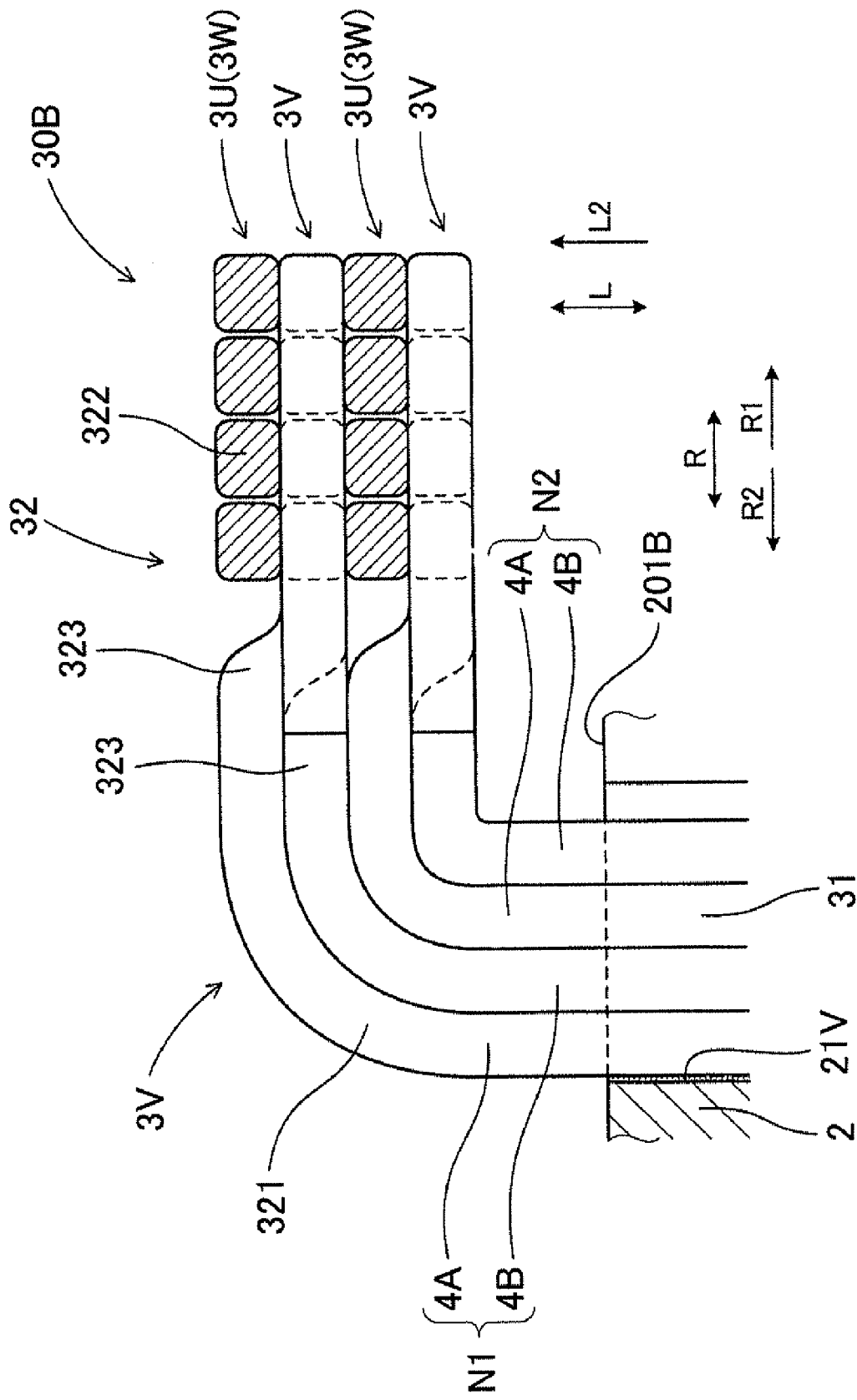
FIG. 26 is an illustrative sectional view showing the second end side coil end portion of a V phase coil disposed in an outside slot according to the second embodiment.

As shown in FIGS. 25 and 26, a first pair of V phase coil conductors 4 (N1) disposed in the inside slot 21A of the first slot group S1 and the inside slot 21A of the second slot group S2 are provided in the slot 21 in series in the radial direction R such that the first coil conductor 4A positioned on the radial outer peripheral side R2 of the slot 21 is also positioned on the radial outer peripheral side R2 in the first side coil end portion 30B, while the second coil conductor 4B positioned on the radial inner peripheral side R1 of the slot 21 is positioned on the radial inner peripheral side R1 of the first coil conductor 4A in the first side coil end portion 30B.

Further, a second pair of V phase coil conductors 4 (N2) disposed in the outside slot 21B of the first slot group S1 and the outside slot 21B of the second slot group S2 are provided in the slot 21 in series in the radial direction R such that the first coil conductor 4A positioned on the radial outer peripheral side R2 of the slot 21 is also positioned on the radial outer peripheral side R2 in the first side coil end portion 30B, while the second coil conductor 4B positioned on the radial inner peripheral side R1 of the slot 21 is positioned on the radial inner peripheral side R1 of the first coil conductor 4A in the first side coil end portion 30B. Further, in the first side coil end portion 30B, the second pair of V phase coil conductors 4 (N2) is disposed in series on the radial inner peripheral side R1 of the first pair of V phase coil conductors 4 (N1).

Figure 27:
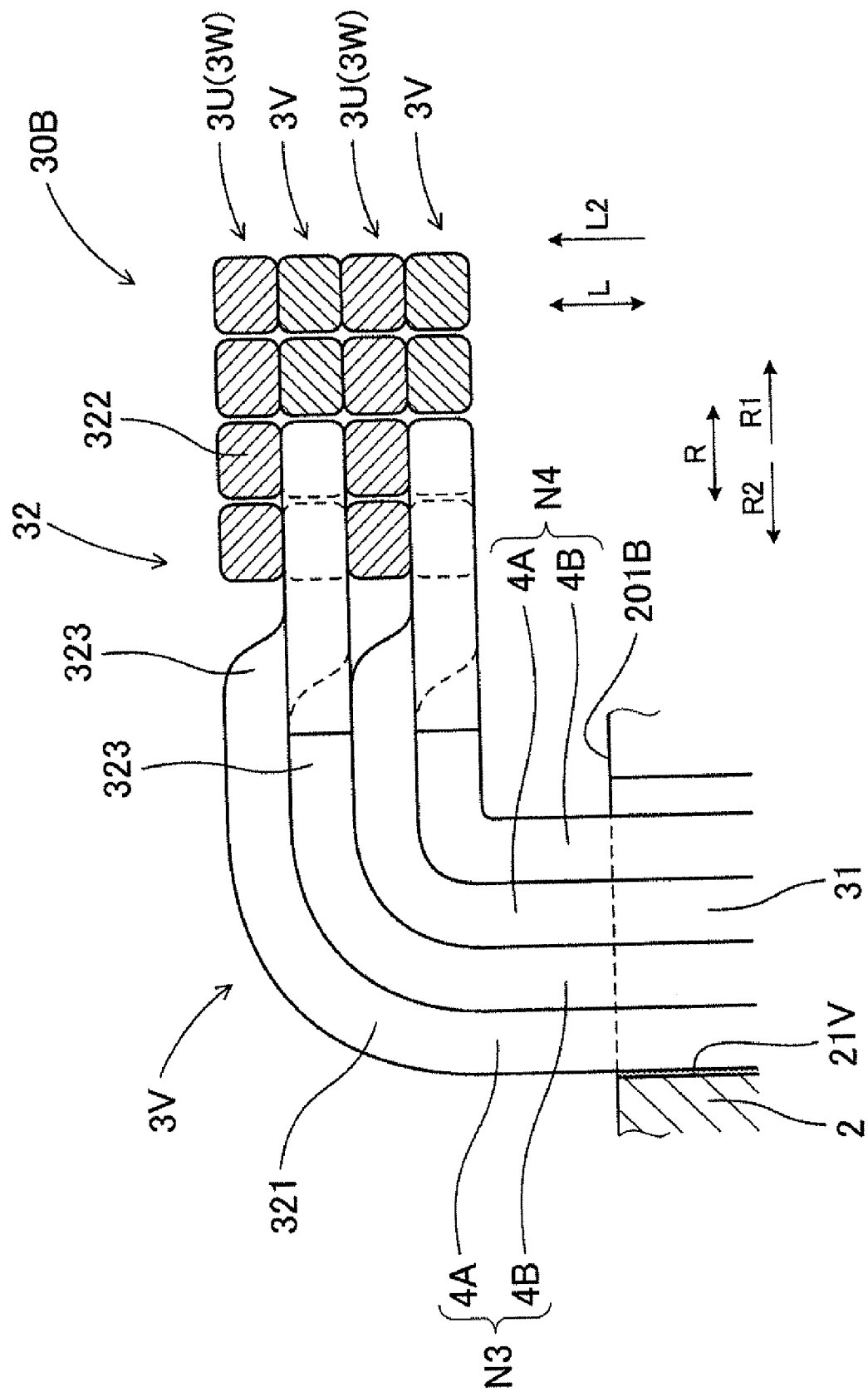
FIG. 27 is an illustrative sectional view showing the second end side coil end portion of a V phase coil disposed in an inside slot according to the second embodiment.

Further, as shown in FIG. 27, a third pair of V phase coil conductors 4 (N3) disposed in the inside slot 21A of the first slot group S1 and the inside slot 21A of the second slot group S2 so as to overlap the first pair of V phase coil conductors 4 (N1) on the radial inner peripheral side R1 of the inside slot 21A are provided in the slot 21 in series in the radial direction R such that the first coil conductor 4A positioned on the radial outer peripheral side R2 of the slot 21 is also positioned on the radial outer peripheral side R2 in the first side coil end portion 30B, while the second coil conductor 4B positioned on the radial inner peripheral side R1 of the slot 21 is positioned on the radial inner peripheral side R1 of the first coil conductor 4A in the first side coil end portion 30B.

Further, a fourth pair of V phase coil conductors 4 (N4) disposed in the outside slot 21B of the first slot group S1 and the outside slot 21B of the second slot group S2 so as to overlap the second pair of V phase coil conductors 4 (N2) on the radial inner peripheral side R1 of the outside slot 21B are provided in the slot 21 in series in the radial direction R such that the first coil conductor 4A positioned on the radial outer peripheral side R2 of the slot 21 is also positioned on the radial outer peripheral side R2 in the first side coil end portion 30B, while the second coil conductor 4B positioned on the radial inner peripheral side R1 of the slot 21 is positioned on the radial inner peripheral side R1 of the first coil conductor 4A in the first side coil end portion 30B. Further, in the first side coil end portion 30B, the fourth pair of V phase coil conductors 4 (N4) is disposed in series on the radial inner peripheral side R1 of the third pair of V phase coil conductors 4 (N3).

Further, as shown in FIGS. 24 and 25, the first coil conductor 4A positioned on the radial outer peripheral side R2 of the V phase slot 21V in a part of the first and second pairs of V phase coil conductors 4 (N1, N2) on a circumferential first side C1 is offset to the axial inner side L1 in the radial conductor portion 323 provided between the bent angular conductor portion 321 and the inside part 325 of the circumferential conductor portion 322, while the second coil conductor 4B positioned on the radial inner peripheral side R1 of the V phase slot 21V is offset to the outside of the circumferential direction C in the radial conductor portion 323 provided between the bent angular conductor portion 321 and the inside part 325 of the circumferential conductor portion 322. Thus, the respective circumferential conductor portions 322 are aligned in the radial direction R.

Further, the first coil conductor 4A positioned on the radial outer peripheral side R2 of the V phase slot 21V in a part of the first and second pairs of V phase coil conductors 4 (N1, N2) on a circumferential second side C2 is offset to the axial inner side L1 in the radial conductor portion 323 provided between the bent angular conductor portion 321 and the inside part 325 of the circumferential conductor portion 322, while the second coil conductor 4B positioned on the radial inner peripheral side R1 of the V phase slot 21V is offset to the outside of the circumferential direction C in the radial conductor portion 323 provided between the bent angular conductor portion 321 and the inside part 325 of the circumferential conductor portion 322. Thus, the respective circumferential conductor portions 322 are aligned in the radial direction R.

Further, in the part of the third and fourth pairs of V phase coil conductors 4 (N3, N4) on the circumferential first side C1, similarly to the part of the first and second pairs of coil conductors 4 (N1, N2) on the circumferential first side C1, the respective coil conductors 4 are offset such that the respective circumferential conductor portions 322 are aligned in the radial direction R.

Moreover, in the part of the third and fourth pairs of V phase coil conductors 4 (N3, N4) on the circumferential second side C2, similarly to the part of the first and second pairs of coil conductors 4 (N1, N2) on the circumferential second side C2, the respective coil conductors 4 are offset such that the respective circumferential conductor portions 322 are aligned in the radial direction R.

FIGS. 28 to 31 show the manner in which the W phase coil 3W is formed.

Figure 30:
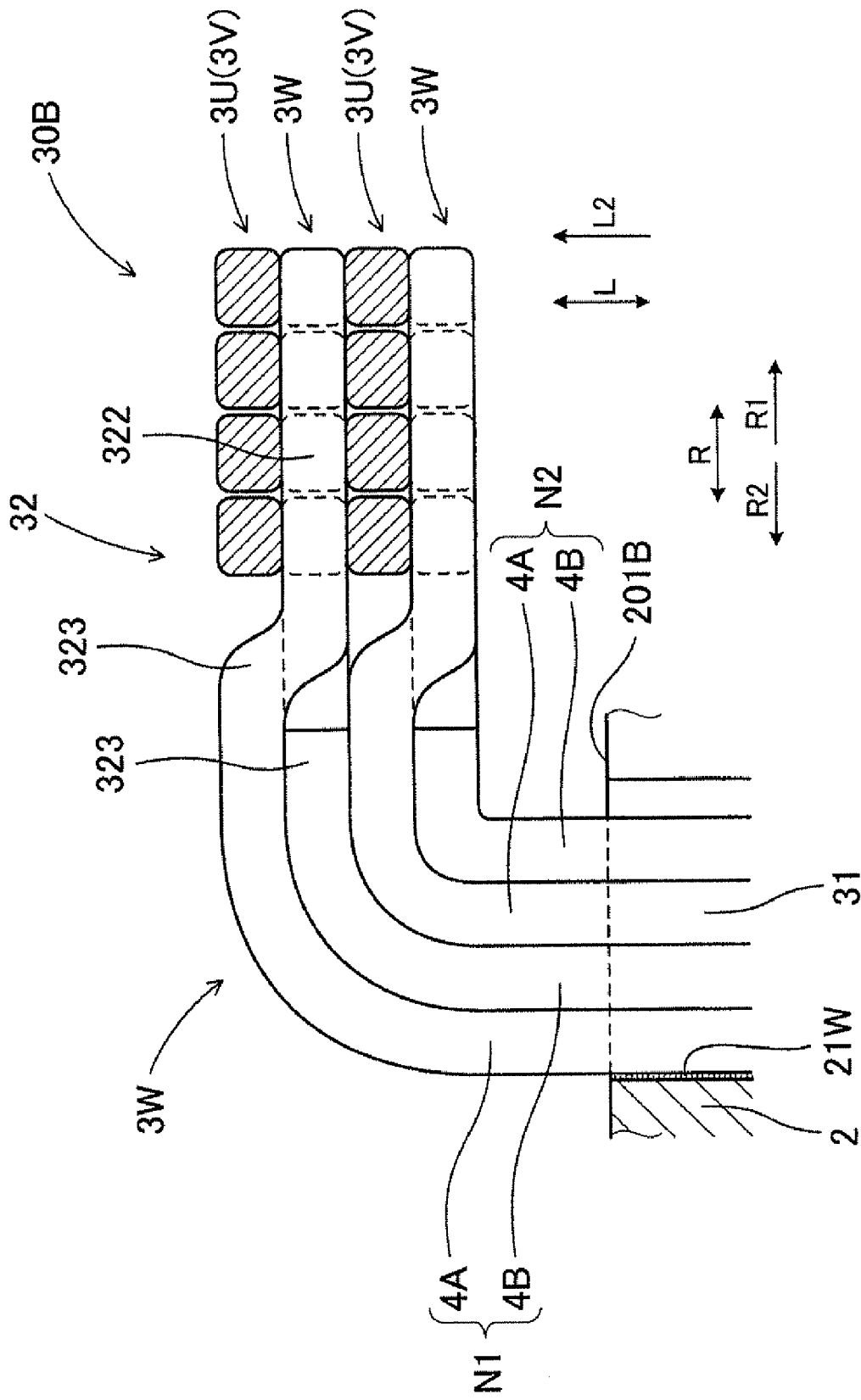
FIG. 30 is an illustrative sectional view showing the second end side coil end portion of a W phase coil disposed in an outside slot according to the second embodiment.

As shown in FIGS. 29 and 30, a first pair of W phase coil conductors 4 (N1) disposed in the inside slot 21A of the first slot group S1 and the inside slot 21A of the second slot group S2 are provided in the slot 21 in series in the radial direction R such that the first coil conductor 4A positioned on the radial outer peripheral side R2 of the slot 21 is positioned on the radial inner peripheral side R1 in the first side coil end portion 30B, while the second coil conductor 4B positioned on the radial inner peripheral side R1 of the slot 21 is positioned on the radial outer peripheral side R2 of the first coil conductor 4A in the first side coil end portion 30B.

Further, a second pair of W phase coil conductors 4 (N2) disposed in the outside slot 21B of the first slot group S1 and the outside slot 21B of the second slot group S2 are provided in the slot 21 in series in the radial direction R such that the first coil conductor 4A positioned on the radial outer peripheral side R2 of the slot 21 is positioned on the radial inner peripheral side R1 in the first side coil end portion 30B, while the second coil conductor 4B positioned on the radial inner peripheral side R1 of the slot 21 is positioned on the radial outer peripheral side R2 of the first coil conductor 4A in the first side coil end portion 30B. Further, in the first side coil end portion 30B, the second pair of W phase coil conductors 4 (N2) is disposed in series on the radial inner peripheral side R1 of the first pair of W phase coil conductors 4 (N1).

Figure 31:
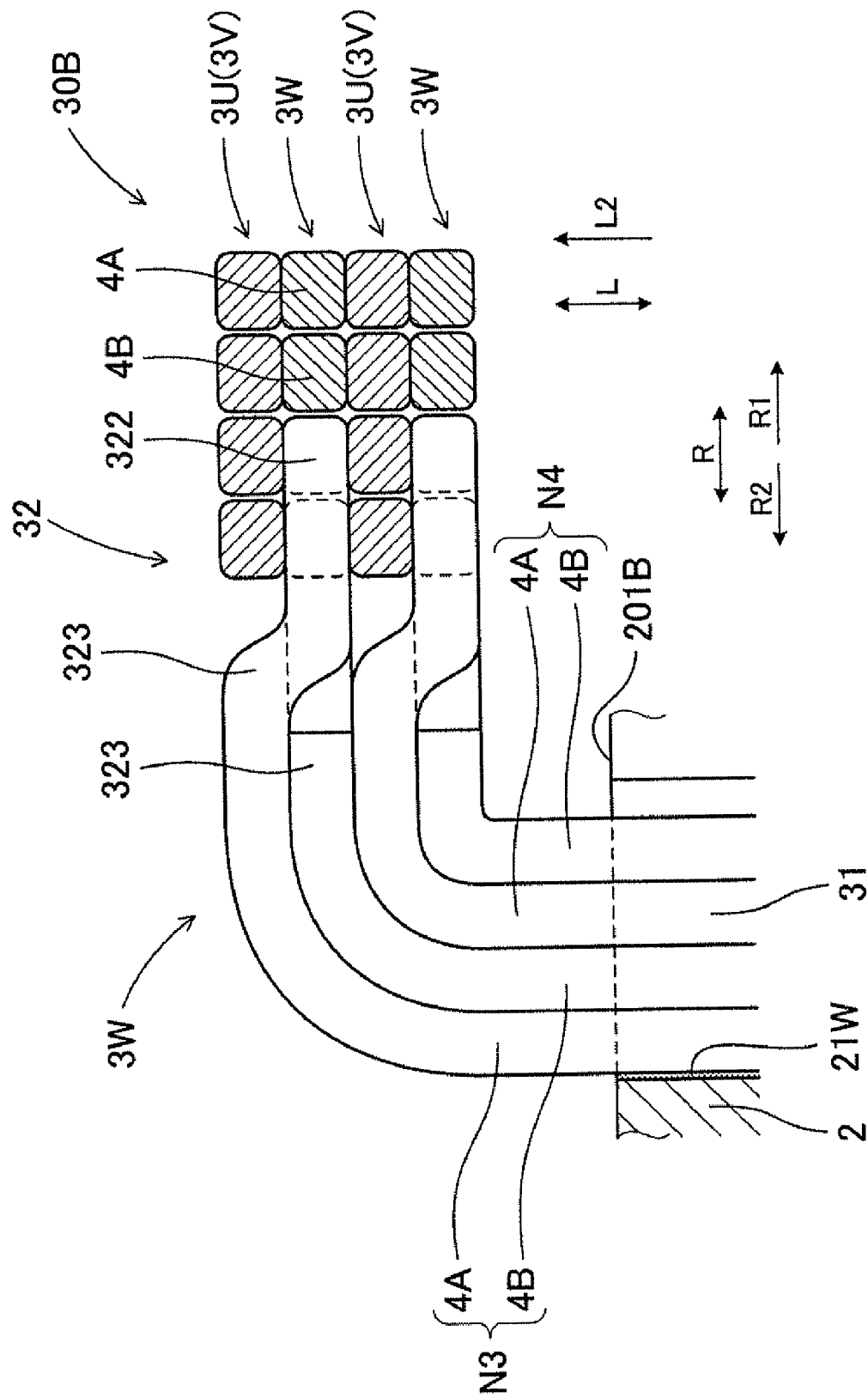
FIG. 31 is an illustrative sectional view showing the second end side coil end portion of a W phase coil disposed in an inside slot according to the second embodiment.

Further, as shown in FIG. 31, a third pair of W phase coil conductors 4 (N3) disposed in the inside slot 21A of the first slot group S1 and the inside slot 21A of the second slot group S2 so as to overlap the first pair of W phase coil conductors 4 (N1) on the radial inner peripheral side R1 of the inside slot 21A are provided in the slot 21 in series in the radial direction R such that the first coil conductor 4A positioned on the radial outer peripheral side R2 of the slot 21 is positioned on the radial inner peripheral side R1 in the first side coil end portion 30B, while the second coil conductor 4B positioned on the radial inner peripheral side R1 of the slot 21 is positioned on the radial outer peripheral side R2 of the first coil conductor 4A in the first side coil end portion 30B.

Further, a fourth pair of W phase coil conductors 4 (N4) disposed in the outside slot 21B of the first slot group S1 and the outside slot 21B of the second slot group S2 so as to overlap the second pair of W phase coil conductors 4 (N2) on the radial inner peripheral side R1 of the outside slot 21B are provided in the slot 21 in series in the radial direction R such that the first coil conductor 4A positioned on the radial outer peripheral side R2 of the slot 21 is positioned on the radial inner peripheral side R1 in the first side coil end portion 30B, while the second coil conductor 4B positioned on the radial inner peripheral side R1 of the slot 21 is positioned on the radial outer peripheral side R2 of the first coil conductor 4A in the first side coil end portion 30B. Further, in the first side coil end portion 30B, the fourth pair of W phase coil conductors 4 (N4) is disposed in series on the radial inner peripheral side R1 of the third pair of W phase coil conductors 4 (N3).

Further, as shown in FIGS. 28 and 29, the first coil conductor 4A positioned on the radial outer peripheral side R2 of the W phase slot 21W in the first and second pairs of W phase coil conductors 4 (N2) is offset to the axial inner side L1 in the radial conductor portion 323 provided between the bent angular conductor portion 321 and the circumferential conductor portion 322, while the second coil conductor 4B positioned on the radial inner peripheral side R1 of the W phase slot 21W is offset to the inside of the circumferential direction C in the radial conductor portion 323 provided between the bent angular conductor portion 321 and the circumferential conductor portion 322. Thus, the respective circumferential conductor portions 322 are aligned in the radial direction R.

Moreover, in the third and fourth pairs of W phase coil conductors 4 (N3, N4), similarly to the first and second pairs of coil conductors 4 (N1, N2), the respective coil conductors 4 are offset such that the respective circumferential conductor portions 322 are aligned in the radial direction R.

As shown in FIGS. 20, 24 and 28, in the first side coil end portions 30B of the U phase and V phase coils 3U, 3V, the first coil conductor 4A is positioned on the radial outer peripheral side R2 of the slot 21 and the second coil conductor 4B is positioned on the radial inner peripheral side R1 of the slot 21. However, in the first side coil end portion 30B of the W phase coil 3W, the positions of the first coil conductor 4A and the second coil conductor 4B are opposite to the positions of the first coil conductor 4A and the second coil conductor 4B in the first side coil end portions 30B of the U phase and V phase coils 3U, 3V with respect to the radial inner peripheral side R1 or the radial outer peripheral side R2 of the circumferential conductor portion 322. Further, in the U phase coil 3U and the V phase coil 3V, the pair of coil conductors 4 in the radial conductor portion 323 are bent in an identical manner in the part on the circumferential first side C1, and in the W phase coil 3W and the V phase coil 3V, the pair of coil conductors 4 are bent in an identical manner in the part on the circumferential second side C2.

The coils 3U, 3V, 3W of the three phases according to the second embodiment are formed into a coil assembly 5 by combining all of the coils disposed in the stator core 2, and this coil assembly 5 is disposed at once in the stator core 2.

Figure 32:
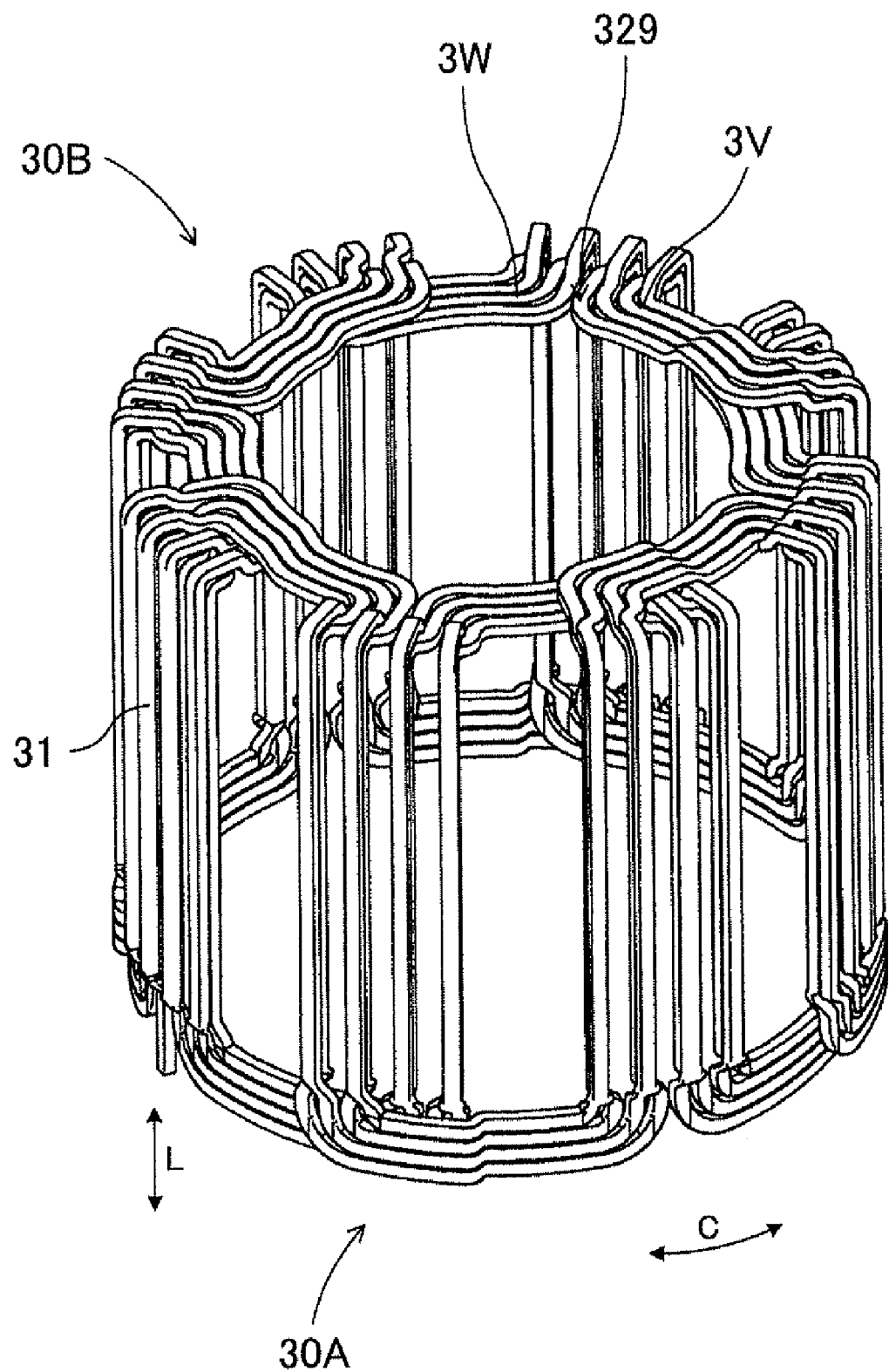
FIG. 32 is a perspective view showing a coil conductor constituting the V phase coil and a coil conductor constituting the W phase coil in a combined state, according to the second embodiment.

FIG. 32 shows a state in which the third and fourth pairs of coil conductors 4 (N3, N4) of the V phase coil 3V is combined with the third and fourth pairs of coil conductors 4 (N3, N4) of the W phase coil 3W. At this time, in the first side coil end portion 30B, the outside part 326 of the circumferential conductor portion 322 of the V phase coil 3V overlaps the axial outer side L2 relative to the part of the circumferential conductor portion 322 of the W phase coil 3W on the circumferential first side C1. Further, a recessed portion 329 for disposing the circumferential conductor portion 322 of the U phase coil 3U is formed on the axial outer side L2 of the circumferential second side C2 part of the circumferential conductor portion 322 of the W phase coil 3W and the inside part 325 of the circumferential conductor portion 322 of the V phase coil 3V.

Figure 33:
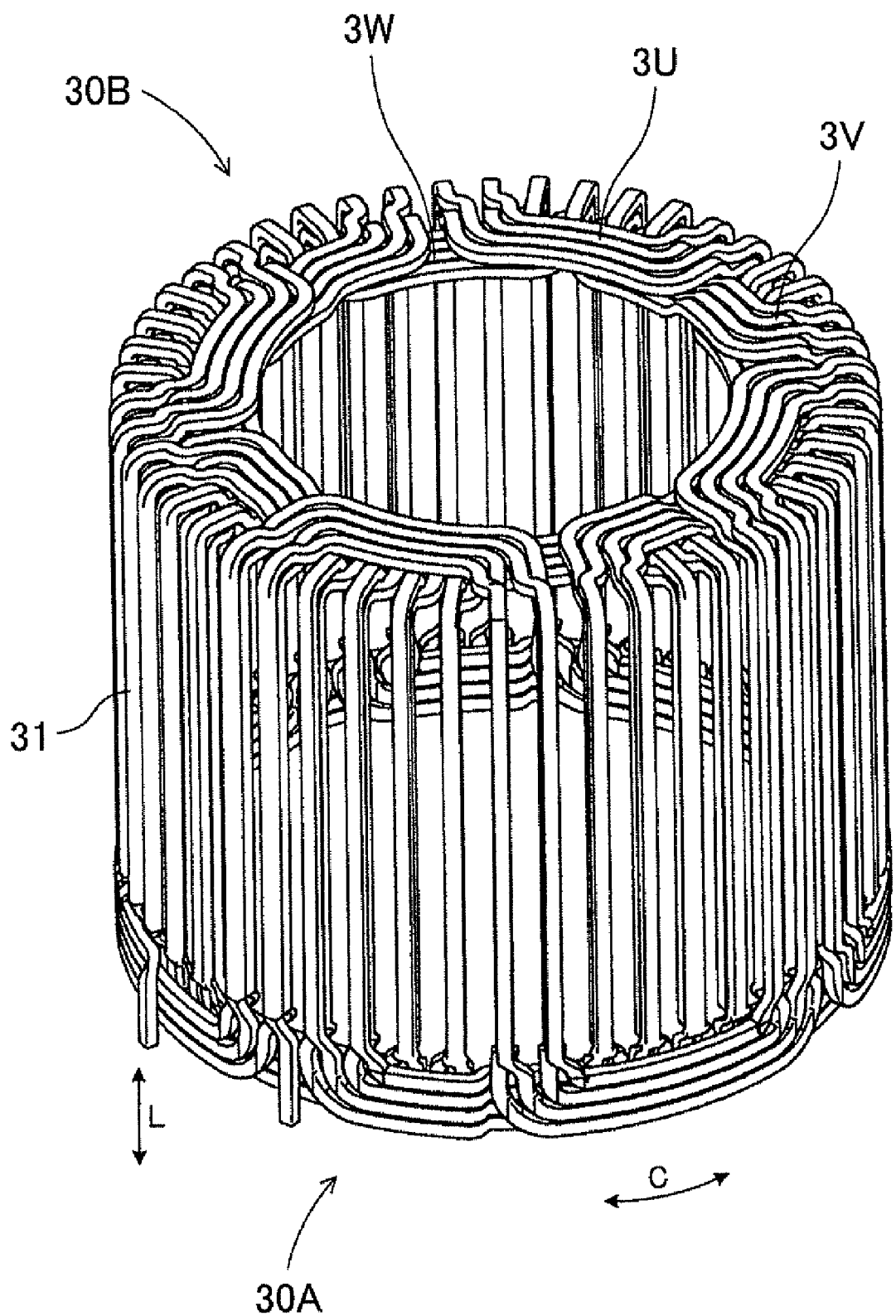
FIG. 33 is a perspective view showing coil conductors constituting the U phase, V phase and W phase coils in a combined state, according to the second embodiment.
Figure 34:
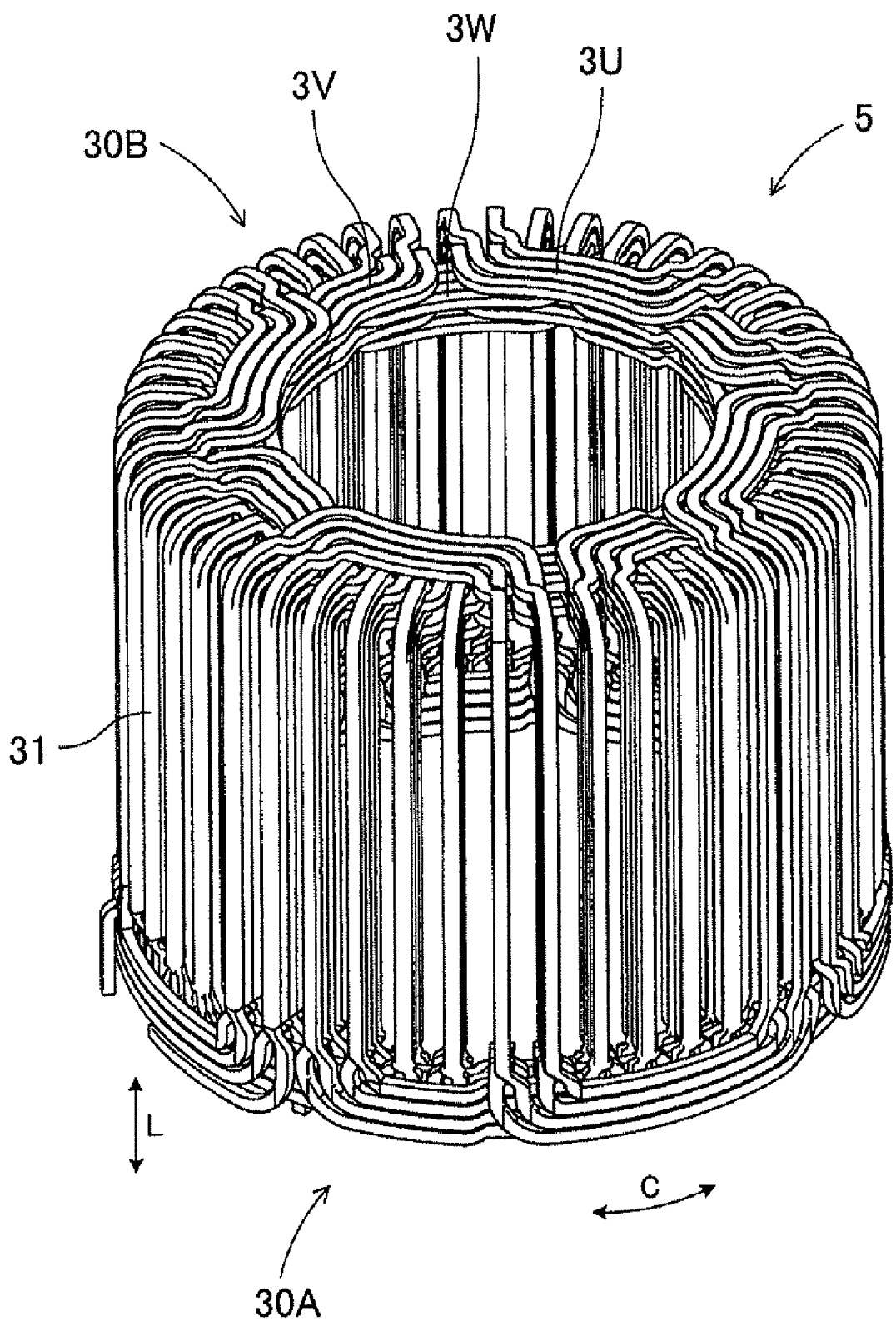
FIG. 34 is a perspective view showing a coil assembly formed by combining the coil conductors constituting the U phase, V phase and W phase coils according to the second embodiment.

FIG. 33 shows a state in which, with respect to the third and fourth pairs of coil conductors 4 (N3, N4) constituting the coils 3U, 3V, 3W of the three phases, the circumferential conductor portion 322 of the U phase coil 3U is disposed in the recessed portion 329 formed on the axial outer side L2 of the circumferential second side C2 part of the circumferential conductor portion 322 of the W phase coil 3W and the inside part 325 of the circumferential conductor portion 322 of the V phase coil 3V. Further, FIG. 34 shows a state in which all of the third and fourth pairs of coil conductors 4 (N3, N4) constituting the coils 3U, 3V, 3W of the three phases and all of the first and second pairs of coil conductors 4 (N1, N2) constituting the coils 3U, 3V, 3W of the three phases are combined to form the coil assembly 5.

As shown in FIG. 16, the coil assembly 5 formed by combining all of the coils 3U, 3V, 3W of the three phases can be inserted into all of the slots 21 in the stator core 2 from the first side coil end portion 30B to form the stator 1.

Although not shown in the drawings, when forming the coil assembly 5, an assembly jig may be used to determine the positions of the coils 3U, 3V, 3W of the three phases. Further, when the coil assembly 5 is disposed in the stator core 2, an insertion jig may be used to facilitate insertion of the coil assembly 5.

Next, actions and effects of the stator 1 according to the second embodiment will be described.

By manipulating the shape of the first side coil end portion 30B in the stator 1 according to the second embodiment, the coils 3U, 3V, 3W of the three phases can be disposed relative to the stator core 2 easily and the need for further molding of the coils 3U, 3V, 3W of the three phases after the coils 3U, 3V, 3W are disposed in the stator core 2 can be eliminated.

More specifically, in the stator 1 according to the second embodiment, similar to that of the related art, the second side coil end portion 30A is shaped by being bent toward the radial outer peripheral side R2 of the stator core 2 before being disposed in the stator core 2, whereby the entirety of the second side coil end portion 30A is positioned further toward the radial outer peripheral side R2 than an inner peripheral end surface 221 of a tooth 22 (a part positioned between the slots 21). Note that the coil end conductor portion 32 positioned in the second side coil end portion 30A may be formed by being bent toward the radial outer peripheral side R2. Hence, as shown in FIG. 17, when a rotor 6 is inserted into the stator 1 formed by disposing the coils 3U, 3V, 3W of the three phases in the stator core 2, the rotor 6 can be inserted from the axial first end surface 201A side of the stator core 2 on which the second side coil end portion 30A is positioned. As a result, the rotor 6 can be disposed relative to the stator 1 easily.

Further, the first side coil end portion 30B is shaped by being bent toward the radial inner peripheral side R1 of the stator core 2 before being disposed in the stator core 2 such that the entirety of the first side coil end portion 30B is positioned further toward the radial inner peripheral side R1 than an outer peripheral end surface 211 of the slot 21. Hence, as shown in FIG. 17, when the coils 3U, 3V, 3W of the three phases are inserted into the stator core 2, the coils 3U, 3V, 3W of the three phases can be inserted into the stator core 2 from the axial second end surface 201B side, on which the first side coil end portion 30B is positioned. As a result, the coils 3U, 3V, 3W of the three phases can be disposed in the stator core 2 easily.

Further, in the first side coil end portion 30B, the coils 3U, 3V, 3W of the three phases are formed such that a plurality of coil conductors 4 of the same phase are disposed in series in the radial direction R of the stator core 2. Hence, on a second end side of the axial direction L of the stator 1, the amount by which the first side coil end portion 30B projects from the axial end surface 201 of the stator core 2 can be reduced.

As a result, the size of the coil end portion 30B positioned on the axial second end surface 201B side of the stator 1 can be reduced in the axial direction L.

Furthermore, in the stator 1 according to the second embodiment, the second side coil end portion 30A and first side coil end portion 30B can be molded into a post-assembly shape in advance, prior to disposal in the stator core 2. Moreover, after the assembly to the stator core 2, the coil end portions 30A, 30B on both sides can be finished as a product without performing molding processing, such as bending molding and compression molding, with substantially no further processing after insertion. As a result, an insulating film provided on the surface of the coil conductors 4 constituting the coils 3 suffers substantially no breakage or deterioration. Therefore, the quality of the stator 1 according to the second embodiment can be improved.

Furthermore, in the stator 1 according to the second embodiment, the coils 3U, 3V, 3W of the three phases can be assembled in advance prior to insertion into the stator core 2 such that the all of the coils 3U, 3V, 3W of the three phases can be inserted into the stator core 2 simultaneously. As a result, the coils 3U, 3V, 3W of the three phases can be inserted into the stator core 2 very easily. Note that the coils 3 may be inserted into the stator core 2 in predetermined units (numbers) and then joined by welding or the like when disposed in the stator core 2.

Hence, with the stator 1 according to the second embodiment, the coils 3U, 3V, 3W of the three phases can be disposed in the stator core 2 easily, the quality of the coils 3U, 3V, 3W of the three phases can be maintained at a high level, and the size of the stator 1 can be reduced.

Third Embodiment

As shown in FIGS. 35 to 44, a third embodiment differs from the second embodiment described above in the manner in which the pairs of coil conductors 4 constituting the coils 3U, 3V, 3W of the three phases are formed.

The reference numerals of the respective terms (constitutional components) in FIGS. 35 to 44 of the third embodiment are applied separately from those in FIGS. 1 to 15 of the first embodiment but shared with FIGS. 16 to 34 of the second embodiment.

Figure 36:
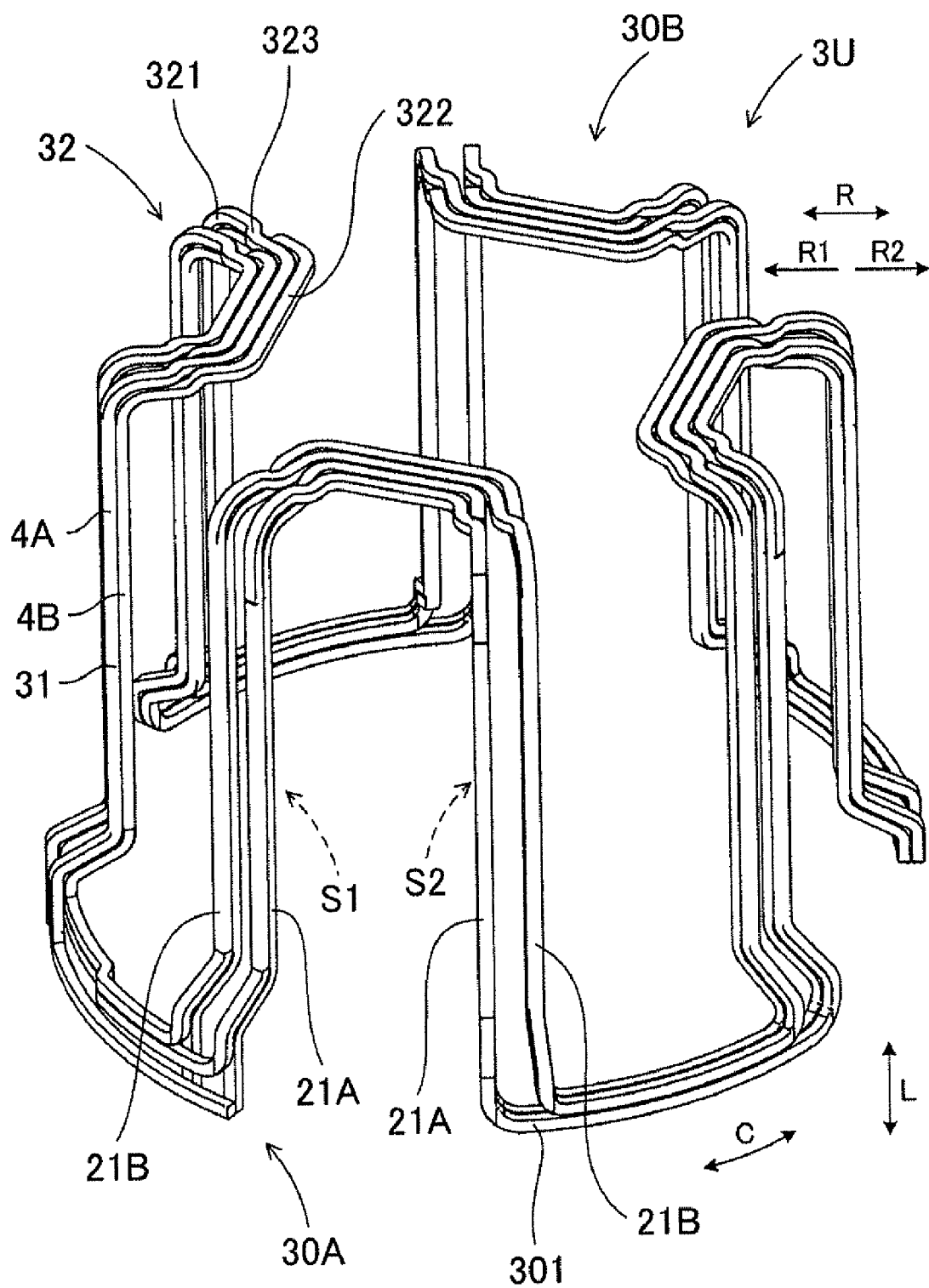
FIG. 36 is a perspective view showing a U phase coil according to the third embodiment.
Figure 38:
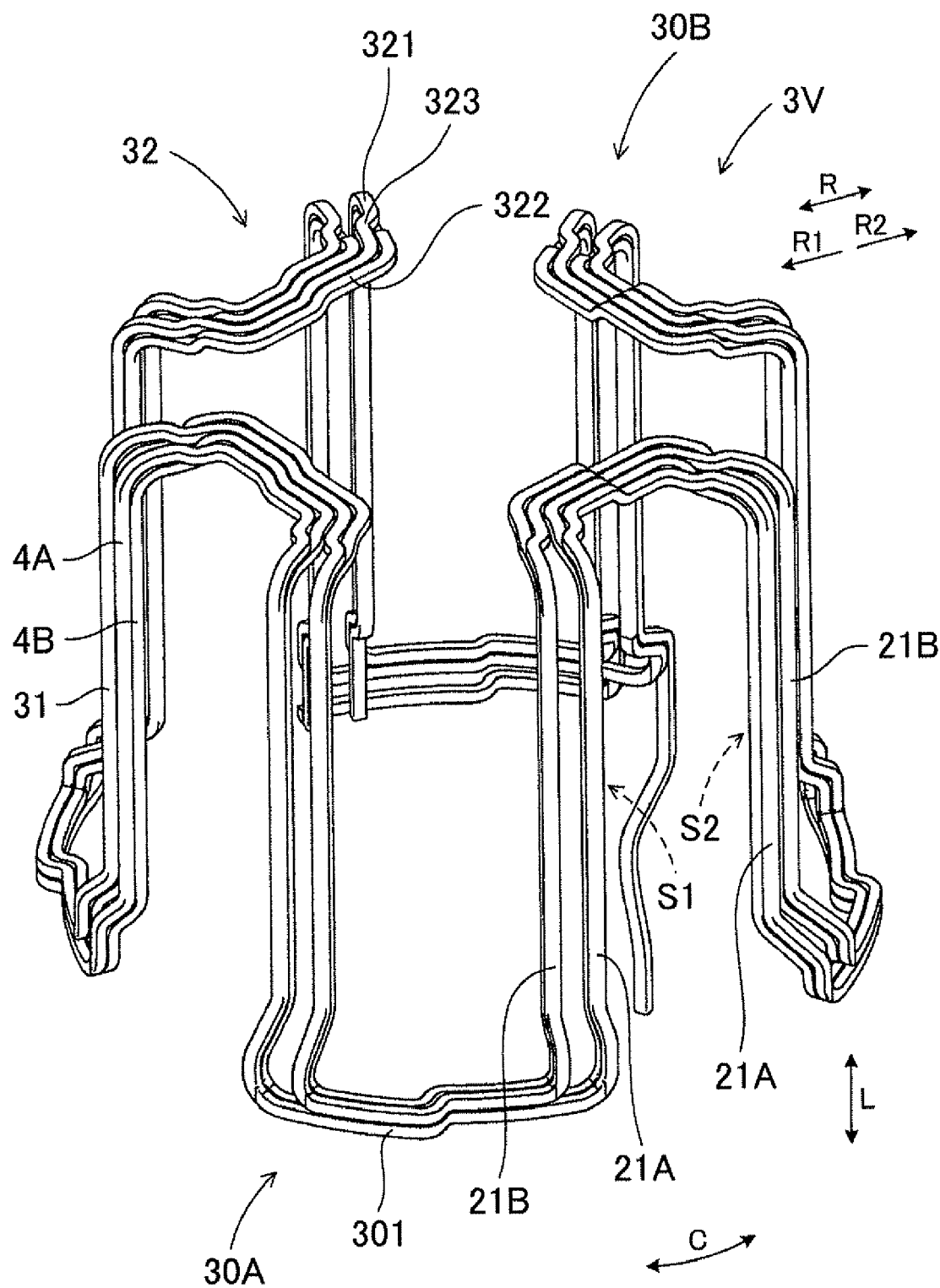
FIG. 38 is a perspective view showing a V phase coil according to the third embodiment.
Figure 40:
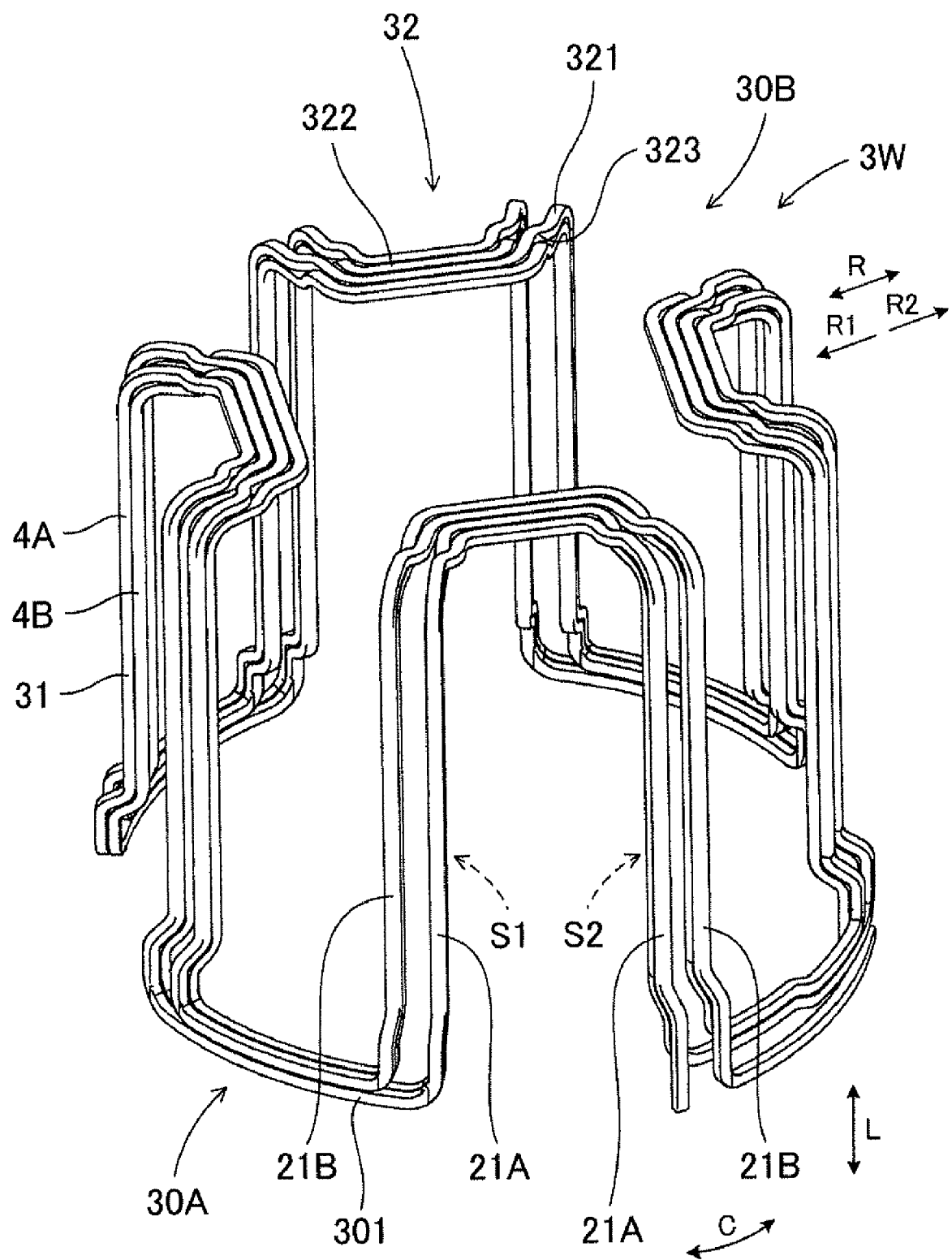
FIG. 40 is a perspective view showing a W phase coil according to the third embodiment.

As shown in FIGS. 36, 38 and 40, in the second side coil end portion 30A according to the third embodiment, pairs of coil conductors 4 are disposed to overlap in the radial direction R such that the second pair of coil conductors 4 (N2) disposed respectively in the outside slots 21B of the first slot group S1 and second slot group S2 is disposed to overlap the first pair of coil conductors 4 (N1) disposed respectively in the inside slots 21A of the first slot group S1 and second slot group S2 on the radial inner side L1. Further, in the second side coil end portion 30A, the fourth pair of coil conductors 4 (N4) disposed respectively in the outside slots 21B of the first slot group S1 and second slot group S2 is disposed to overlap the third pair of coil conductors 4 (N3) disposed respectively in the inside slots 21A of the first slot group S1 and second slot group S2 on the radial inner side L1.

Figure 37:
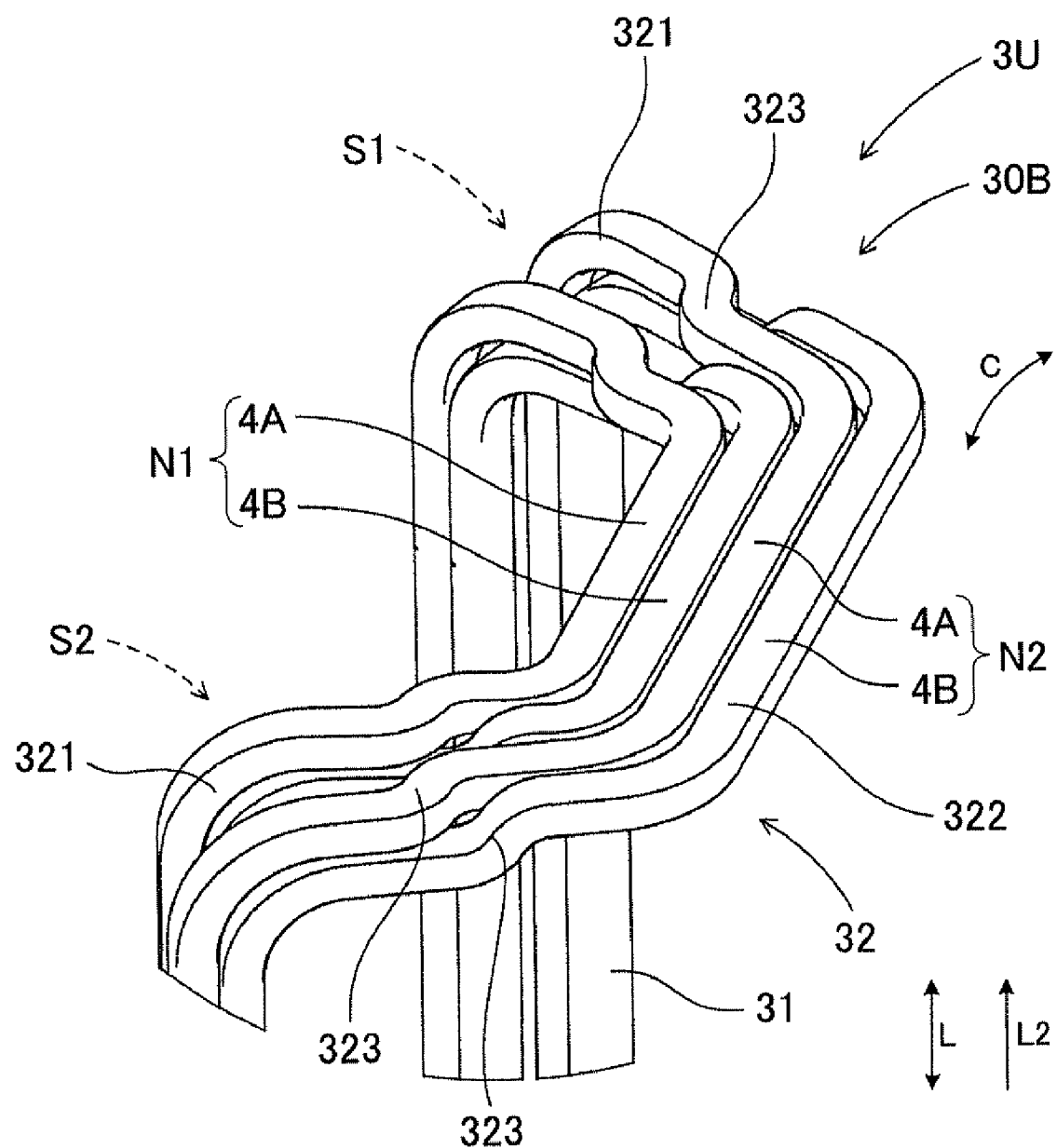
FIG. 37 is a perspective view showing a part of a second end side coil end portion of the U phase coil according to the third embodiment.

FIGS. 36 and 37 show the manner in which the U phase coil 3U of the third embodiment is formed.

The first pair of U phase coil conductors 4 (N1) disposed in the inside slot 21A of the first slot group S1 and the inside slot 21A of the second slot group S2 is provided in the slot 21 in series in the radial direction R such that the first coil conductor 4A positioned on the radial outer peripheral side R2 of the slot 21 is also positioned on the radial outer peripheral side R2 in the first side coil end portion 30B, while the second coil conductor 4B positioned on the radial inner peripheral side R1 of the slot 21 is positioned on the radial inner peripheral side R1 of the first coil conductor 4A in the first side coil end portion 30B.

Further, the second pair of U phase coil conductors 4 (N2) disposed in the outside slot 21B of the first slot group S1 and the outside slot 21B of the second slot group S2 is provided in the slot 21 in series in the radial direction R such that the first coil conductor 4A positioned on the radial outer peripheral side R2 of the slot 21 is also positioned on the radial outer peripheral side R2 in the first side coil end portion 30B, while the second coil conductor 4B positioned on the radial inner peripheral side R1 of the slot 21 is positioned on the radial inner peripheral side R1 of the first coil conductor 4A in the first side coil end portion 30B. Further, in the first side coil end portion 30B, the second pair of U phase coil conductors 4 (N2) is disposed in series on the radial inner peripheral side R1 of the first pair of U phase coil conductors 4 (N1).

Further, the third pair of U phase coil conductors 4 (N3) disposed in the inside slot 21A of the first slot group S1 and the inside slot 21A of the second slot group S2 so as to overlap the first pair of U phase coil conductors 4 (N1) on the radial inner peripheral side R1 of the inside slot 21A has a similar constitution to the first pair of coil conductors 4 (N1).

Further, the fourth pair of U phase coil conductors 4 (N4) disposed in the outside slot 21B of the first slot group S1 and the outside slot 21B of the second slot group S2 so as to overlap the second pair of U phase coil conductors 4 (N2) on the radial inner peripheral side R1 of the outside slot 21B has a similar constitution to the second pair of coil conductors 4 (N2).

Further, as shown in FIG. 37, in the first and second pairs of U phase coil conductors 4 (N1, N2), the first coil conductor 4 positioned on the radial outer peripheral side R2 of the U phase slot 21U is offset to the inside in the circumferential direction C in the radial conductor portion 323 provided between the bent angular conductor portion 321 and the circumferential conductor portion 322, while the second coil conductor 4B positioned on the radial inner peripheral side R1 of the U phase slot 21U is offset to the outside in the axial direction L in the radial conductor portion 323 provided between the bent angular conductor portion 321 and the circumferential conductor portion 322. Thus, the respective circumferential conductor portions 322 are aligned in the radial direction R.

In the third and fourth pairs of U phase coil conductors 4 (N3, N4), the respective circumferential conductor portions 322 are aligned in the radial direction R by offsetting the respective coil conductors in a similar manner to the first and second pairs of U phase coil conductors 4 (N1, N2).

Figure 39:
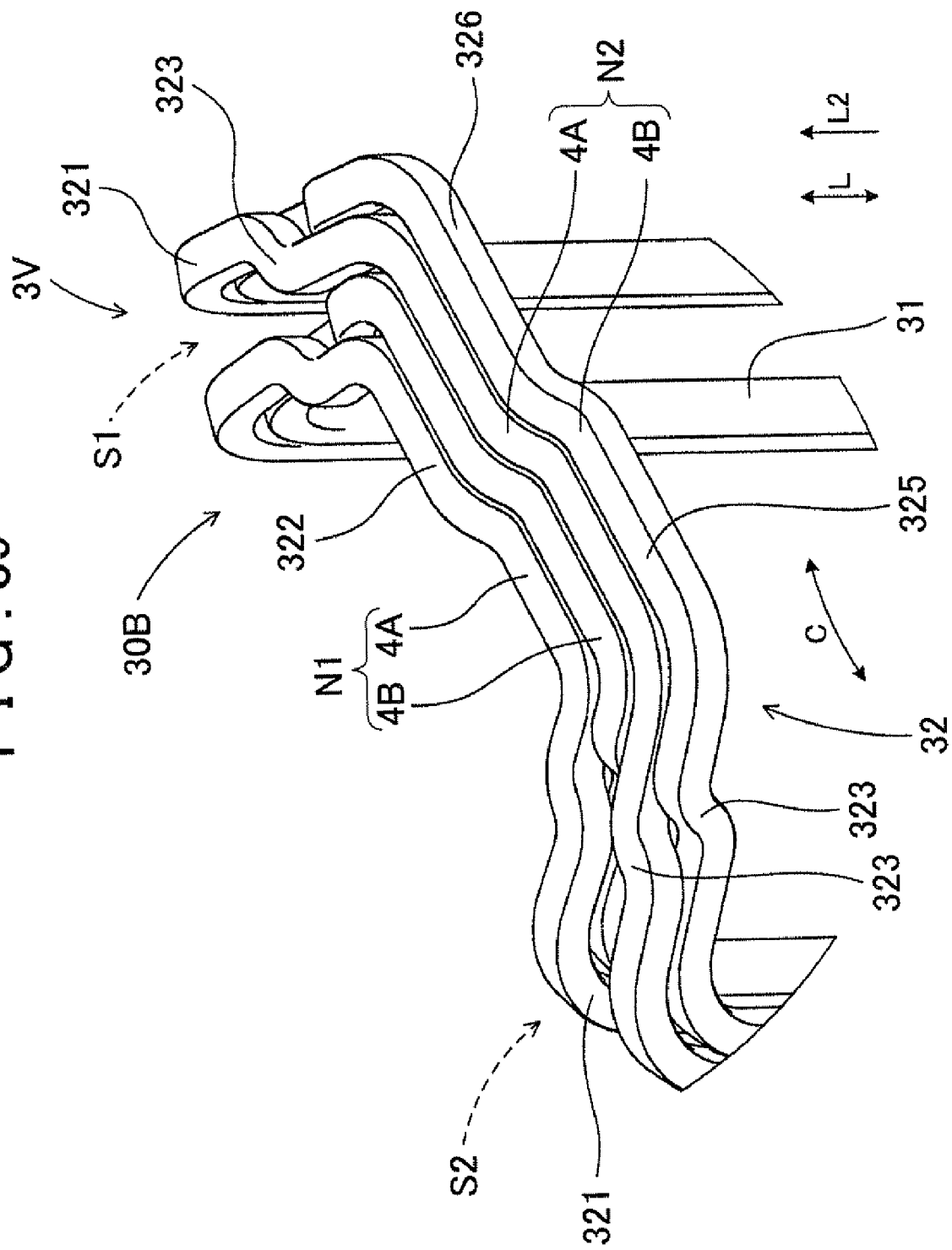
FIG. 39 is a perspective view showing a part of a second end side coil end portion of the V phase coil according to the third embodiment.

FIGS. 38 and 39 show the manner in which the V phase coil 3V is formed. In the V phase coil 3V, the first to fourth pairs of coil conductors 4 (N1 to N4) are constituted similarly to those in the U phase coil 3U. Further, in the V phase coil 3V, the circumferential conductor portion 322 that forms the inside part 325 and the outside part 326 has a different shape to the circumferential conductor portion 322 of the U phase coil 3U.

Figure 41:
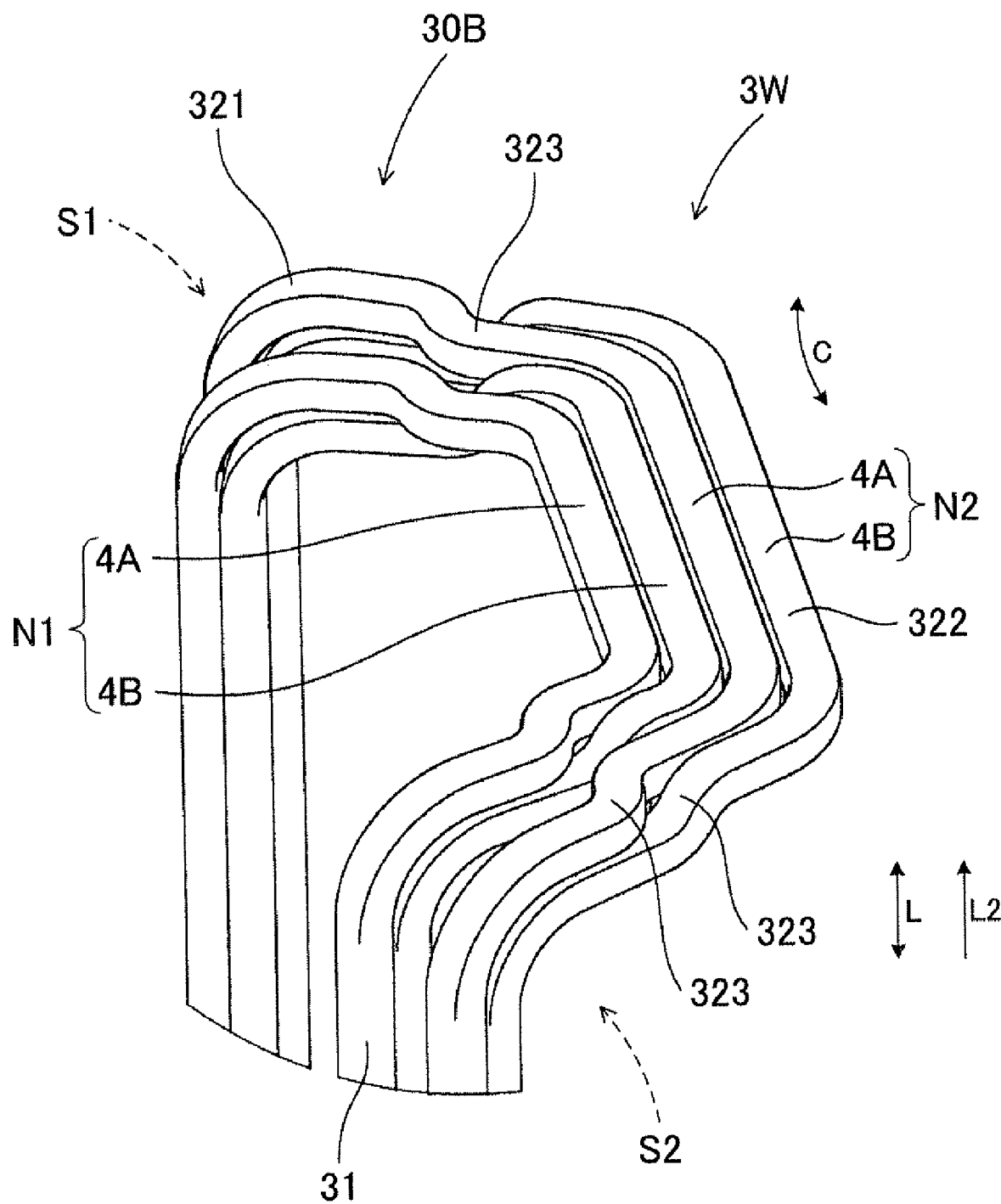
FIG. 41 is a perspective view showing a part of a second end side coil end portion of the W phase coil according to the third embodiment.

FIGS. 40 and 41 show the manner in which the W phase coil 3W is formed. In the W phase coil 3W, the first to fourth pairs of coil conductors 4 (N1 to N4) are constituted similarly to the U phase coil 3U.

In the first side coil end portion 30B of the coils 3U, 3V, 3W of the three phases according to the third embodiment, the positional relationship between the first coil conductor 4A positioned on the radial outer peripheral side R2 of the slot 21 and the second coil conductor 4B positioned on the radial inner peripheral side R1 of the slot 21 is common to all three phases. Further, the manner in which the pair of coil conductors 4 is bent in the radial conductor portion 323 is standardized for the coils 3U, 3V, 3W of all three phases.

The coils 3U, 3V, 3W of the three phases according to the third embodiment are likewise formed into the coil assembly 5 by combining all of the coils disposed in the stator core 2, and this coil assembly 5 is disposed at once in the stator core 2.

Figure 42:
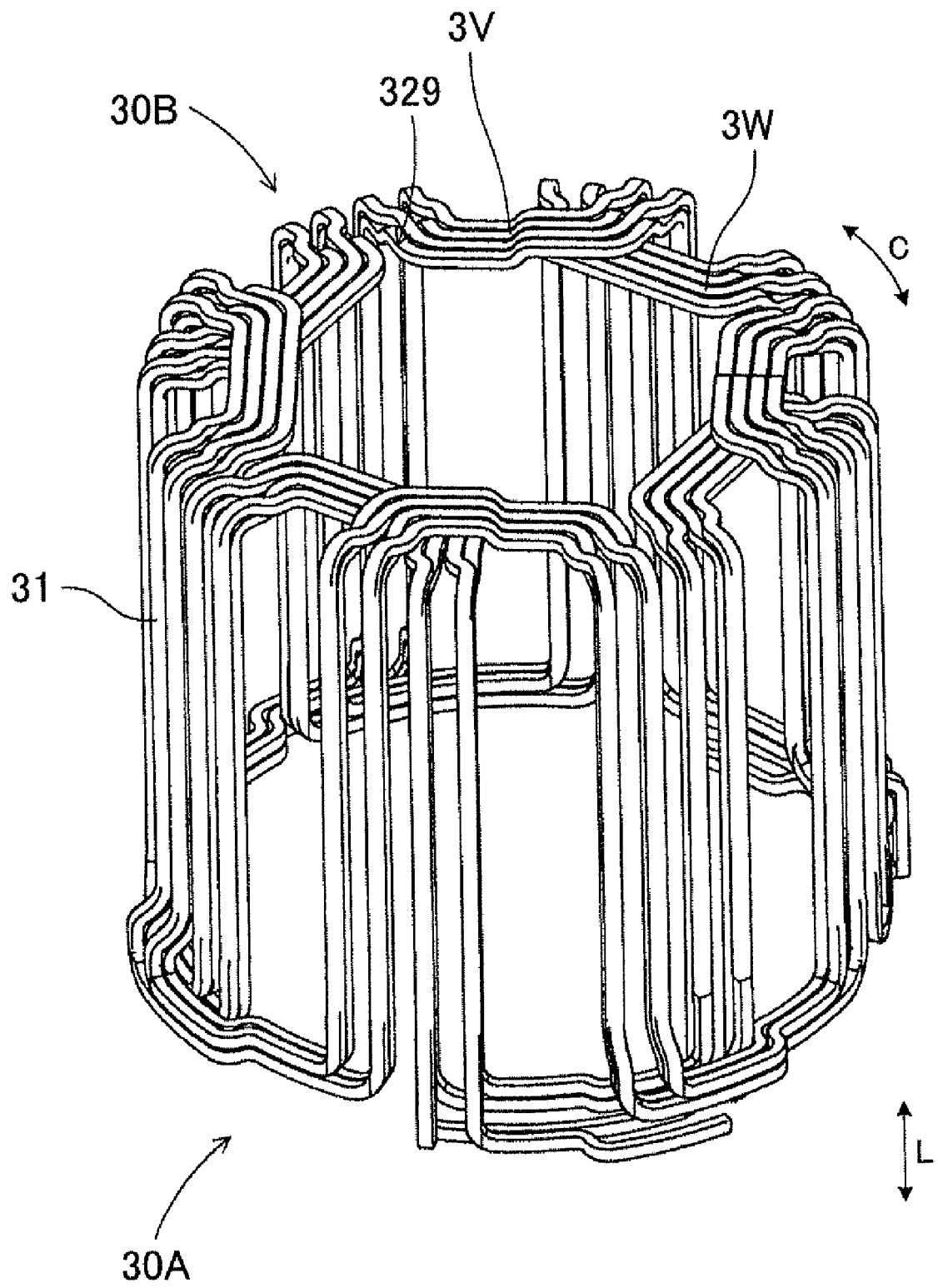
FIG. 42 is a perspective view showing a coil conductor constituting the V phase coil and a coil conductor constituting the W phase coil in a combined state according to the third embodiment.

FIG. 42 shows a state in which the third and fourth pairs of coil conductors 4 (N3, N4) of the V phase coil 3V are combined with the third and fourth pairs of coil conductors 4 (N3, N4) of the W phase coil 3W. At this time, in the first side coil end portion 30B, the outside part 326 of the circumferential conductor portion 322 of the V phase coil 3V overlaps the axial outer side L2 relative to the part of the circumferential conductor portion 322 of the W phase coil 3W on the circumferential first side C1. Further, the recessed portion 329 for disposing the circumferential conductor portion 322 of the U phase coil 3U is formed on the axial outer side L2 of the circumferential second side C2 part of the circumferential conductor portion 322 of the W phase coil 3W and the inside part 325 of the circumferential conductor portion 322 of the V phase coil 3V.

Figure 43:
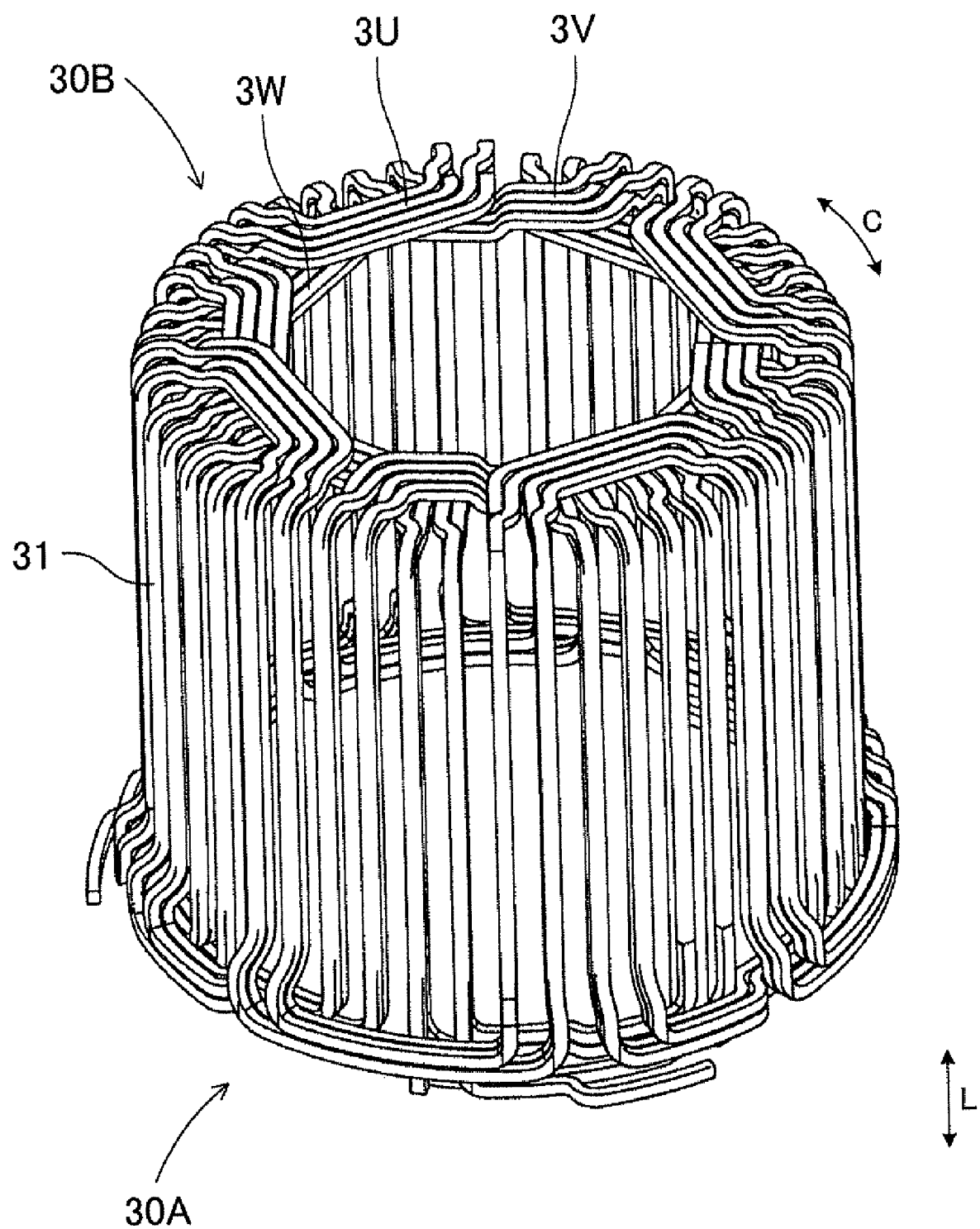
FIG. 43 is a perspective view showing coil conductors constituting the U phase, V phase and W phase coils in a combined state according to the third embodiment.
Figure 44:
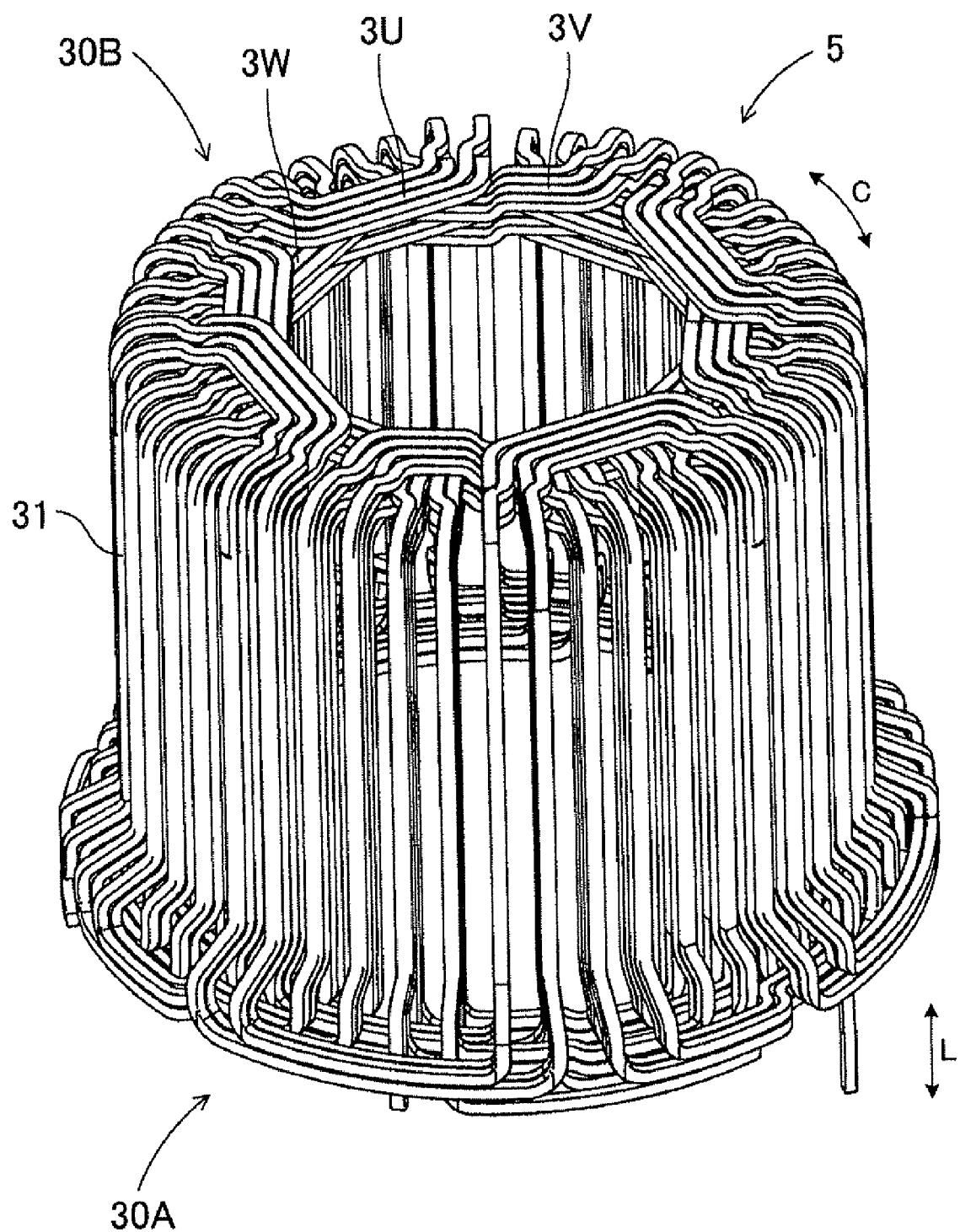
FIG. 44 is a perspective view showing a coil assembly formed by combining the coil conductors constituting the U phase, V phase and W phase coils according to the third embodiment.

FIG. 43 shows a state in which, with respect to the third and fourth pairs of two coil conductors 4 (N3, N4) constituting the coils 3U, 3V, 3W of the three phases, the circumferential conductor portion 322 of the U phase coil 3U is disposed on the recessed portion 329 formed on the axial outer side L2 of the circumferential second side C2 part of the circumferential conductor portion 322 of the W phase coil 3W and the inside part 325 of the circumferential conductor portion 322 of the V phase coil 3V. Further, FIG. 44 shows a state in which all of the third and fourth pairs of coil conductors 4 (N3, N4) of the coils 3U, 3V, 3W of the three phases and all of the first and second pairs of coil conductors 4 (N1, N2) constituting the coils 3U, 3V, 3W of the three phases are combined to form the coil assembly 5.

Figure 35:
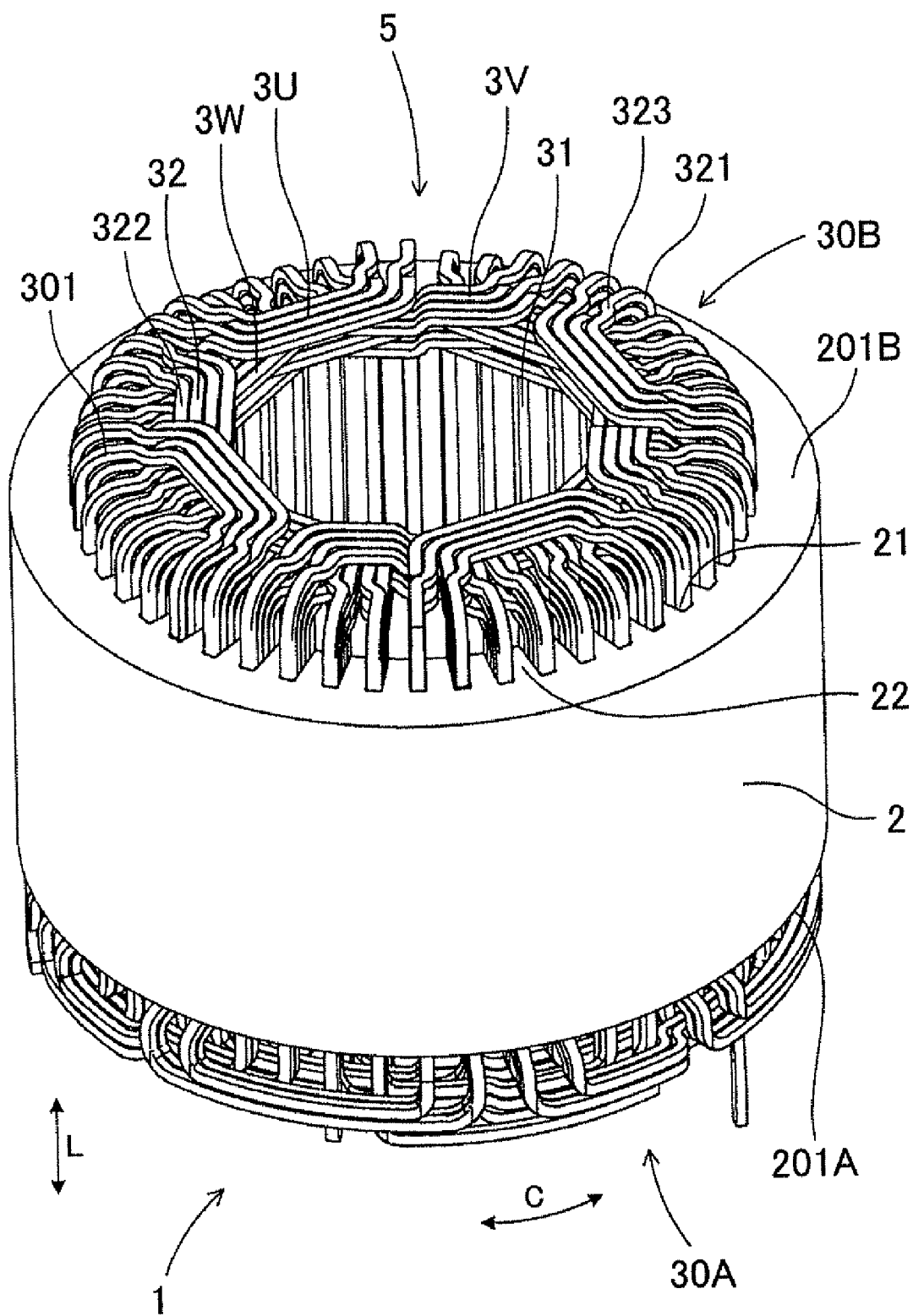
FIG. 35 is a perspective view showing a stator according to a third embodiment.

As shown in FIG. 35, the coil assembly 5 formed by combining all of the coils 3U, 3V, 3W of the three phases can be inserted into all of the slots 21 in the stator core 2 from the first side coil end portion 30B side to form the stator 1.

With the coils 3U, 3V, 3W of the three phases according to the third embodiment, the positional relationship of the pairs of coil conductors 4 in the first side coil end portion 30B can be standardized for all three phases, and the manner in which the pairs of coil conductors 4 are bent in the radial conductor portion 323 can be standardized for all three phases. Hence, formation of the coils 3U, 3V, 3W of the three phases is simplified, enabling reduction in the manufacturing cost of the coils 3U, 3V, 3W of the three phases.

All other constitutions of the third embodiment are identical to the second embodiment described above, and therefore similar advantageous effects to the second embodiment can be obtained.

The invention claimed is:

1. A stator in which coil conductors of three phases, namely a U phase, a V phase, and a W phase, are disposed in a distributed winding form in a plurality of slots extending in an axial direction of a stator core, the stator characterized in that:
the coil conductors of the three phases each include a slot conductor portion disposed in one of the plurality of slots, and a pair of coil end conductor portions disposed on both axial sides of the stator core to connect the slot conductor portions disposed in the different slots to each other, and
a first side transition wire portion of each of the phases, which extends in a circumferential direction in a first side coil end conductor portion serving as the coil end conductor portion positioned on an axial first side, is disposed further toward a radial inner side than an inner peripheral end surface of a tooth provided on each circumferential side of the slot so as to overlap another first side transition wire portions in the axial direction,
wherein the first side transition wire portion of each of the phases is disposed to overlap the first side transition wire portion of another of the phases in the axial direction, and
wherein the first side transition wire portions of the coil conductors of the two phases, from among the coil conductors of the three phases, are disposed in offset positions from each other in the axial direction, and the first side transition wire portion of the coil conductor of the remaining phase is bent in the axial direction between circumferential end portions of the coil conductors of the two phases so as to be disposed to overlap the first side transition wire portions of the coil conductors of the two phases in the axial direction.

2. The stator according to, claim 1 wherein the first side transition wire portion of each of the phases is disposed to overlap another first side transition wire portion of the same phase in a radial direction further toward a radial inner side than the inner peripheral end surface of the tooth.

3. The stator according to, claim 1 wherein
at least two of the slot conductor portions of each of the phases are disposed in the slot of each of the phases in the stator core so as to overlap in the radial direction,
the first side coil end conductor portion that is connected to an outermost peripheral side slot conductor portion is farthest distant from an axial end surface of the stator core toward an axial outer side from an axial end surface of the stator core, the outermost peripheral side slot conductor portion being one of the slot conductor portions that is disposed on a radial outermost peripheral side among the slot conductor portions disposed to overlap in the radial direction, and
the first side coil end conductor portion that is connected to an inner peripheral side slot conductor portion, which is one of the slot conductor portions that overlaps an inner peripheral side of the outermost peripheral side slot conductor portion, is disposed to overlap the first side coil end conductor portion connected to the outermost peripheral side slot conductor portion on an axial inner side.

4. The stator according to claim 3, wherein in the coil conductors of the three phases, a radius of curvature of a coil end connecting portion that connects the inner peripheral side slot conductor portion to the first side transition wire portion is smaller than a radius of curvature of a coil end connecting portion that connects the outermost peripheral side slot conductor portion to the first side transition wire portion.

5. The stator according to claim 1, wherein a second side transition wire portion of each of the phases, which extends in a circumferential direction in a second side coil end conductor portion serving as the coil end conductor portion positioned on an axial second side, is disposed further toward a radial outer side than the inner peripheral end surface of the tooth so as to overlap another second side transition wire portion of the same phase in the radial direction.

6. The stator according to claim 5, wherein the second side transition wire portion of each of the phases is disposed to overlap the second side transition wire portion of another of the phases in the radial direction.

7. The stator according to claim 6, wherein
in the stator core, two adjacent ones of the U phase slots, two adjacent ones of the V phase slots, and two adjacent ones of the W phase slots are formed repeatedly in sequence,
the coil conductors of the three phases are constituted such that the plurality of coil conductors of the same phase are respectively disposed in the adjacent slots of the same phase in series in the radial direction of the stator core, and
in the first side coil end conductor portion, the plurality of coil conductors of the same phase disposed in a first slot of the adjacent slots of the same phase and the plurality of coil conductors of the same phase disposed in a second slot of the adjacent slots of the same phase are disposed in series in the axial direction of the stator core, and in the second side coil end conductor portion, the plurality of coil conductors of the same phase disposed in the first slot of the adjacent slots of the same phase and the plurality of coil conductors of the same phase disposed in the second slot of the adjacent slots of the same phase are disposed in series in the radial direction of the stator core.

8. The stator according to claim 7, wherein
the coil conductors of the three phases are constituted such that two coil conductors of the same phase are respectively disposed in the adjacent slots of the same phase in series in the radial direction of the stator core, and
in the first side coil end conductor portion, the two coil conductors of the same phase disposed in the first slot of the adjacent slots of the same phase and the two coil conductors of the same phase disposed in the second slot of the adjacent slots of the same phase are disposed in four rows in the radial direction of the stator core, and in the second side coil end conductor portion, the two coil conductors of the same phase disposed in the first slot of the adjacent slots of the same phase and the two coil conductors of the same phase disposed in the second slot of the adjacent slots of the same phase are disposed in four rows in the axial direction of the stator core or in two rows in the axial direction and two rows in the radial direction.

9. The stator according to claim 8, wherein in the first side coil end conductor portion, the two coil conductors of the same phase disposed in the slot of the same phase in series in the radial direction of the stator core are constituted such that a first coil conductor of the two coil conductors is bent toward a radial inner peripheral side of the stator core in a perpendicular state relative to the axial direction of the stator core, while a second coil conductor of the two coil conductors is bent toward the radial inner peripheral side of the stator core and offset from the axial direction of the stator core so as to be disposed in series with the first coil conductor in the radial direction of the stator core.

10. The stator according to claim 5, wherein
the coil conductor of each of the phases is formed in a shape that travels around the stator core once or a plurality of times in the circumferential direction and disposed so as to overlap in a plurality of stages in the radial direction of the stator core, and
conductor end portions of the coil conductors of the same phase are joined in a state where the conductor end portions overlap in the radial direction in the second side transition wire portion of the second side coil end conductor portion.

11. The stator according to claim 1, wherein
the coil conductors of the three phases are each constituted by an angular wire conductor, and formed in a wave-wound shape in which the angular wire is positioned alternately in an axial first side coil end conductor portion and an axial second side coil end conductor portion from an interior of the slot and travels around the stator core in the circumferential direction,
in the axial first side coil end conductor portion, each of the coil conductors of a V phase coil is offset in the axial direction of the stator core in a central part of the stator core in the circumferential direction so as to include an inside part positioned on a circumferential first side and the axial inner side of the stator core, and an outside part positioned on a circumferential second side and the axial outer side of the stator core,
each of the coil conductors of a U phase coil is disposed to overlap the inside part of each of the coil conductors of the V phase coil on the axial outer side of the stator core, and
each of the coil conductors of a W phase coil is disposed to overlap the outside part of each of the coil conductors of the V phase coil on the axial inner side of the stator core.

* * * * *